(12) United States Patent
Asagara et al.

(10) Patent No.: US 10,574,118 B2
(45) Date of Patent: Feb. 25, 2020

(54) ROTATING ELECTRIC MACHINE

(71) Applicant: DENSO CORPORATION, Kariya, Aichi-pref. (JP)

(72) Inventors: Koji Asagara, Nishio (JP); Takeo Maekawa, Kariya (JP); Takashi Satou, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 374 days.

(21) Appl. No.: 15/478,693

(22) Filed: Apr. 4, 2017

(65) Prior Publication Data

US 2017/0288506 A1 Oct. 5, 2017

(30) Foreign Application Priority Data

Apr. 5, 2016 (JP) ................................. 2016-075757
Dec. 7, 2016 (JP) ................................. 2016-237956

(51) Int. Cl.
| | |
|---|---|
| *H02K 9/19* | (2006.01) |
| *H02K 7/14* | (2006.01) |
| *H02K 1/27* | (2006.01) |
| *H02K 5/20* | (2006.01) |
| *H02K 7/116* | (2006.01) |

(52) U.S. Cl.
CPC ............... *H02K 9/19* (2013.01); *H02K 7/116* (2013.01); *H02K 2205/12* (2013.01)

(58) Field of Classification Search
CPC ....... H02K 2205/12; H02K 7/116; H02K 9/19
USPC ......................................................... 310/54
See application file for complete search history.

(56) References Cited

U.S. PATENT DOCUMENTS

| | | | | |
|---|---|---|---|---|
| 4,155,019 | A | * | 5/1979 | Weghaupt ................ H02K 9/19 310/165 |
| 5,707,667 | A | * | 1/1998 | Galt ........................ B29C 45/72 425/589 |
| 2002/0047343 | A1 | * | 4/2002 | Kawamura .............. H02K 9/06 310/60 R |
| 2009/0206689 | A1 | * | 8/2009 | Harada .................... H02K 1/32 310/85 |
| 2010/0194220 | A1 | * | 8/2010 | Tatematsu ............ H02K 1/2766 310/61 |

(Continued)

FOREIGN PATENT DOCUMENTS

| | | |
|---|---|---|
| JP | 2008-263757 A | 10/2008 |
| JP | 2009-261137 A | 11/2009 |
| JP | 2011-120417 A | 6/2011 |

*Primary Examiner* — Alex W Mok
(74) *Attorney, Agent, or Firm* — Oliff PLC

(57) ABSTRACT

A rotating electric machine includes a rotating shaft, a rotor fixed on the rotating shaft, a stator, a housing, a liquid coolant and a flow direction regulating member. The stator is arranged so that a radially inner peripheral surface of the stator radially faces a radially outer peripheral surface of the rotor through an annular gap formed therebetween. The housing covers both axial ends of the stator and rotatably supports the rotating shaft. The liquid coolant is provided in an internal space formed in the housing to flow into at least part of the annular gap formed between the radially inner peripheral surface of the stator and the radially outer peripheral surface of the rotor. The flow direction regulating member axially faces an axial end face of the rotor through an axial gap formed therebetween and regulates the flow direction of the coolant by means of the axial gap.

30 Claims, 63 Drawing Sheets

(56) References Cited

U.S. PATENT DOCUMENTS

| | | | | |
|---|---|---|---|---|
| 2011/0215660 A1* | 9/2011 | Goto | ............ | H02K 3/24 |
| | | | | 310/53 |
| 2012/0025642 A1* | 2/2012 | Onimaru | ............ | H02K 1/276 |
| | | | | 310/64 |
| 2014/0015354 A1* | 1/2014 | Satou | ............ | H02K 9/19 |
| | | | | 310/58 |
| 2014/0070639 A1* | 3/2014 | Tamura | ............ | H02K 3/24 |
| | | | | 310/54 |
| 2014/0152154 A1* | 6/2014 | Kimura | ............ | H02K 9/08 |
| | | | | 310/60 |
| 2014/0217842 A1* | 8/2014 | Kikuchi | ............ | H02K 9/19 |
| | | | | 310/54 |
| 2014/0346905 A1* | 11/2014 | Matsui | ............ | H02K 9/19 |
| | | | | 310/54 |
| 2015/0180313 A1* | 6/2015 | Hayashi | ............ | H02K 1/32 |
| | | | | 310/54 |

* cited by examiner

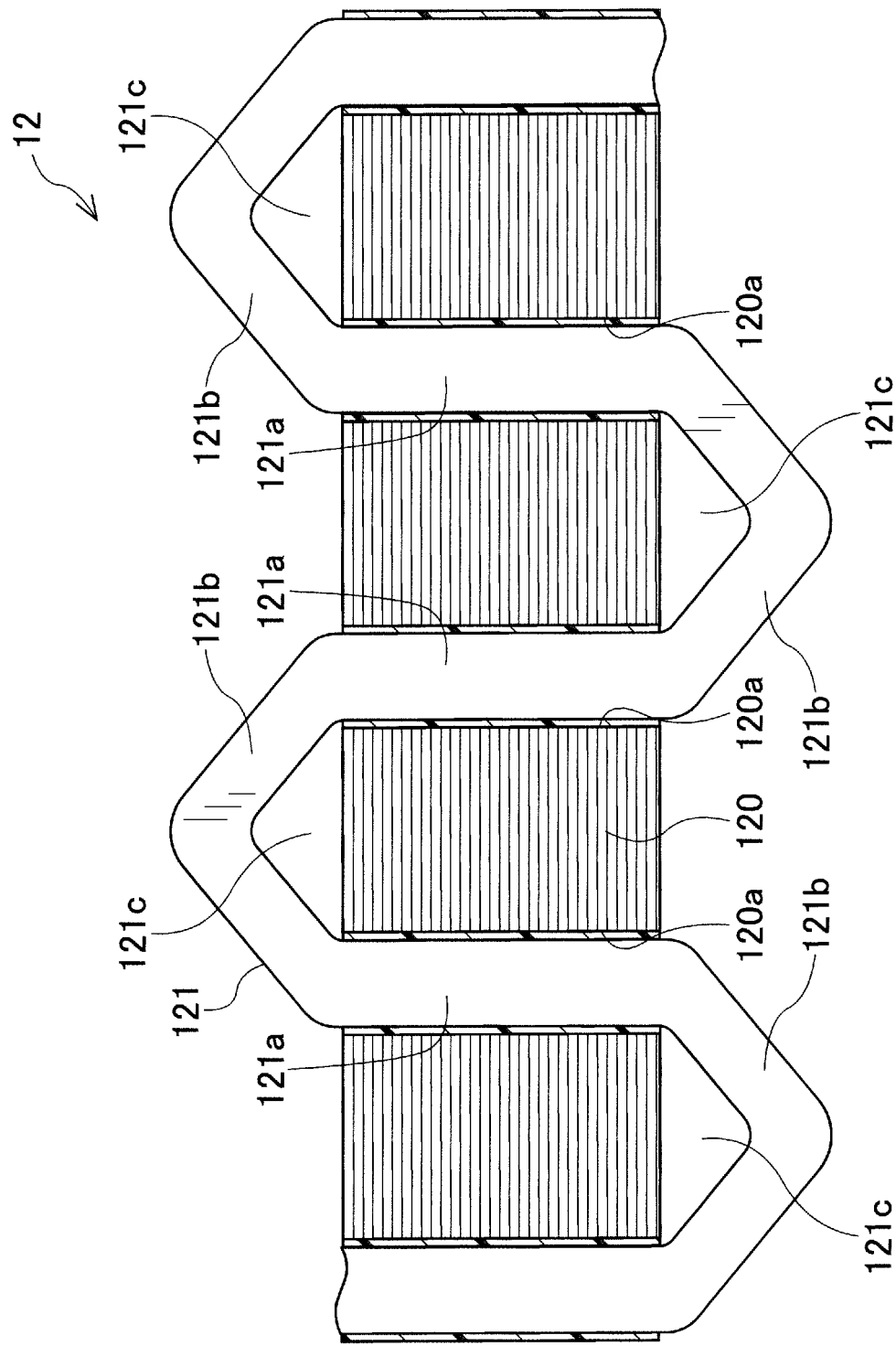

ROTATING ELECTRIC MACHINE

CROSS-REFERENCE TO RELATED APPLICATIONS

This application is based on and claims priority from Japanese Patent Applications No. 2016-75757 filed on Apr. 5, 2016 and No. 2016-237956 filed on Dec. 7, 2016, the contents of which are hereby incorporated by reference in their entireties into this application.

BACKGROUND

1. Technical Field

The present invention relates to rotating electric machines which include a rotor, a stator, a housing and a liquid coolant provided in an internal space formed in the housing.

2. Description of Related Art

There are known rotating electric machines which include a rotor, a stator, a housing and a liquid coolant provided in an internal space formed in the housing.

For example, Japanese Patent Application Publication No. JP2009261137A discloses an electric unit (or rotating electric machine) which includes a rotor, a stator, a case (or housing) and lubricating oil (or liquid coolant).

The rotor has an oil accumulating portion formed therein. The stator is arranged so that a radially inner peripheral surface of the stator radially faces a radially outer peripheral surface of the rotor through an annular gap formed therebetween. The case receives both the rotor and the stator therein and rotatably supports the rotor. The lubricating oil is provided in an internal space formed in the case. The electric unit is disposed so that an axial direction of the rotor coincides with a horizontal direction. When the rotor is in a stationary state, the lubricating oil flows into the annular gap between the radially inner peripheral surface of the stator and the radially outer peripheral surface of the rotor in a lower part of the electric unit.

When the rotor rotates, the lubricating oil is retained in the entire oil accumulating portion of the rotor due to the centrifugal force. Consequently, the surface level of the lubricating oil in the internal space is lowered, thereby suppressing the agitation loss caused by the rotor agitating the lubricating oil during its rotation.

However, in the above electric unit, during rotation of the rotor, though the surface level of the lubricating oil in the internal space is lowered, there still remains the lubricating oil in the annular gap between the radially inner peripheral surface of the stator and the radially outer peripheral surface of the rotor in the lower part of the electric unit. Therefore, it is impossible to reduce the loss that is caused, during rotation of the rotor, by the shearing force of the lubricating oil which has flowed into the annular gap between the radially inner peripheral surface of the stator and the radially outer peripheral surface of the rotor. Moreover, with rotation of the rotor, the lubricating oil having adhered to side surfaces (or axial end faces) of the rotor is discharged radially outward. However, part of the discharged lubricating oil cannot reach coil end portions of the stator which are the cooling targets, but directly reaches the case. Consequently, the efficiency of cooling the coil end portions by the lubricating oil with respect to the work of agitating up the lubricating oil by the rotor is lowered.

SUMMARY

According to exemplary embodiments, there is provided a rotating electric machine which includes a rotating shaft, a rotor, a stator, a housing, a liquid coolant and a flow direction regulating member. The rotor is fixed on the rotating shaft. The stator is arranged so that a radially inner peripheral surface of the stator radially faces a radially outer peripheral surface of the rotor through an annular gap formed therebetween. The housing covers both axial ends of the stator and rotatably supports the rotating shaft. The liquid coolant is provided in an internal space formed in the housing to flow into at least part of the annular gap formed between the radially inner peripheral surface of the stator and the radially outer peripheral surface of the rotor. The flow direction regulating member is provided to axially face an axial end face of the rotor through an axial gap formed therebetween and regulate the flow direction of the coolant by means of the axial gap.

With the above configuration, the coolant enters the axial gap formed between the flow direction regulating member and the axial end face of the rotor and accumulates in the axial gap. Moreover, with rotation of the rotor, the coolant in the axial gap is discharged by the centrifugal force of the rotor radially outward. Consequently, negative pressure is created by the Venturi effect, causing the coolant, which has flowed into at least part of the annular gap between the radially inner peripheral surface of the stator and the radially outer peripheral surface of the rotor, to be discharged radially outward. As a result, it is possible to reduce the loss that is caused, during rotation of the rotor, by the shearing force of the coolant which has flowed into at least part of the annular gap between the radially inner peripheral surface of the stator and the radially outer peripheral surface of the rotor. Moreover, since the coolant agitated up by the rotor in the axial gap is kept from making contact with a coolant pool formed in the internal space, it is also possible to reduce the loss caused by the shearing force of the coolant at the axial end face of the rotor. Furthermore, with the coolant discharged from the annular gap between the radially inner peripheral surface of the stator and the radially outer peripheral surface of the rotor, it is possible to more effectively cool coil end portions of the stator. In addition, since the amount of the coolant in the axial gap is limited as the rotational speed of the rotor increases, it is possible to suppress the agitation loss caused by the rotor agitating the coolant from increasing with the rotational speed.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 2 is a cross-sectional view of a stator of the rotating electric machine according to the first embodiment, the cross-sectional view being taken along a circumferential direction of a stator core of the stator and viewed from radially inside the stator core;

DESCRIPTION OF EMBODIMENTS

Figure 1A:
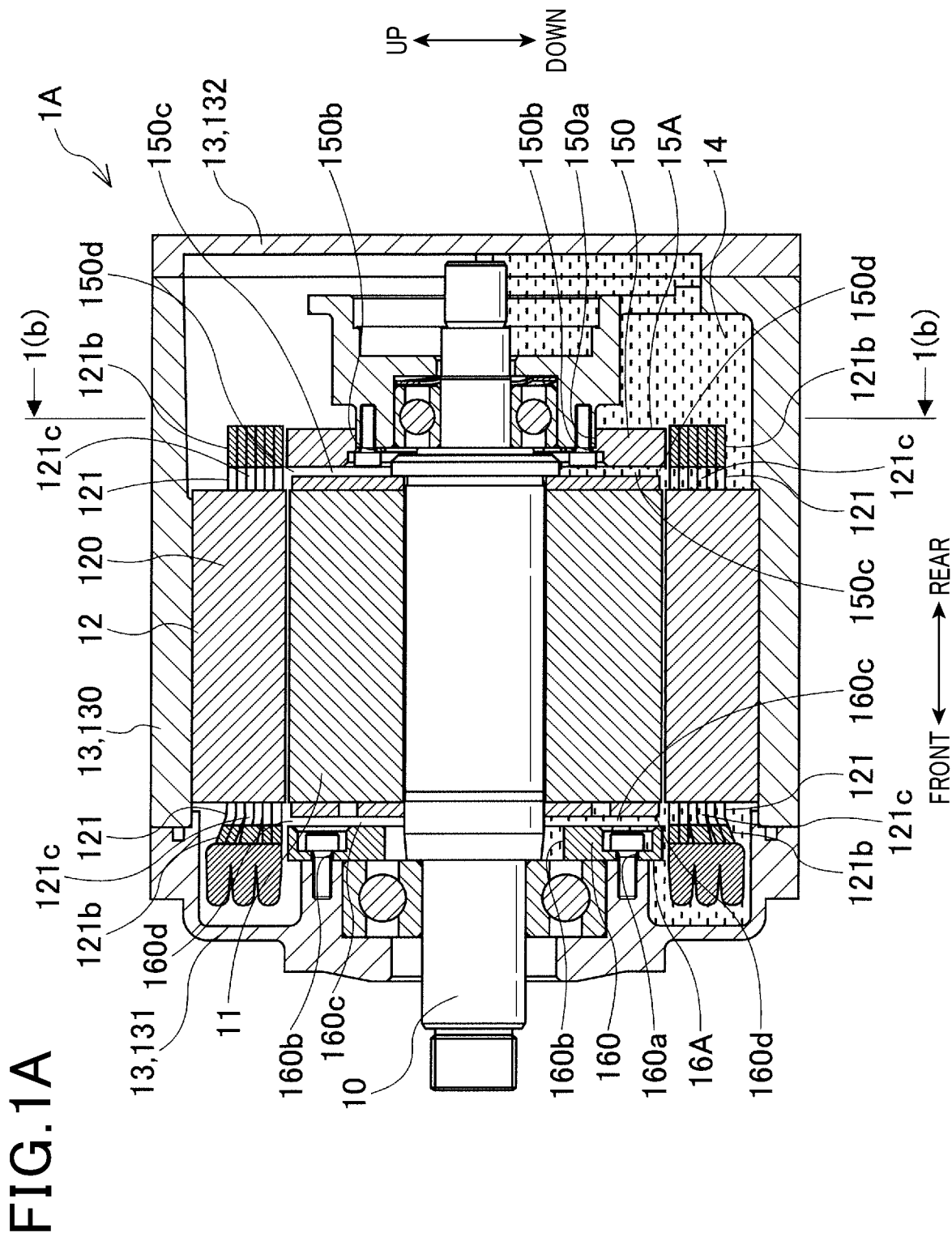
FIG. 1A is a cross-sectional view, taken along an axial direction, of a rotating electric machine according to a first embodiment.

Exemplary embodiments will be described hereinafter with reference to FIGS. 1-86. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

The configuration of a rotating electric machine 1A according to a first embodiment will be described with reference to FIGS. 1A-1B and 2-9. It should be noted that for the sake of convenience of explanation, "front", "rear", "up" and "down" are used in these figures to distinguish directions. It also should be noted that for the sake of ease of understanding, those parts of the rotating electric machine 1A which are actually immersed in liquid coolant are also shown with continuous lines in FIGS. 1A and 9.

In the present embodiment, the rotating electric machine 1A is configured as a motor-generator for use in a motor vehicle. Specifically, upon being supplied with electric power from a battery (not shown) of the vehicle, the rotating electric machine 1A functions as an electric motor to generate torque (or driving force) for driving the vehicle. Otherwise, upon being supplied with torque from an engine (not shown) of the vehicle, the rotating electric machine 1A functions as an electric generator to generate electric power for charging the battery.

As shown in FIG. 1A, the rotating electric machine 1A includes a rotating shaft 10, a rotor 11, a stator 12, a housing 13, a coolant 14 and flow direction regulating members (or flow direction regulators) 15A and 16A.

The rotating shaft 10 has the rotor 11 fixed thereon so as to rotate together with the rotor 11. The rotating shaft 10 has a cylindrical shape and is made of metal, resin or a metal-resin composite.

The rotor 11 has an annular (or hollow cylindrical) shape and includes a plurality of permanent magnets. The rotor 11 constitutes part of a magnetic circuit formed in the rotating electric machine 1A. When magnetic flux through the rotor 11 is generated by the stator 12, the rotor 11 generates torque. Otherwise, when rotated by torque supplied by the engine of the vehicle, the rotor 11 generates magnetic flux passing through a stator coil 121 (to be described later), thereby inducing alternating current in the stator coil 121. The rotor 11 is annular in shape.

The stator 12 constitutes part of the magnetic circuit formed in the rotating electric machine 1A. When supplied with electric current, the stator 12 generates magnetic flux. Otherwise, when magnetic flux through the stator 12 is generated by the rotor 11, the stator 12 generates alternating current.

The stator 12 includes a stator core 120 and the aforementioned stator coil 121.

The stator core 120 has an annular (or hollow cylindrical) shape and is made of a magnetic material. As shown in FIG. 2, the stator core 120 has a plurality of slots 120a that each axially penetrate the stator core 120 and are spaced at a predetermined pitch in the circumferential direction of the stator core 120. Moreover, as shown in FIG. 1A, the stator core 120 is arranged so that a radially inner peripheral surface of the stator core 120 radially faces a radially outer peripheral surface of the rotor 11 through an annular gap formed therebetween.

As shown in FIG. 2, the stator coil 121 includes a plurality of in-slot portions 121a and a plurality of coil end portions (or turn portions) 121b. Each of the in-slot portions 121a is received in one of the slots 120a of the stator core 120. Each of the coil end portions 121b is substantially V-shaped (or U-shaped) and axially protrudes from a corresponding one of axial end faces of the stator core 120. Each of the coil end portions 121b connects one circumferentially-adjacent pair of the in-slot portions 121a. Moreover, the stator 12 includes a plurality of space portions 121c each of which is defined by one of the coil end portions 121b of the stator coil 121 and the corresponding axial end face of the stator core 120.

Referring back to FIG. 1A, the housing 13 receives both the rotor 11 and the stator 12 therein. Moreover, the housing 13 covers both the axial ends of the stator 12 and rotatably supports the rotating shaft 10. In the present embodiment, the housing 13 is comprised of a center housing 130, a front housing 131 and a rear housing 132.

The center housing 130 is made of metal and has a hollow cylindrical shape. The center housing 130 receives both the rotor 11 and the stator 12 therein and rotatably supports a rear end portion of the rotating shaft 10. Moreover, a radially outer peripheral surface of the stator core 120 is fixed to a radially inner peripheral surface of the center housing 130. The rear end portion of the rotating shaft 10 is rotatably supported by the center housing 130 via a bearing.

The front housing 131 is also made of metal and has a bottomed cylindrical shape. The front housing 131 is fixed to the center housing 130 so as to cover a front opening of the center housing 130. Moreover, a front end portion of the rotating shaft 10 is rotatably supported by the front housing 131 via a bearing.

The rear housing 132 is also made of metal and has a bottomed cylindrical shape. The rear housing 132 is fixed to the center housing 130 so as to cover a rear opening of the center housing 130.

The coolant 14 is provided in an internal space formed in the housing 13. The coolant 14 is a liquid material for cooling the rotor 11 and the stator 12. More particularly, in the present embodiment, the coolant 14 is implemented by oil. The coolant 14 is provided in the internal space by: (1) placing the rotating electric machine 1A so that an axial direction of the rotating shaft 10 coincides with a horizontal direction (or the front-rear direction in FIG. 1A); and (2) injecting the coolant 14 into the internal space, with the rotating shaft 10 and the rotor 11 in a stationary state, until the surface level of the coolant 14 in the internal space becomes almost flush with a central axis of the rotating shaft 10. In a lower part of the rotating electric machine 1A below the central axis of the rotating shaft 10, the components of the rotating electric machine 1A received in housing 13 are immersed in the coolant 14. Moreover, in the lower part of the rotating electric machine 1A, the coolant 14 flows into the annular gap between the radially outer peripheral surface of the rotor 11 and the radially inner peripheral surface of the stator 12.

Figure 3:
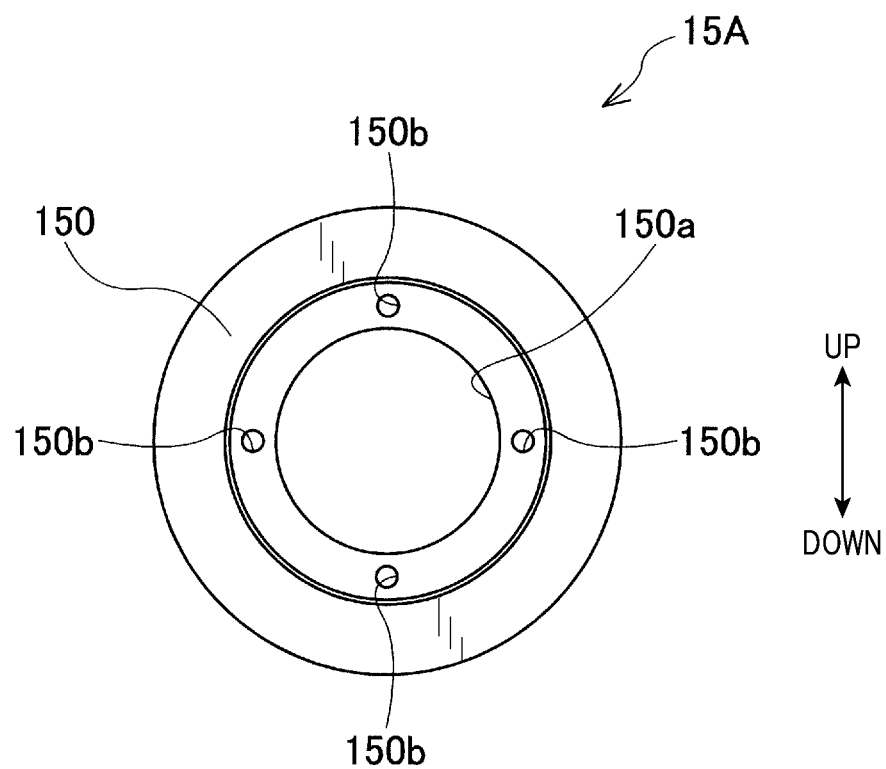
FIG. 3 is a front view of a rear flow direction regulating member of the rotating electric machine according to the first embodiment.
Figure 4:
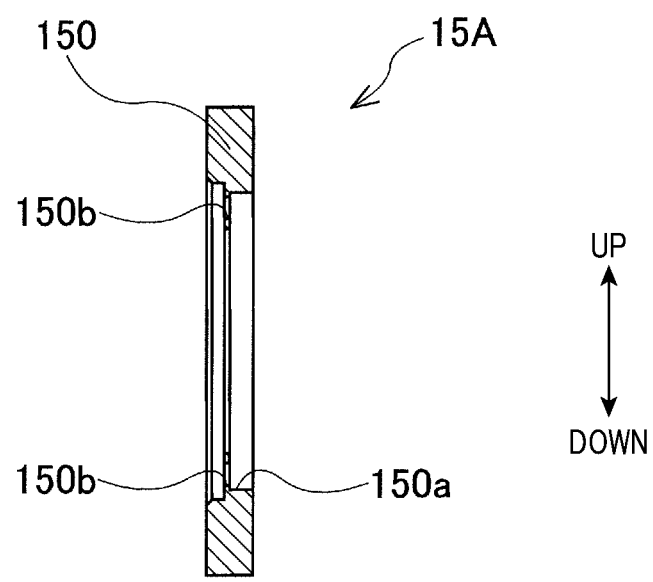
FIG. 4 is a cross-sectional view, taken along the axial direction, of the rear flow direction regulating member of the rotating electric machine according to the first embodiment.
Figure 5:
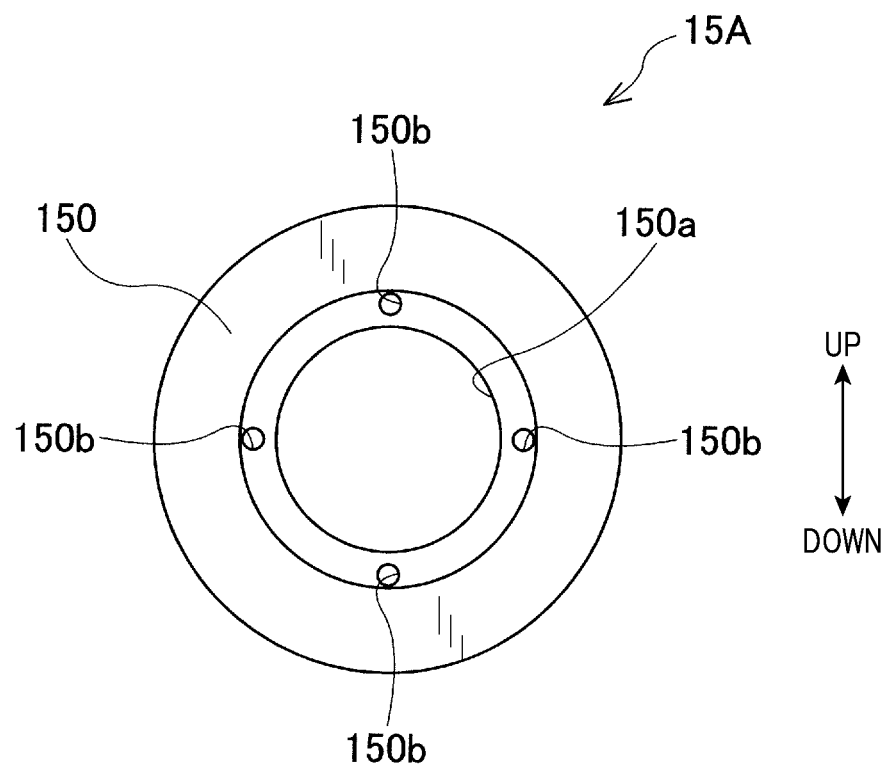
FIG. 5 is a rear view of the rear flow direction regulating member of the rotating electric machine according to the first embodiment.

The flow direction regulating member 15A is arranged on the rear side of the rotor 11 to regulate the flow direction of the coolant 14 on the rear side. The flow direction regulating member 15A is made of metal, resin or a metal-resin composite. The flow direction regulating member 15A includes a main body 150 as shown in FIGS. 3-5.

The main body 150 has a substantially discoid shape. The main body 150 has a planar surface facing a rear end face of the rotor 11. The main body 150 has a rotating shaft insertion hole 150a and a plurality (e.g., four) of bolt insertion holes 150b.

The rotating shaft insertion hole 150a is a circular hole into which the rotating shaft 10 is inserted. The rotating shaft insertion hole 150a is formed in a central part of the main body 150.

The bolt insertion holes 150b are circular holes into which bolts for fixing the main body 150 are respectively inserted. The bolt insertion holes 150b are formed radially outside the rotating shaft insertion hole 150a and circumferentially spaced from one another at equal intervals.

As shown in FIG. 1A, the flow direction regulating member 15A is arranged, with the rotating shaft 10 inserted in the rotating shaft insertion hole 150a, to axially face the rear end face of the rotor 11 through an axial gap 150c formed therebetween. Moreover, the flow direction regulating member 15A is fixed to the center housing 130 by the bolts respectively inserted in the bolt insertion holes 150b. The flow direction regulating member 15A regulates the flow direction of the coolant 14 on the rear side of the rotor 11 by means of the axial gap 150c formed between the flow direction regulating member 15A and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

Figure 6:
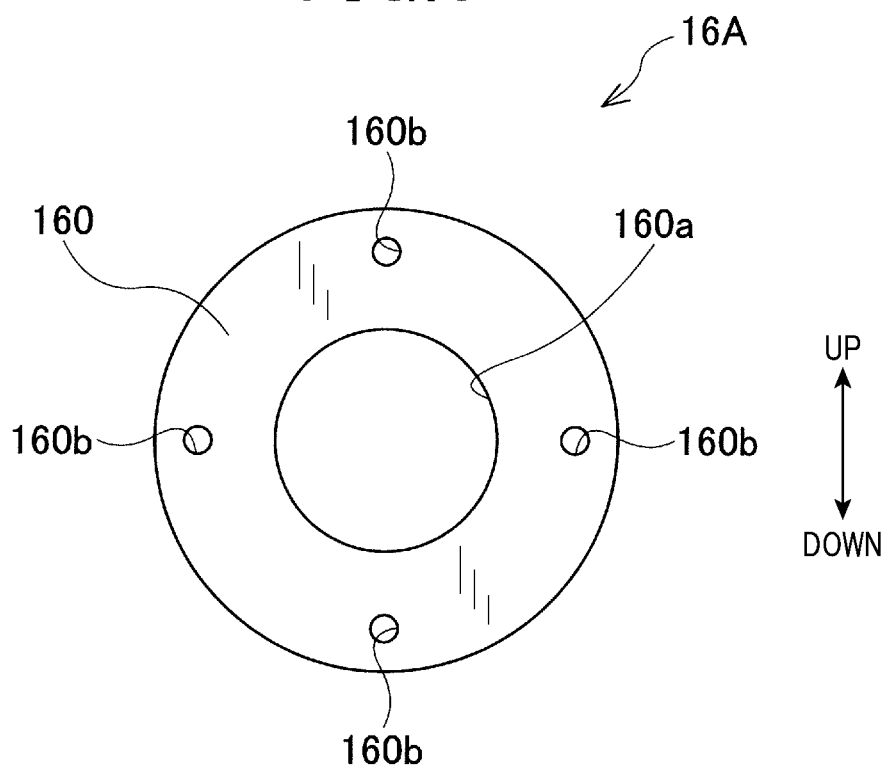
FIG. 6 is a front view of a front flow direction regulating member of the rotating electric machine according to the first embodiment.
Figure 7:
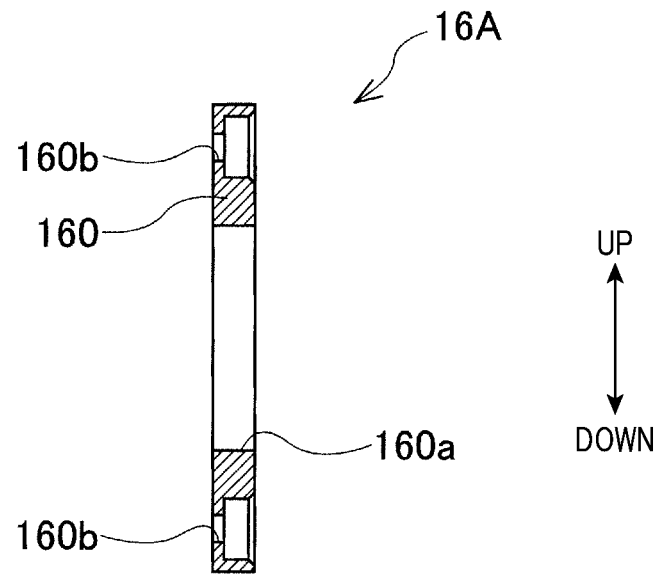
FIG. 7 is a cross-sectional view, taken along the axial direction, of the front flow direction regulating member of the rotating electric machine according to the first embodiment.
Figure 8:
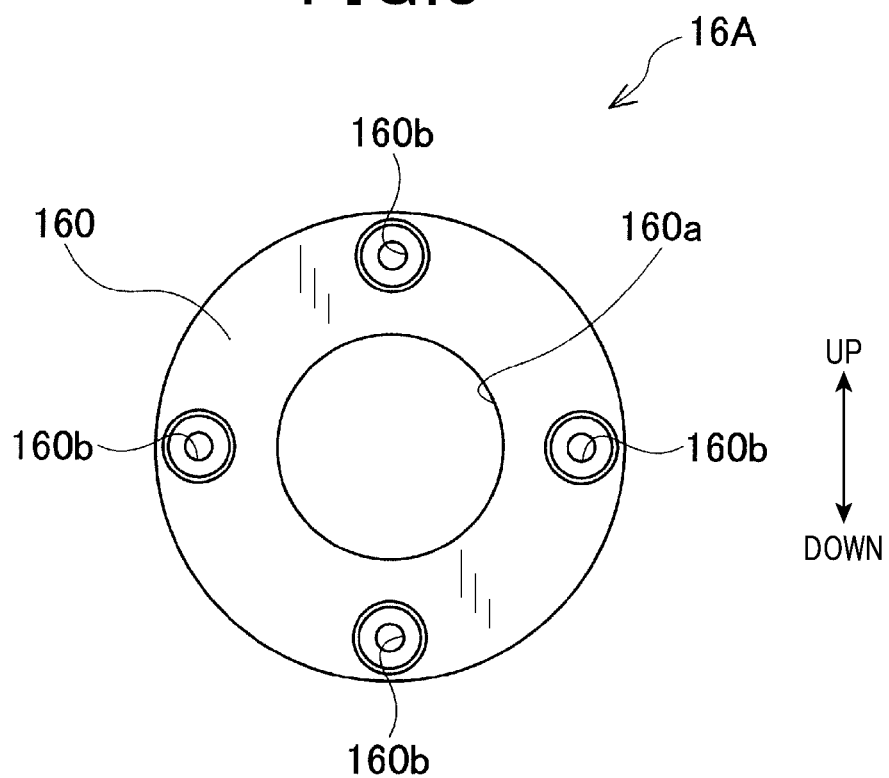
FIG. 8 is a rear view of the front flow direction regulating member of the rotating electric machine according to the first embodiment.

On the other hand, the flow direction regulating member 16A is arranged on the front side of the rotor 11 to regulate the flow direction of the coolant 14 on the front side. The flow direction regulating member 16A is made of metal, resin or a metal-resin composite. The flow direction regulating member 16A includes a main body 160 as shown in FIGS. 6-8.

The main body 160 has a substantially discoid shape. The main body 160 has a planar surface facing a front end face of the rotor 11. The main body 160 has a rotating shaft insertion hole 160a and a plurality (e.g., four) of bolt insertion holes 160b.

The rotating shaft insertion hole 160a is a circular hole into which the rotating shaft 10 is inserted. The rotating shaft insertion hole 160a is formed in a central part of the main body 160.

The bolt insertion holes 160b are circular holes into which bolts for fixing the main body 160 are respectively inserted. The bolt insertion holes 160b are formed radially outside the rotating shaft insertion hole 160a and circumferentially spaced from one another at equal intervals.

As shown in FIG. 1A, the flow direction regulating member 16A is arranged, with the rotating shaft 10 inserted in the rotating shaft insertion hole 160a, to axially face the front end face of the rotor 11 through an axial gap 160c formed therebetween. Moreover, the flow direction regulating member 16A is fixed to the front housing 131 by the bolts respectively inserted in the bolt insertion holes 160b. The flow direction regulating member 16A regulates the flow direction of the coolant 14 on the front side of the rotor 11 by means of the axial gap 160c formed between the flow direction regulating member 16A and the front end face of the rotor 11. In addition, the axial gap 160c is axially positioned so that an opening 160d of the axial gap 160c, which is located at the radially outer periphery of the axial gap 160c, radially faces the coil end portions 121b and the space portions 121c on the front side of the stator core 120.

Next, operation of the rotating electric machine 1A according to the present embodiment will be described.

As mentioned previously, in the present embodiment, the rotating electric machine 1A is configured as a motor-generator that selectively operates in either a motor mode or a generator mode.

In the motor mode, electric power is supplied from the battery of the vehicle to the stator coil 121. Consequently, electric current flows in the stator coil 121, generating magnetic flux. The generated magnetic flux passes through the rotor 11, causing the rotor 11 to rotate and generate torque for driving the vehicle.

In the generator mode, the rotor 11 is rotated by torque supplied from the engine of the vehicle, generating magnetic flux. The generated magnetic flux passes through the stator coil 121, inducing alternating current in the stator coil 121. The alternating current is then rectified into direct current, and the obtained direct current is used to charge the battery of the vehicle.

The above-described rotating electric machine 1A according to the present embodiment has the following advantages.

In the present embodiment, the rotating electric machine 1A includes the rotating shaft 10, the rotor 11, the stator 12, the housing 13, the liquid coolant 14 and the flow direction regulating members 15A and 16A. The rotor 11 is fixed on the rotating shaft 10. The stator 12 is arranged so that the radially inner peripheral surface of the stator 12 radially faces the radially outer peripheral surface of the rotor 11 through the annular gap formed therebetween. The housing 13 covers both the axial ends of the stator 12 and rotatably supports the rotating shaft 10. The coolant 14 is provided in the internal space formed in the housing 13 and has flowed into at least part of the annular gap formed between the radially inner peripheral surface of the stator 12 and the radially outer peripheral surface of the rotor 11. The flow direction regulating member 15A is provided to axially face the rear end face of the rotor 11 (i.e., the rear one of axial end faces of the rotor 11) through the axial gap 150c formed therebetween and regulate the flow direction of the coolant 14 on the rear side of the rotor 11 by means of the axial gap 150c. The flow direction regulating member 16A is provided to axially face the front end face of the rotor 11 (i.e., the front one of axial end faces of the rotor 11) through the axial gap 160c formed therebetween and regulate the flow direction of the coolant 14 on the front side of the rotor 11 by means of the axial gap 160c.

Figure 1B:
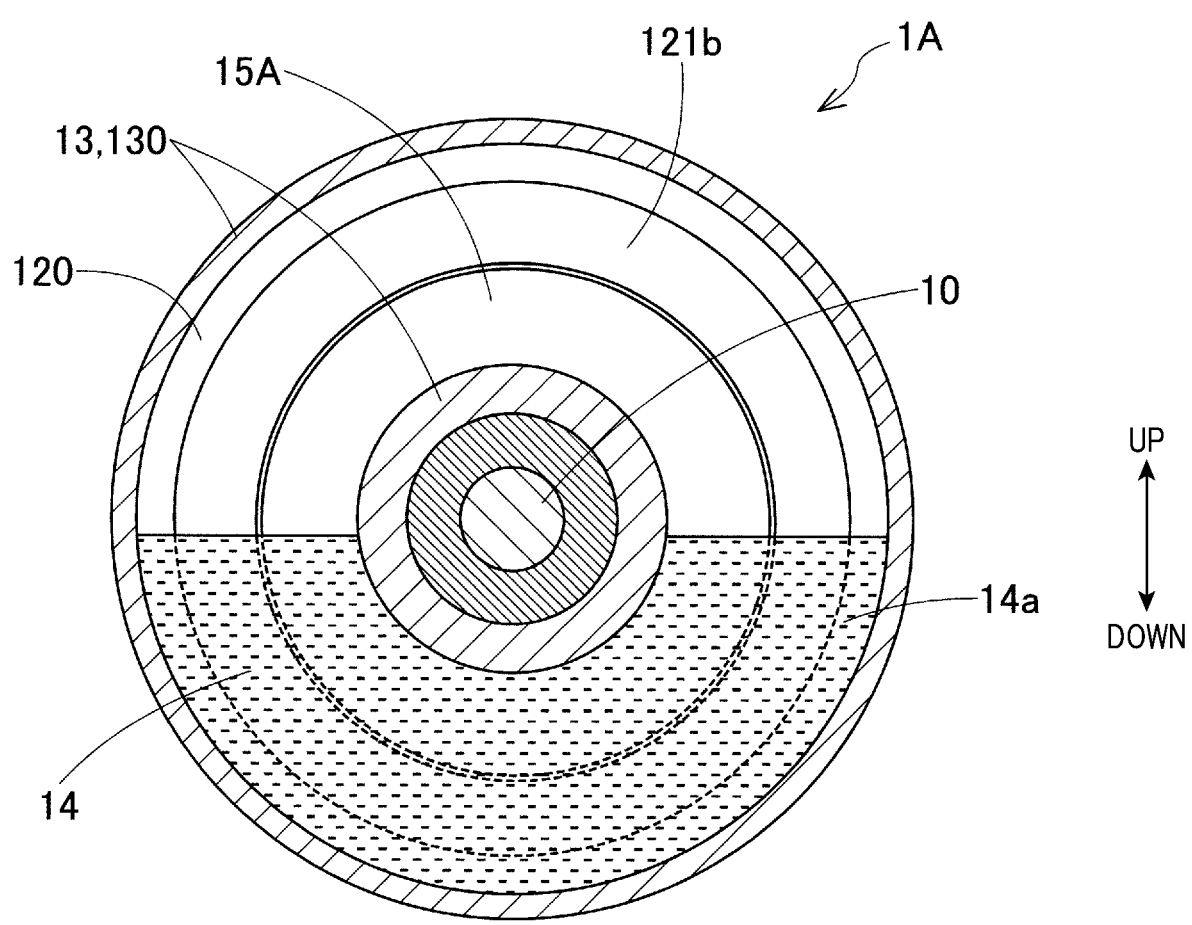
FIG. 1B is a cross-sectional view taken along the line 1(b)-1(b) in FIG. 1A.
Figure 9:
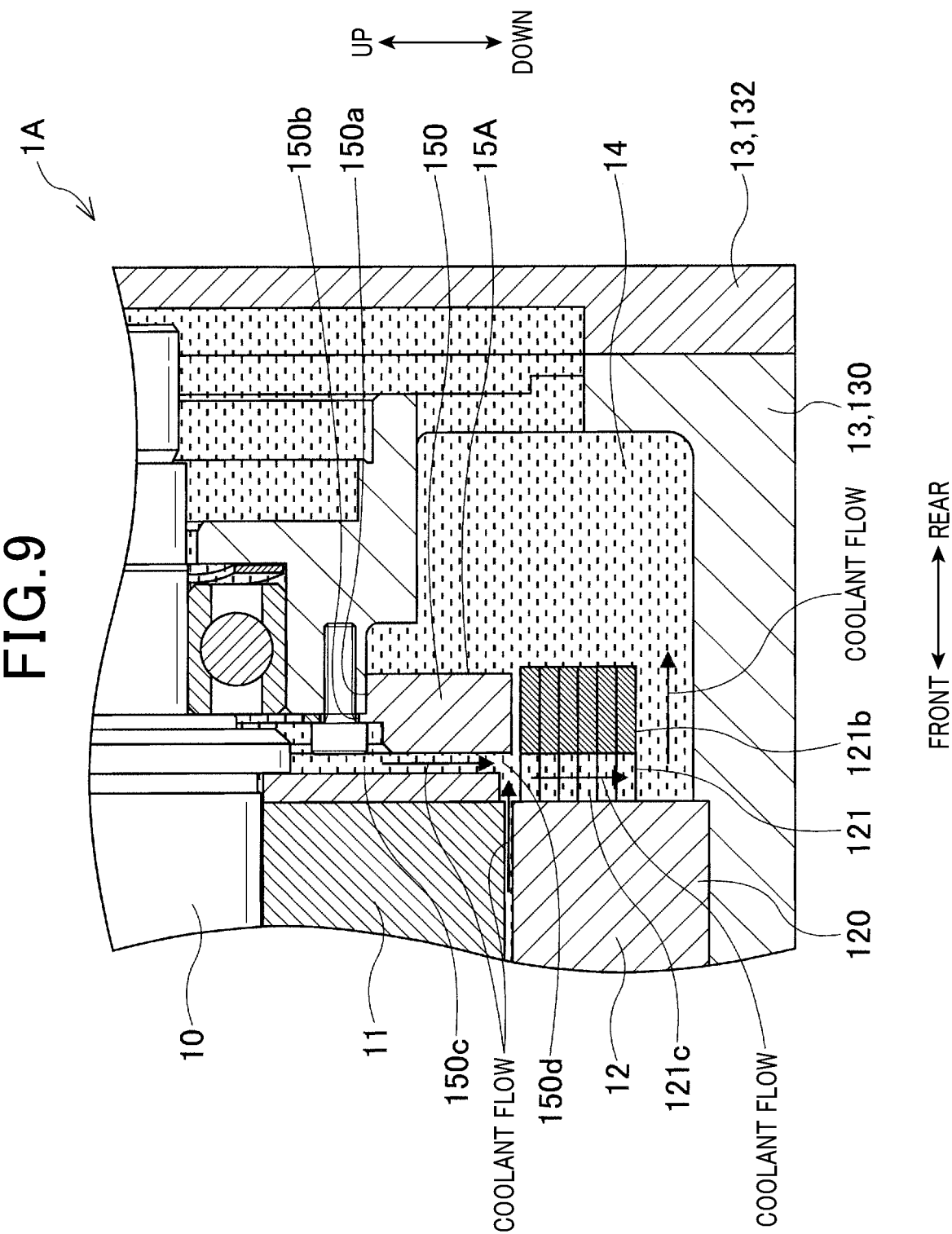
FIG. 9 is an enlarged view of a rear lower part of FIG. 1 illustrating the flow of coolant in the rotating electric machine according to the first embodiment.

With the above configuration, on the rear side of the rotor 11, the coolant 14 enters the axial gap 150c formed between the flow direction regulating member 15A and the rear end face of the rotor 11 and accumulates in the axial gap 150c. Moreover, as shown in FIG. 9, with rotation of the rotor 11, the coolant 14 in the axial gap 150c is discharged by the centrifugal force of the rotor 11 radially outward (i.e., discharged in a direction from the central axis of the rotating shaft 10 to the radially outside of the rotor 11). Consequently, negative pressure is created by the Venturi effect, causing the coolant 14, which has flowed into the annular gap between the radially inner peripheral surface of the stator 12 and the radially outer peripheral surface of the rotor 11, to be discharged radially outward. As a result, it is possible to reduce the loss that is caused, during rotation of the rotor 11, by the shearing force of the coolant 14 which has flowed into the annular gap between the radially inner peripheral surface of the stator 12 and the radially outer peripheral surface of the rotor 11. Moreover, since the coolant 14 agitated up by the rotor 11 in the axial gap 150c is kept from making contact with the coolant pool 14a formed in the internal space as shown in FIG. 1B, it is also possible to reduce the loss caused by the shearing force of the coolant 14 at the rear end face of the rotor 11.

On the front side of the rotor 11, it is also possible to reduce the coolant shearing loss (i.e., the loss due to the shearing force of the coolant 14) in the same manner as on the rear side.

Figure 10:
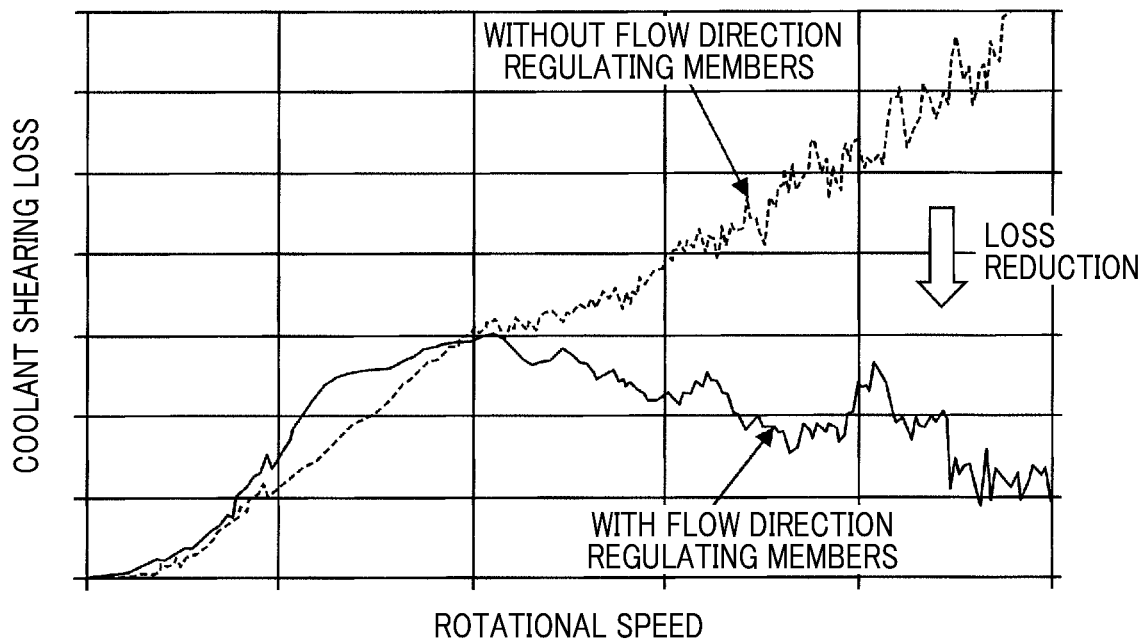
FIG. 10 is a graphical representation showing the relationship between rotational speed and coolant shearing loss and illustrating the effect of the flow direction regulating members on reduction of coolant shearing loss in the rotating electric machine according to the first embodiment.

FIG. 10 illustrates the effect of the flow direction regulating members 15A and 16A on reduction of the coolant shearing loss. Specifically, as shown in FIG. 10, without the flow direction regulating members 15A and 16A, the coolant shearing loss increases with the rotational speed of the rotor 11. In contrast, with the flow direction regulating members 15A and 16A, it is possible to remarkably reduce the coolant shearing loss.

Figure 11:
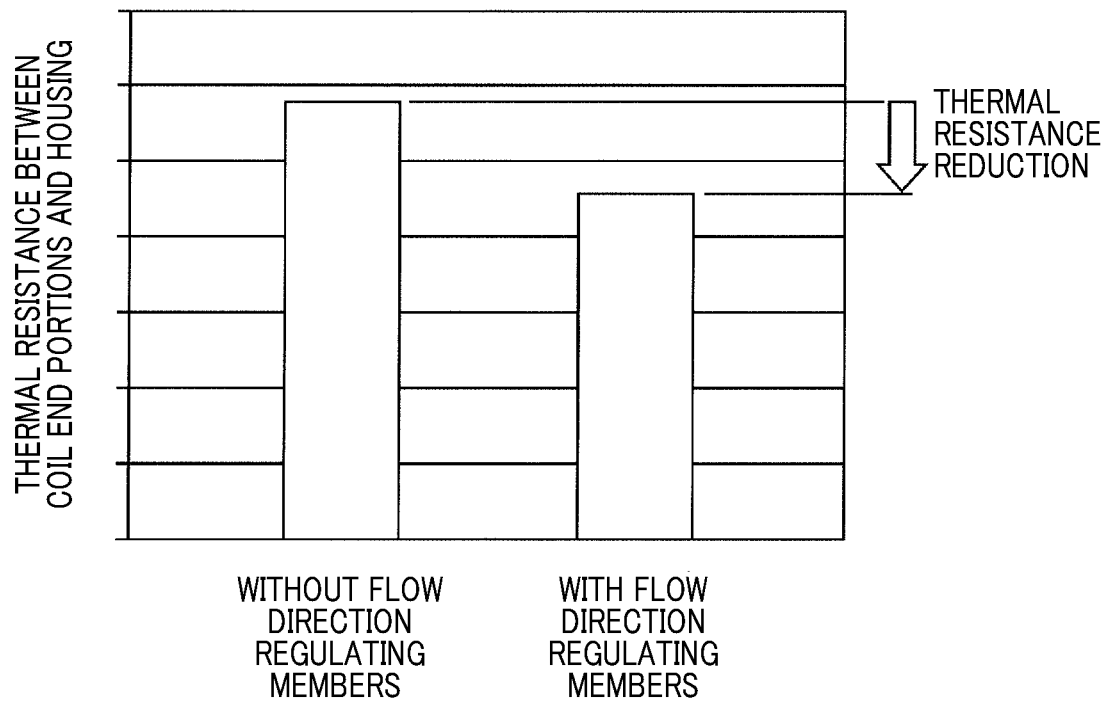
FIG. 11 is a graphical representation illustrating the effect of the flow direction regulating members on reduction of the thermal resistance between coil end portions and a housing in an upper part of the rotating electric machine according to the first embodiment.

Moreover, with the coolant 14 discharged from the annular gap between the radially inner peripheral surface of the stator 12 and the radially outer peripheral surface of the rotor 11, it is possible to more effectively cool the coil end portions 121b of the stator coil 121. As a result, as shown in FIG. 11, it is possible to considerably reduce the thermal resistance between the coil end portions 121b and the housing 13 in an upper part of the rotating electric machine 1A in comparison with the case of having no flow direction regulating members.

Furthermore, since the amount of the coolant 14 in the axial gaps 150c and 160c is limited as the rotational speed of the rotor 11 increases, it is possible to suppress the agitation loss caused by the rotor 11 agitating the coolant 14 from increasing with the rotational speed.

In addition, when the rotational speed of the rotor 11 is low and thus the Venturi effect is small, it is possible to suppress the agitation loss by mixing gas (e.g., air) with the coolant into a foam.

In the present embodiment, the stator 12 includes the stator core 120 and the stator coil 121. The radially inner peripheral surface of the stator core 120 constitutes the radially inner peripheral surface of the stator 12. The stator coil 121 is mounted on the stator core 120 so as to have the coil end portions 121b axially protruding from the corresponding axial end faces of the stator core 120. The opening 150d of the axial gap 150c formed between the flow direction regulating member 15A and the rear end face of the rotor 11 radially faces the coil end portions 121b of the stator coil 121 on the rear side of the stator core 120. The opening 160d of the axial gap 160c formed between the flow direction regulating member 16A and the front end face of the rotor 11 radially faces the coil end portions 121b of the stator coil 121 on the front side of the stator core 120.

With the above configuration, on the rear side of the rotor 11, as shown in FIG. 9, the coolant 14 flowing out of the axial gap 150c can be introduced to the coil end portions 121b on the rear side, thereby reliably cooling these coil end portions 121b. Similarly, on the front side of the rotor 11, though not shown in the figures, the coolant 14 flowing out of the axial gap 160c can be introduced to the coil end portions 121b on the front side, thereby reliably cooling these coil end portions 121b.

In the present embodiment, the stator 12 includes the space portions 121c each of which is defined by one of the coil end portions 121b of the stator coil 121 and the corresponding axial end face of the stator core 120. The opening 150d of the axial gap 150c formed between the flow direction regulating member 15A and the rear end face of the rotor 11 radially faces the space portions 121c as well as the coil end portions 121b on the rear side of the stator core 120. The opening 160d of the axial gap 160c formed between the flow direction regulating member 16A and the front end face of the rotor 11 radially faces the space portions 121c as well as the coil end portions 121b on the front side of the stator core 120.

With the above configuration, on the rear side of the rotor 11, as shown in FIG. 9, the coolant 14 flowing out of the axial gap 150c can be introduced to the space portions 121c on the rear side, thereby flowing through the inside of each of the coil end portions 121b on the rear side. Consequently, it is possible to more effectively cool the coil end portions 121b on the rear side. Similarly, on the front side of the rotor 11, though not shown in the figures, the coolant 14 flowing out of the axial gap 160c can be introduced to the space portions 121c on the front side, thereby flowing through the inside of each of the coil end portions 121b on the front side. Consequently, it is possible to more effectively cool the coil end portions 121b on the front side.

In the present embodiment, the flow direction regulating members 15A and 16A are both fixed to the housing 13. Therefore, the flow direction regulating members 15A and 16A are kept stationary. Consequently, it becomes possible to eliminate the loss which otherwise might be caused by movement (or rotation) of the flow direction regulating members 15A and 16A.

Second Embodiment

A rotating electric machine 1B according to a second embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and fixed to the center housing 130 (see FIG. 1A).

Figure 12:
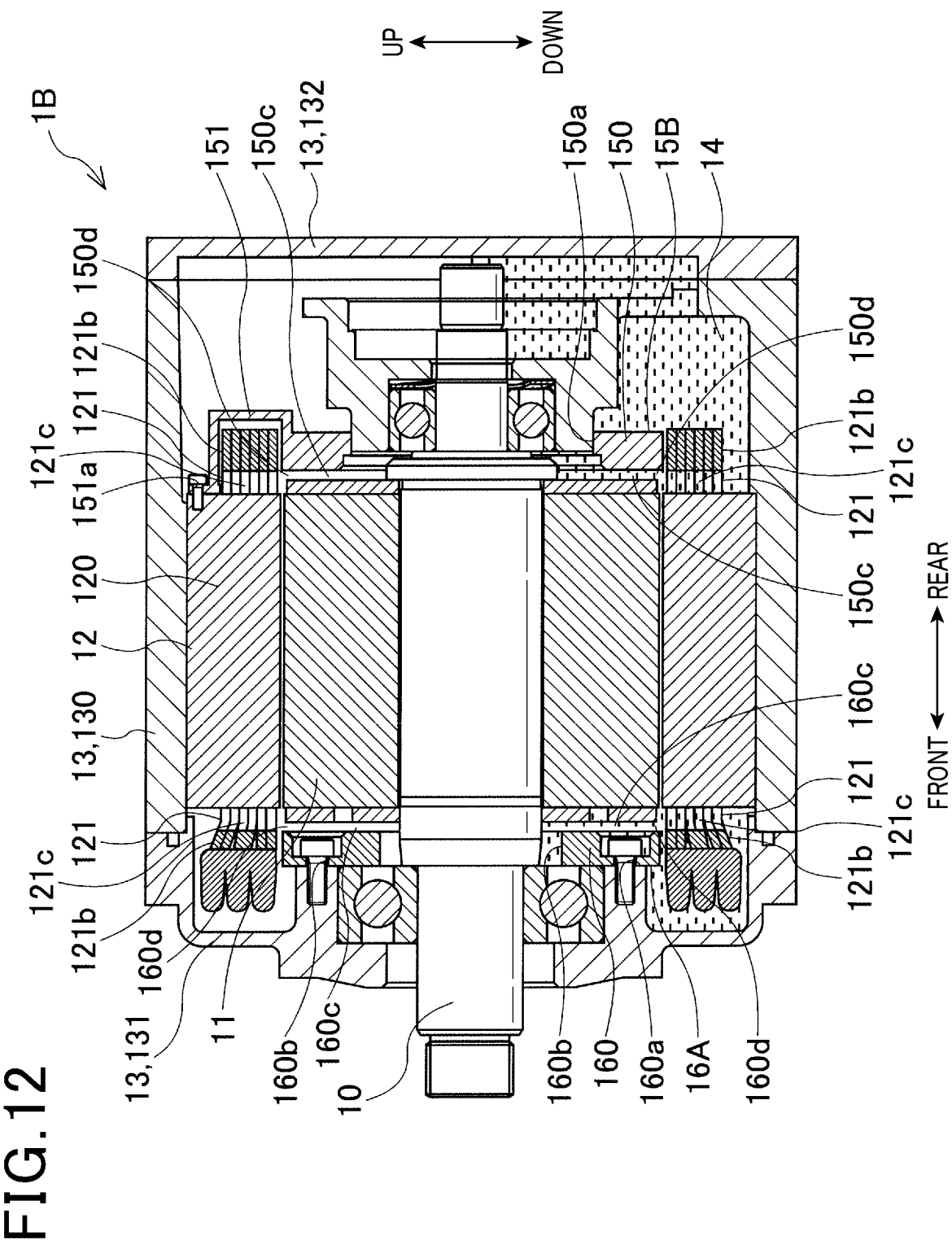
FIG. 12 is a cross-sectional view, taken along an axial direction, of a rotating electric machine according to a second embodiment.

In comparison, in the present embodiment, as shown in FIG. 12, the rotating electric machine 1B includes, instead of the flow direction regulating member 15A, a flow direction regulating member 15B that is arranged on the rear side of the rotor 11 and fixed to the stator 12.

Figure 13:
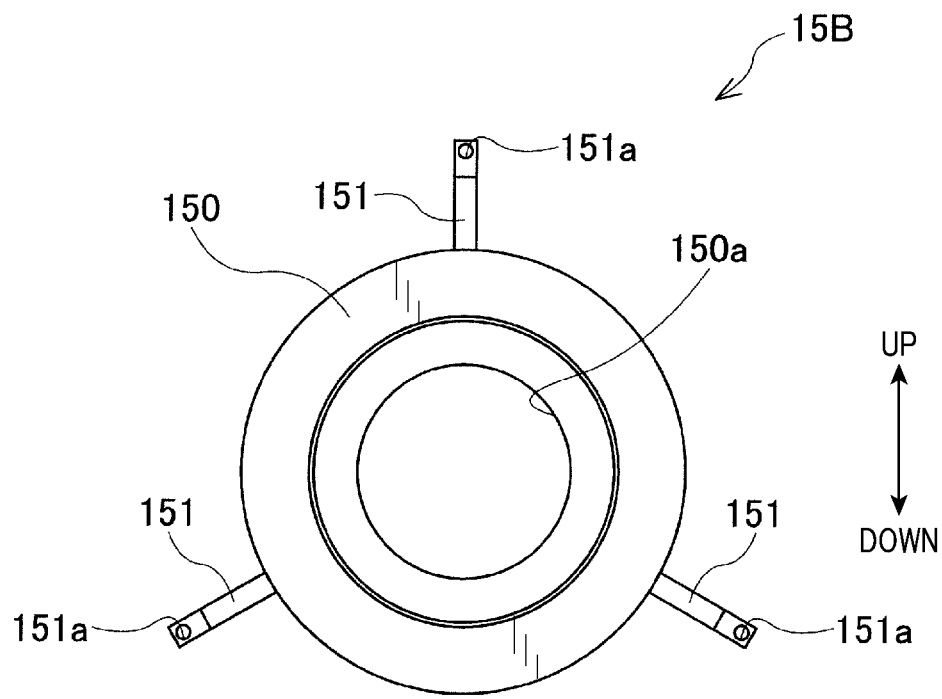
FIG. 13 is a front view of a rear flow direction regulating member of the rotating electric machine according to the second embodiment.
Figure 14:
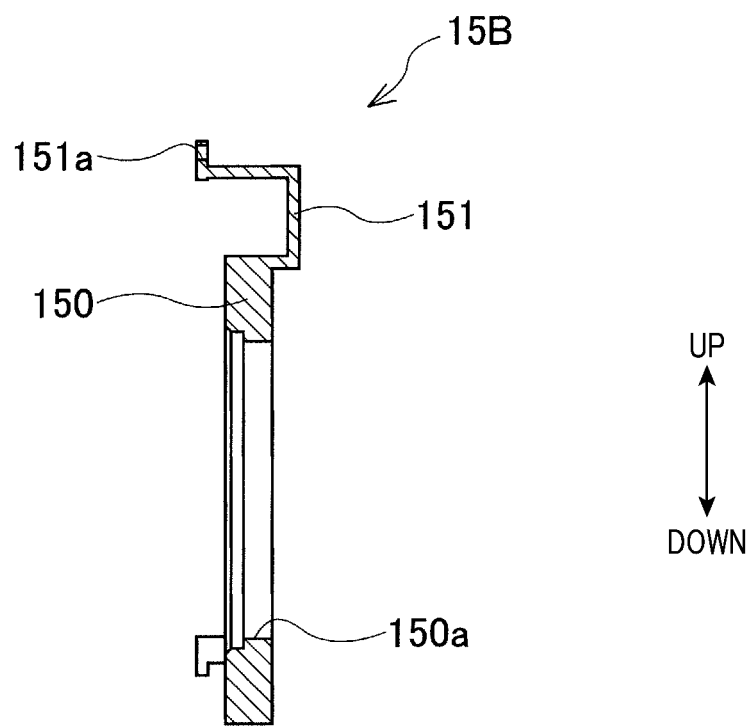
FIG. 14 is a cross-sectional view, taken along the axial direction, of the rear flow direction regulating member of the rotating electric machine according to the second embodiment.
Figure 15:
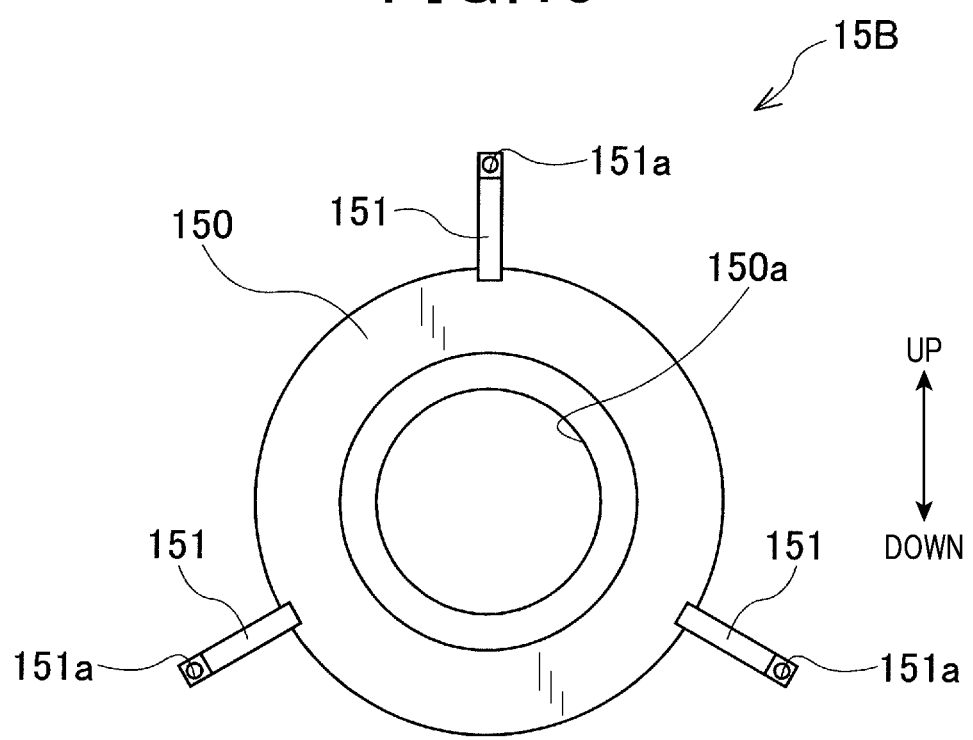
FIG. 15 is a rear view of the rear flow direction regulating member of the rotating electric machine according to the second embodiment.

As shown in FIGS. 13-15, the flow direction regulating member 15B includes a main body 150 and a plurality (e.g., three) of fixing portions 151.

The main body 150 has a substantially discoid shape. The main body 150 has a planar surface facing the rear end face of the rotor 11 and a rotating shaft insertion hole 150a formed in a central part thereof. The rotating shaft insertion hole 150a is a circular hole into which the rotating shaft 10 is inserted.

The fixing portions 151 are formed radially outside the main body 150 and circumferentially spaced from one another at equal intervals. Each of the fixing portions 151 is provided in the form of a bent strip to fix the main body 150 to the stator core 120. Each of the fixing portions 151 has a bolt insertion hole 151a formed in a radially outer end portion thereof. The bolt insertion hole 151a is a circular hole into which a bolt for fixing the fixing portion 151 is inserted.

As shown in FIG. 12, the flow direction regulating member 15B is arranged, with the rotating shaft 10 inserted in the rotating shaft insertion hole 150a, to axially face the rear end face of the rotor 11 through an axial gap 150c formed therebetween. Moreover, the flow direction regulating member 15B is fixed to the stator core 120 by the bolts respectively inserted in the bolt insertion holes 151a. The flow direction regulating member 15B regulates the flow direction of the coolant 14 on the rear side of the rotor 11 by means of the axial gap 150c formed between the flow direction regulating member 15B and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1B according to the present embodiment has the same advantages as the rotating electric machine 1A according to the first embodiment.

In particular, in the rotating electric machine 1B, the flow direction regulating member 15B is fixed to the stator 12. Therefore, the flow direction regulating member 15B is kept stationary. Consequently, it becomes possible to eliminate the loss which otherwise might be caused by movement (or rotation) of the flow direction regulating member 15B.

In addition, it should be noted that for the sake of convenience of explanation, "front", "rear", "up" and "down" are used in FIGS. 12-15 to distinguish directions. It also should be noted that for the sake of ease of understanding, those parts of the rotating electric machine 1B which are actually immersed in the liquid coolant 14 are also shown with continuous lines in FIG. 12.

Third Embodiment

A rotating electric machine 1C according to a third embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and has neither protrusion nor recess formed in its surface facing the rotor 11 (see FIGS. 1A and 3-5).

In comparison, in the present embodiment, as shown in FIGS. 16-19, the rotating electric machine 1C includes, instead of the flow direction regulating member 15A, a flow direction regulating member 15C that is arranged on the rear side of the rotor 11 and has protrusions 150e and recesses 150f formed in its surface facing the rotor 11.

Figure 17:
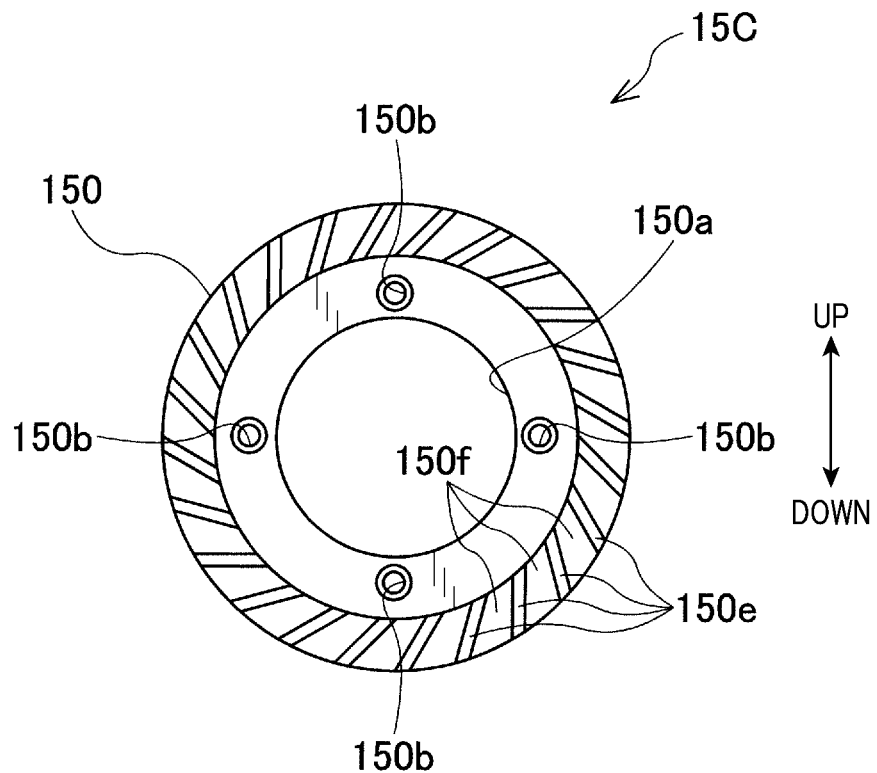
FIG. 17 is a front view of a rear flow direction regulating member of the rotating electric machine according to the third embodiment.
Figure 18:
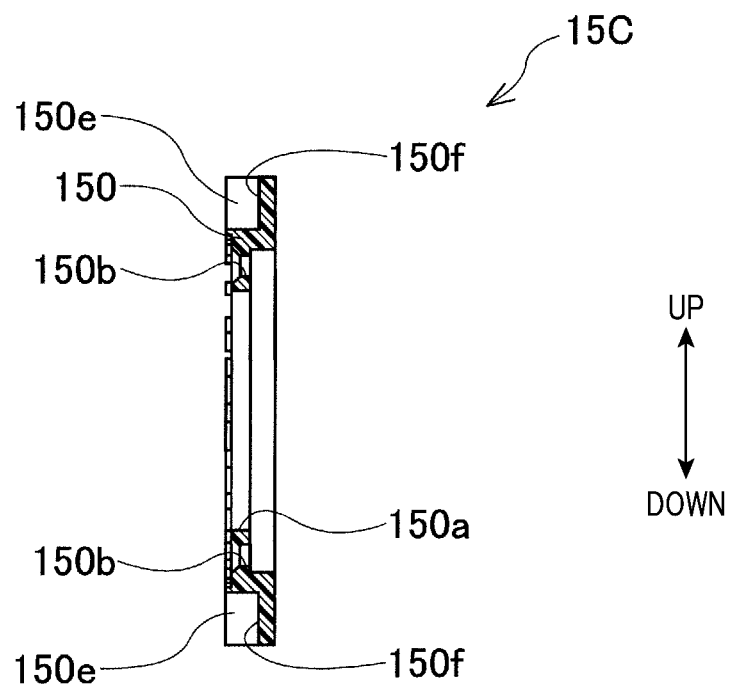
FIG. 18 is a cross-sectional view, taken along the axial direction, of the rear flow direction regulating member of the rotating electric machine according to the third embodiment.
Figure 19:
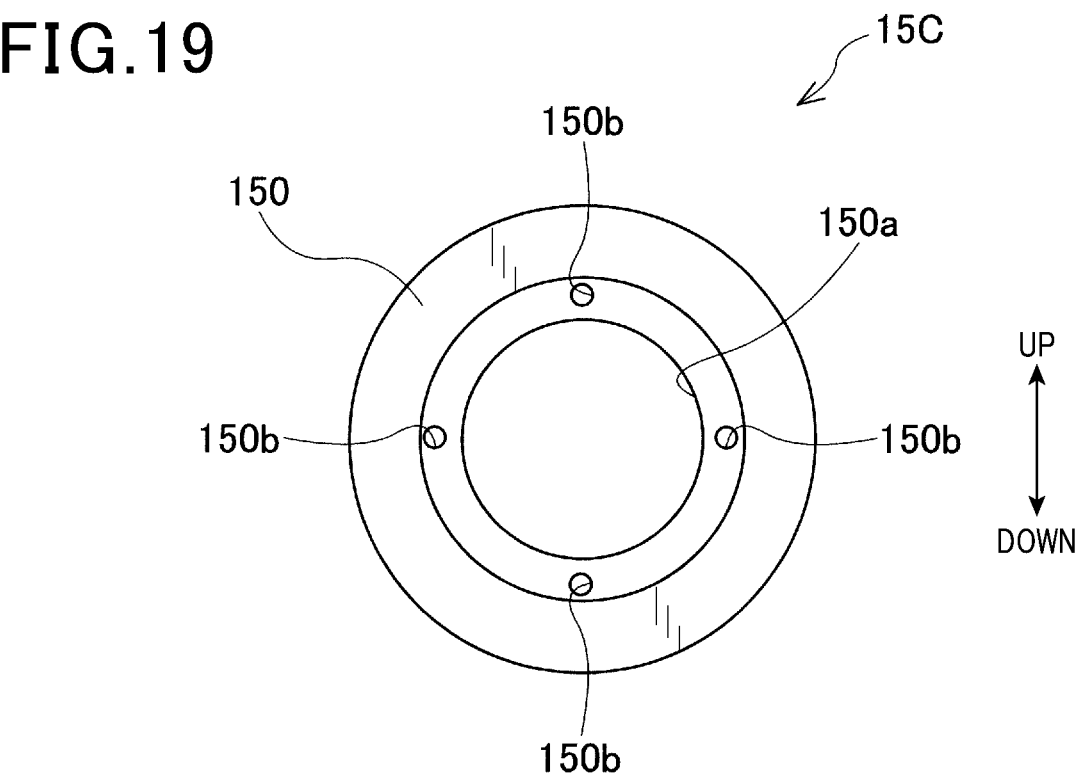
FIG. 19 is a rear view of the rear flow direction regulating member of the rotating electric machine according to the third embodiment.

Specifically, the flow direction regulating member 15C includes a main body 150 as shown in FIGS. 17-19. The main body 150 is made, for example, of resin and has a substantially discoid shape. The main body 150 has a flange portion formed at its rear end. The protrusions 150e and the recesses 150f are formed in a radial pattern in a front surface (or rotor 11-side surface) of the flange portion of the main body 150. Moreover, the protrusions 150e and the recesses 150f are alternately arranged at equal circumferential intervals over the entire circumference of the flange portion.

In addition, the main body 150 also has a rotating shaft insertion hole 150a and a plurality (e.g., four) of screw insertion holes 150b. The rotating shaft insertion hole 150a is a circular hole into which the rotating shaft 10 is inserted. The rotating shaft insertion hole 150a is formed in a central part of the main body 150. The screw insertion holes 150b are circular holes into which screws for fixing the main body 150 are respectively inserted. The screw insertion holes 150b are formed radially outside the rotating shaft insertion hole 150a and circumferentially spaced from one another at equal intervals.

Figure 16:
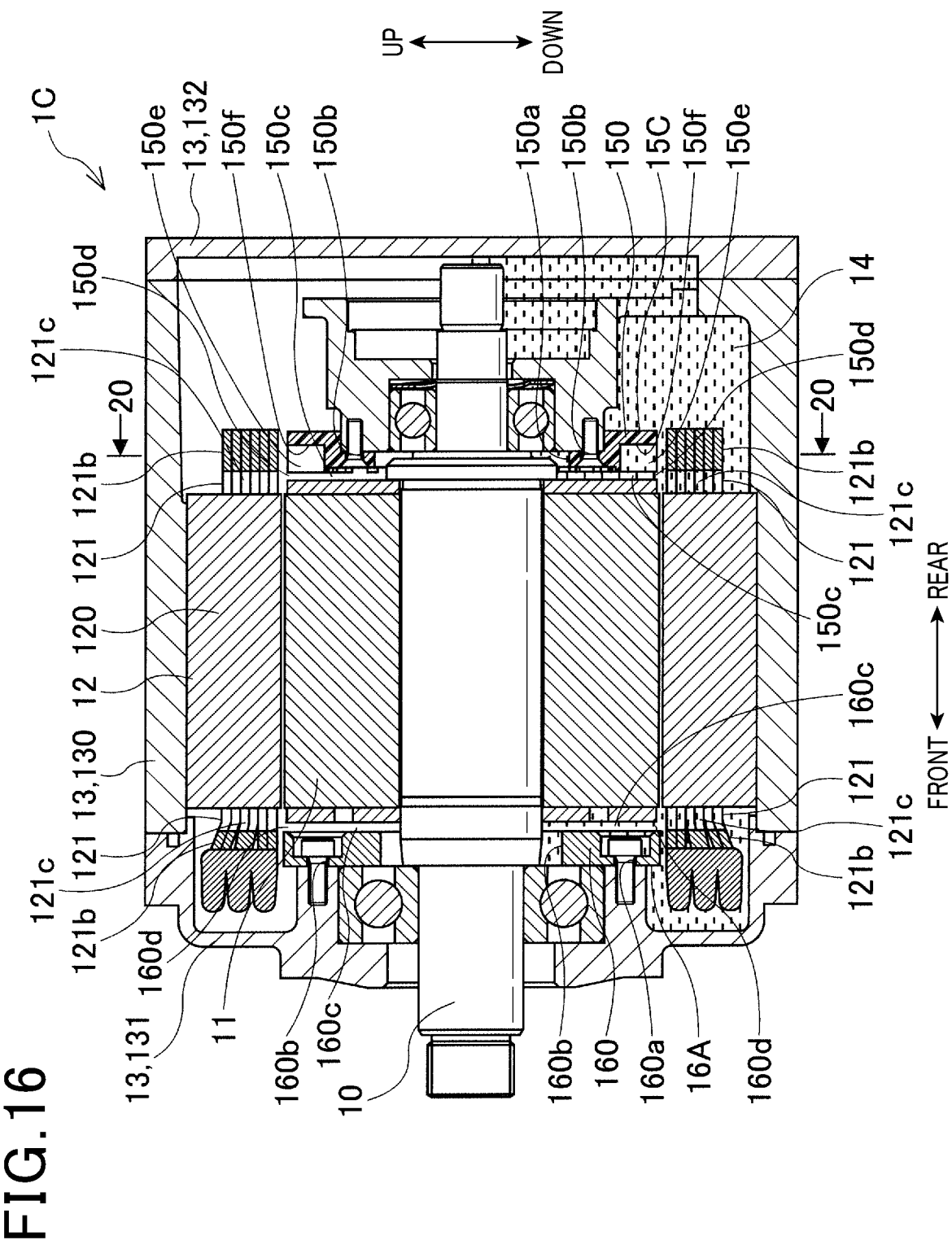
FIG. 16 is a cross-sectional view, taken along an axial direction, of a rotating electric machine according to a third embodiment.

As shown in FIG. 16, the flow direction regulating member 15C is arranged, with the rotating shaft 10 inserted in the rotating shaft insertion hole 150a, to have its front surface (i.e., the surface where the protrusions 150e and the recesses 150f are formed) axially facing the rear end face of the rotor 11 through an axial gap 150c formed therebetween. Moreover, the flow direction regulating member 15C is fixed to the center housing 130 by the screws respectively inserted in the screw insertion holes 150b. The flow direction regulating member 15C regulates the flow direction of the coolant 14 on the rear side of the rotor 11 by means of the axial gap 150c formed between the front surface of the flow direction regulating member 15C and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1C according to the present embodiment has the same advantages as the rotating electric machine 1A according to the first embodiment.

Figure 20:
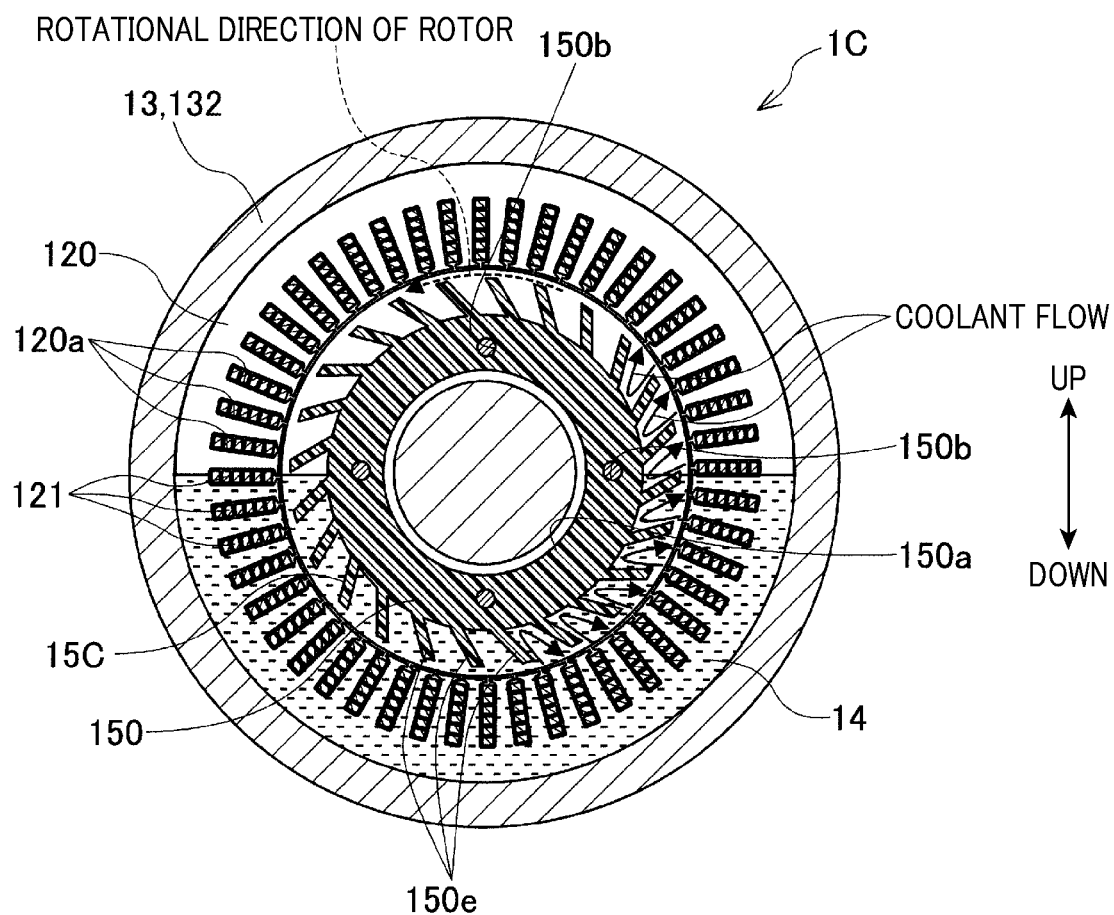
FIG. 20 is a cross-sectional view, taken along the line 20-20 in FIG. 16, illustrating the flow of coolant in the rotating electric machine according to the third embodiment.

Moreover, in the rotating electric machine 1C according to the present embodiment, the flow direction regulating member 15C has the recesses 150f formed in the rotor 11-side surface of the main body 150 over the entire circumference. The axial gap between the rear end face of the rotor 11 and the flow direction regulating member 15C is wider at the recesses 150f. Therefore, with the recesses 150f, it is possible to retain an increased amount of the coolant 14 between the rear end face of the rotor 11 and the flow direction regulating member 15C. Consequently, as shown in FIG. 20, it is possible to increase the amount of the coolant 14 supplied to the coil end portions 121b on the rear side of the stator core 120, thereby more effectively cooling the coil end portions 121b. On the other hand, when the axial gap between the rear end face of the rotor 11 and the flow direction regulating member 15C is widened, the flow speed of the coolant 14 in the axial gap is lowered, causing the negative pressure created by the Venturi effect to drop. Consequently, it may become difficult to effectively discharge the coolant 14 which has flowed into the annular gap between the radially inner peripheral surface of the stator 12 and the radially outer peripheral surface of the rotor 11. However, in the present embodiment, the flow direction regulating member 15C also has the protrusions 150e formed on the rotor 11-side surface of the main body 150 over the entire circumference. At the protrusions 150e, the axial gap between the rear end face of the rotor 11 and the flow direction regulating member 15C is narrow and the flow speed of the coolant 14 is high, causing the negative pressure created by the Venturi effect to increase. As a result, with the flow direction regulating member 15C, it is still possible to effectively discharge the coolant 14 which has flowed into the annular gap between the radially inner peripheral surface of the stator 12 and the radially outer peripheral surface of the rotor 11 while increasing the amount of the coolant 14 supplied to the coil end portions 121b.

In addition, it should be noted that for the sake of convenience of explanation, "front", "rear", "up" and "down" are used in FIGS. 16-20 to distinguish directions. It also should be noted that for the sake of ease of understanding, those parts of the rotating electric machine 1C which are actually immersed in the liquid coolant 14 are also shown with continuous lines in FIGS. 16 and 20.

Fourth Embodiment

A rotating electric machine 1D according to a fourth embodiment has almost the same structure as the rotating electric machine 1C according to the third embodiment. Accordingly, the differences therebetween will be mainly described hereinafter.

In the third embodiment, the rotating electric machine 1C includes the flow direction regulating member 15C that is arranged on the rear side of the rotor 11 (see FIGS. 16-20).

In comparison, in the present embodiment, as shown in FIGS. 21-24, the rotating electric machine 1D includes, instead of the flow direction regulating member 15C, a flow direction regulating member 15D that is arranged on the rear side of the rotor 11 and different in shape from the flow direction regulating member 15C.

Figure 22:
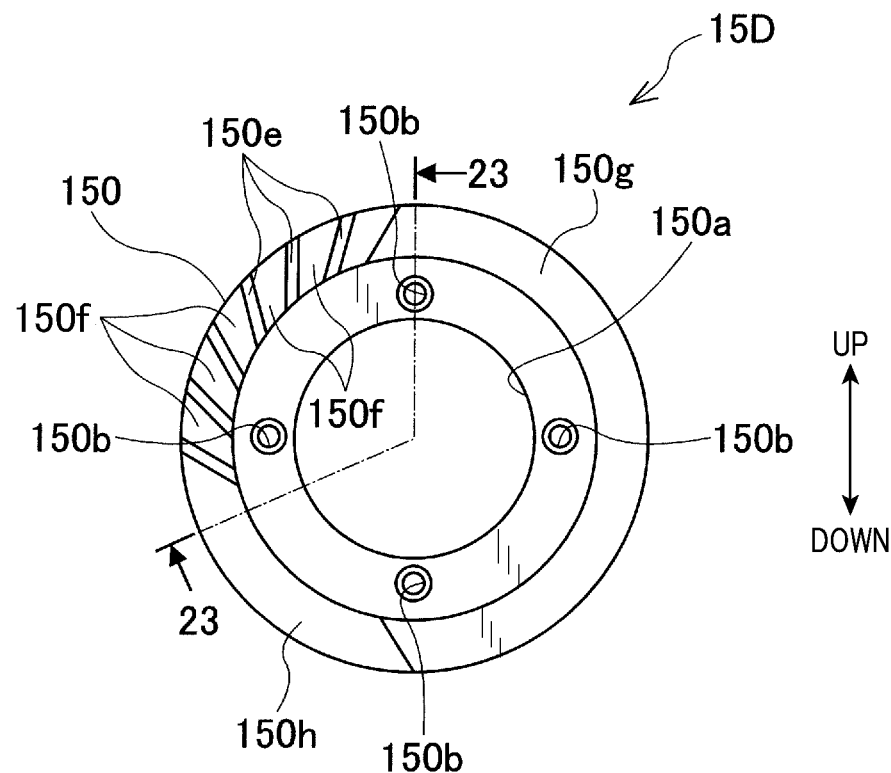
FIG. 22 is a front view of a rear flow direction regulating member of the rotating electric machine according to the fourth embodiment.
Figure 23:
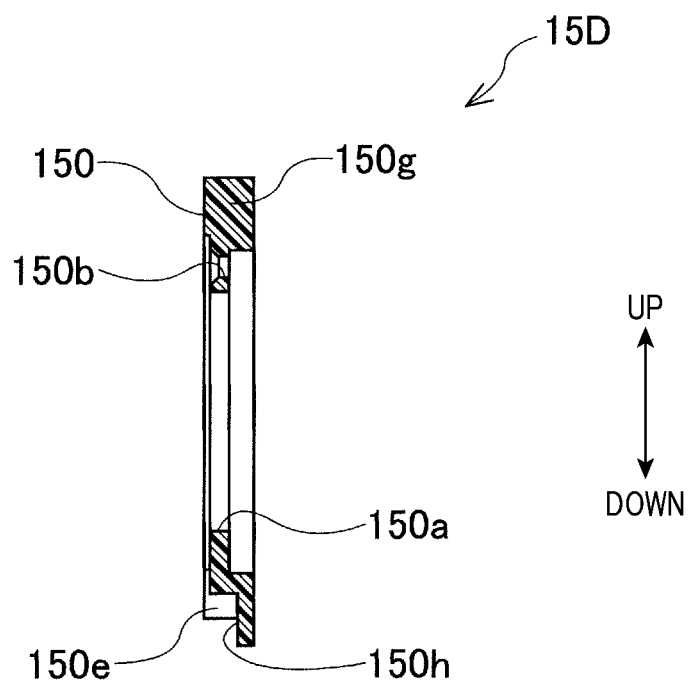
FIG. 23 is a cross-sectional view, taken along the line 23-23 in FIG. 22, of the rear flow direction regulating member of the rotating electric machine according to the fourth embodiment.
Figure 24:
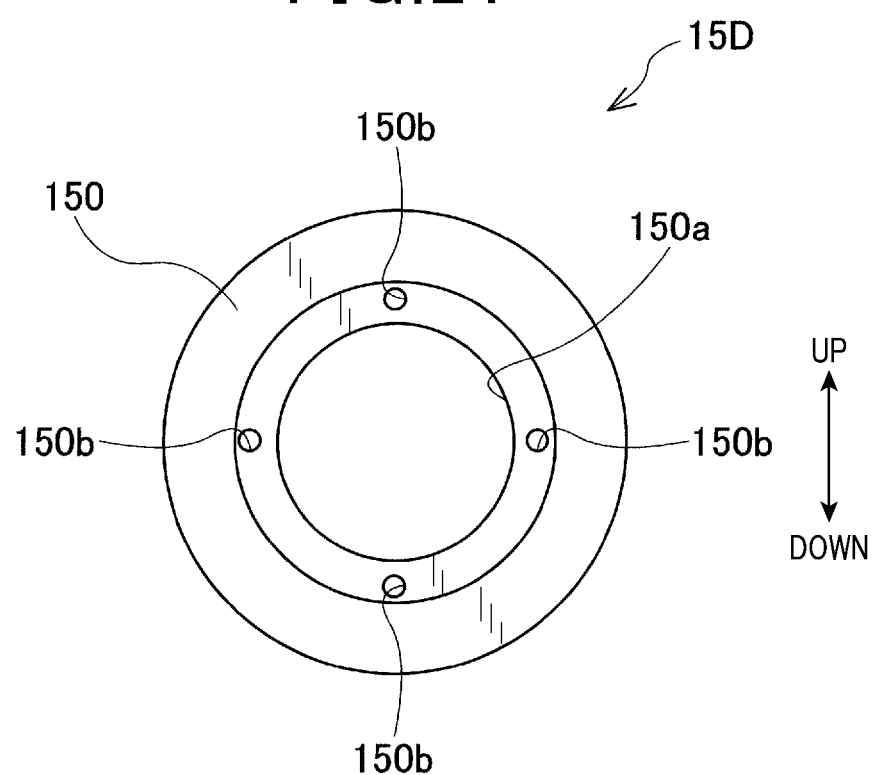
FIG. 24 is a rear view of the rear flow direction regulating member of the rotating electric machine according to the fourth embodiment.

Specifically, the flow direction regulating member 15D includes a main body 150 as shown in FIGS. 22-24. The main body 150 has a plurality of first protrusions 150e, a plurality of first recesses 150f, a second protrusion 150g and a second recess 150h, all of which are formed in a radially outer peripheral part of a front surface (or rotor 11-side surface) of the main body 150.

As shown in FIG. 22, when viewed from the front side (or from the rotor 11 side), the first protrusions 150e and the first recesses 150f are alternately formed over almost a left upper quarter of the radially outer peripheral part of the front surface of the main body 150. That is, the angular range of the first protrusions 150e and the first recesses 150f is about 90°. The second protrusion 150g is circular-arc-shaped and circumferentially extends over almost a right half of the radially outer peripheral part of the front surface of the main body 150. That is, the angular range of the second protrusion 150g is about 180°. The second recess 150h is circular-arc-shaped and circumferentially extends over almost a left lower quarter of the radially outer peripheral part of the front surface of the main body 150. That is, the angular range of the second recess 150h is about 90°.

In addition, the main body 150 also has a rotating shaft insertion hole 150a and a plurality (e.g., four) of screw insertion holes 150b. The rotating shaft insertion hole 150a is a circular hole into which the rotating shaft 10 is inserted. The rotating shaft insertion hole 150a is formed in a central part of the main body 150. The screw insertion holes 150b are circular holes into which screws for fixing the main body 150 are respectively inserted. The screw insertion holes 150b are formed radially outside the rotating shaft insertion hole 150a and circumferentially spaced from one another at equal intervals.

Figure 21:
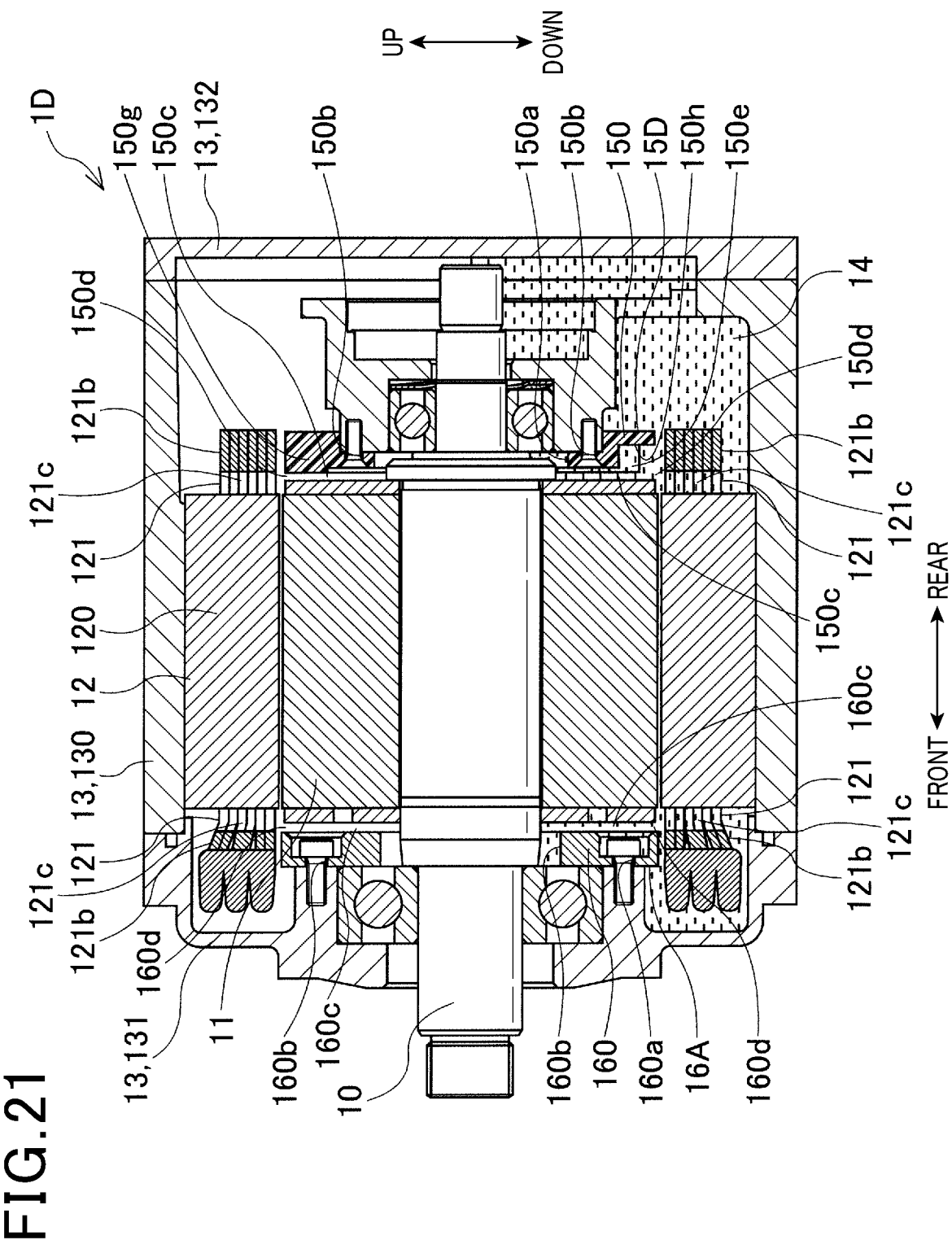
FIG. 21 is a cross-sectional view, taken along an axial direction, of a rotating electric machine according to a fourth embodiment.

As shown in FIG. 21, the flow direction regulating member 15D is arranged, with the rotating shaft 10 inserted in the rotating shaft insertion hole 150a, to have its front surface axially facing the rear end face of the rotor 11 through an axial gap 150c formed therebetween. Moreover, the flow direction regulating member 15D is fixed to the center housing 130 by the screws respectively inserted in the screw insertion holes 150b. The flow direction regulating member 15D regulates the flow direction of the coolant 14 on the rear side of the rotor 11 by means of the axial gap 150c formed between the front surface of the flow direction regulating member 15D and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1D according to the present embodiment has the same advantages as the rotating electric machine 1C according to the third embodiment.

In particular, in the rotating electric machine 1D according to the present embodiment, the flow direction regulating member 15D has the first recesses 150f and the second recess 150h formed in the rotor 11-side surface of the main body 150. The axial gap between the rear end face of the rotor 11 and the flow direction regulating member 15D is wider at the first recesses 150f and the second recess 150h. Therefore, with the first recesses 150f and the second recess 150h, it is possible to retain an increased amount of the coolant 14 between the rear end face of the rotor 11 and the flow direction regulating member 15D. Consequently, it is possible to increase the amount of the coolant 14 supplied to the coil end portions 121b on the rear side of the stator core 120, thereby more effectively cooling the coil end portions 121b. On the other hand, when the axial gap between the rear end face of the rotor 11 and the flow direction regulating member 15D is widened, the flow speed of the coolant 14 in the axial gap is lowered, causing the negative pressure created by the Venturi effect to drop. Consequently, it may become difficult to effectively discharge the coolant 14 which has flowed into the annular gap between the radially inner peripheral surface of the stator 12 and the radially outer peripheral surface of the rotor 11. However, in the present embodiment, the flow direction regulating member 15D also has the first protrusions 150e and the second protrusion 150g formed on the rotor 11-side surface of the main body 150. At the first protrusions 150e and the second protrusion 150g, the axial gap between the rear end face of the rotor 11 and the flow direction regulating member 15D is narrower and the flow speed of the coolant 14 is higher, causing the negative pressure created by the Venturi effect to increase. As a result, with the flow direction regulating member 15D, it is still possible to effectively discharge the coolant 14 which has flowed into the annular gap between the radially inner peripheral surface of the stator 12 and the radially outer peripheral surface of the rotor 11 while increasing the amount of the coolant 14 supplied to the coil end portions 121b.

Moreover, in the present embodiment, the second protrusion 150g extends in the circumferential direction of the main body 150 of the flow direction regulating member 15D (or the circumferential direction of the rotating shaft 10) over the angular range of about 180°. Consequently, it is possible to retain the coolant 14 radially inside the second protrusion 150g, thereby more effectively cooling the rotor 11.

Furthermore, in the present embodiment, the second protrusion 150g extends in the circumferential direction to have a circular arc shape. Consequently, it is possible to reliably introduce the coolant 14, which flows along the radially inner peripheral surface of the second protrusion 150g, from a circumferential end of the second protrusion 150g to the coil end portions 121b. Consequently, it is possible to more effectively cool the coil end portions 121b.

In addition, it should be noted that for the sake of convenience of explanation, "front", "rear", "up" and "down" are used in FIGS. 21-24 to distinguish directions. It also should be noted that for the sake of ease of understanding, those parts of the rotating electric machine 1D which are actually immersed in the liquid coolant 14 are also shown with continuous lines in FIG. 21.

Fifth Embodiment

A rotating electric machine 1E according to a fifth embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and has no through-holes formed therein in addition to the rotating shaft insertion hole 150a and the bolt insertion holes 150b (see FIGS. 1A and 3-5).

In comparison, in the present embodiment, as shown in FIGS. 25-30, the rotating electric machine 1E includes, instead of the flow direction regulating member 15A, a flow direction regulating member 15E that is arranged on the rear side of the rotor 11 and has through-holes formed therein in addition to the rotating shaft insertion hole 150a and the bolt insertion holes 150b.

Figure 26:
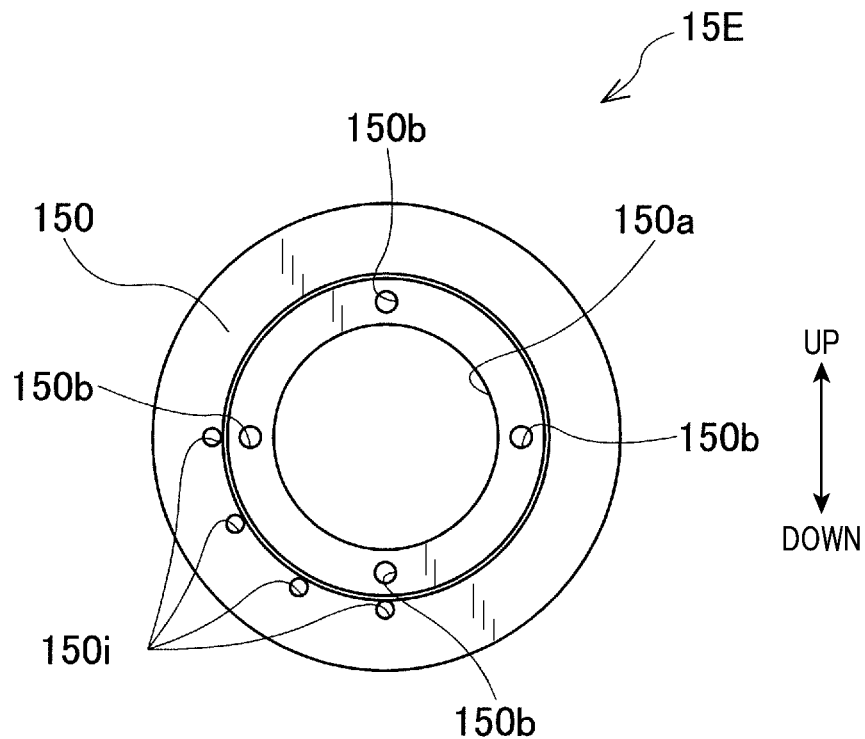
FIG. 26 is a front view of a rear flow direction regulating member of the rotating electric machine according to the fifth embodiment.
Figure 27:
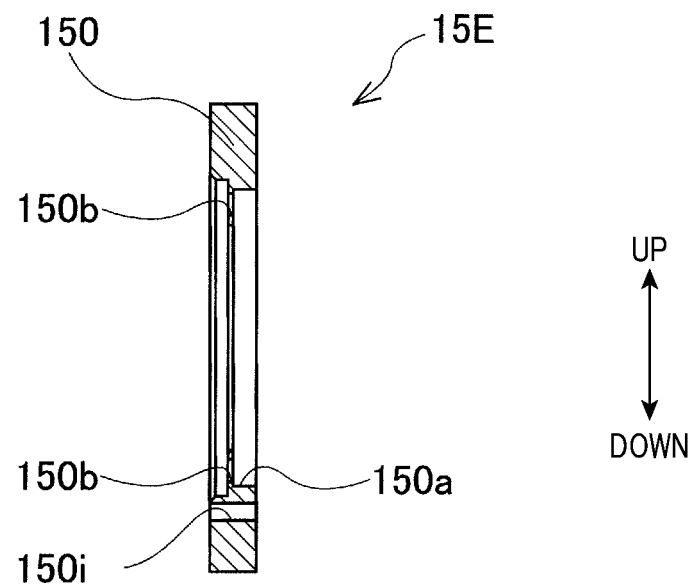
FIG. 27 is a cross-sectional view, taken along the axial direction, of the rear flow direction regulating member of the rotating electric machine according to the fifth embodiment.
Figure 28:
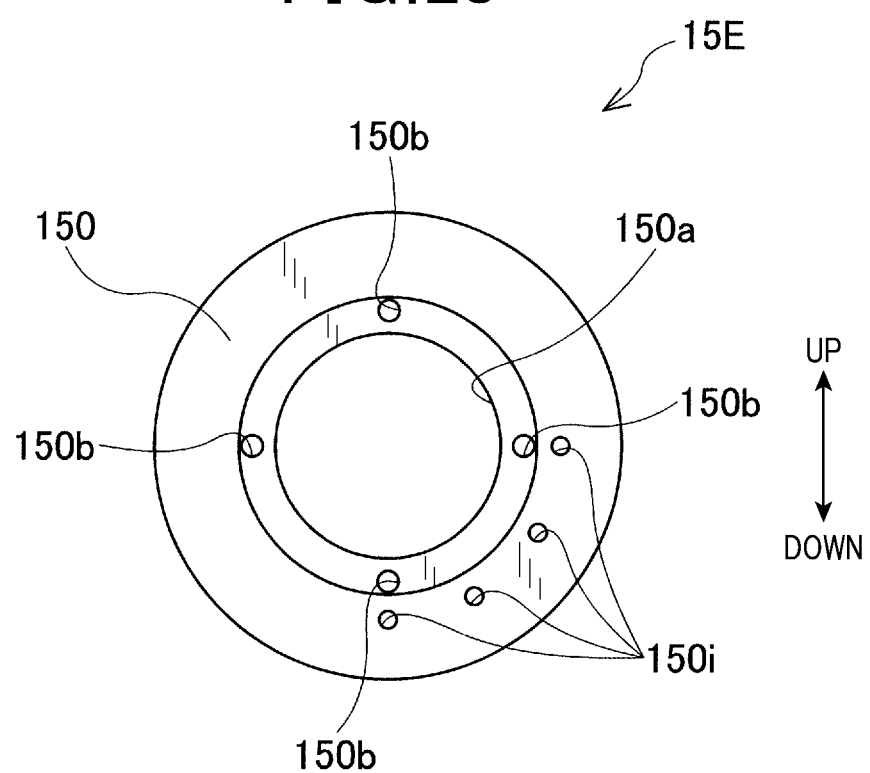
FIG. 28 is a rear view of the rear flow direction regulating member of the rotating electric machine according to the fifth embodiment.

Specifically, the flow direction regulating member 15E includes a main body 150 as shown in FIGS. 26-28.

The main body 150 has a plurality (e.g., four) of through-holes 150i formed therein. When viewed from the front side (or from the rotor 11 side), the through-holes 150i are located in a left lower part of the front surface of the main body 150 (see FIG. 26). Each of the through-holes 150i axially penetrates the main body 150 (see FIG. 27). Moreover, the through-holes 150i are circumferentially spaced from one another at equal intervals (see FIGS. 26 and 28).

In addition, the main body 150 also has the rotating shaft insertion hole 150a and the bolt insertion holes 150b as described in the first embodiment.

Figure 25:
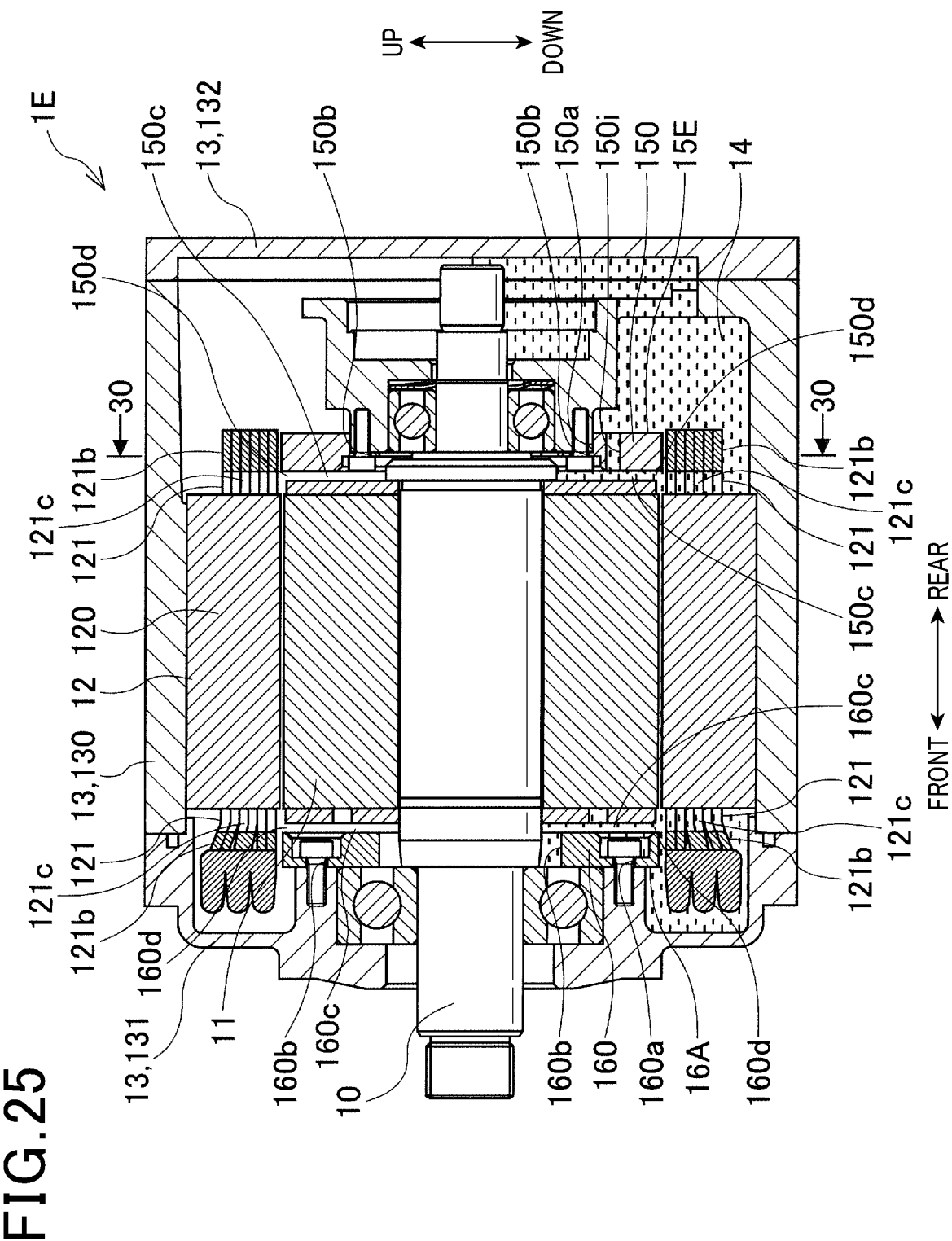
FIG. 25 is a cross-sectional view, taken along an axial direction, of a rotating electric machine according to a fifth embodiment.

As shown in FIG. 25, the flow direction regulating member 15E is arranged, with the rotating shaft 10 inserted in the rotating shaft insertion hole 150a, to axially face the rear end face of the rotor 11 through an axial gap 150c formed therebetween. Moreover, the flow direction regulating member 15E is fixed to the center housing 130 by the bolts respectively inserted in the bolt insertion holes 150b. Consequently, all of the through-holes 150i are immersed in the liquid coolant 14. The flow direction regulating member 15E regulates the flow direction of the coolant 14 on the rear side of the rotor 11 by means of the axial gap 150c formed between the flow direction regulating member 15E and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1E according to the present embodiment has the same advantages as the rotating electric machine 1A according to the first embodiment.

Figure 29:
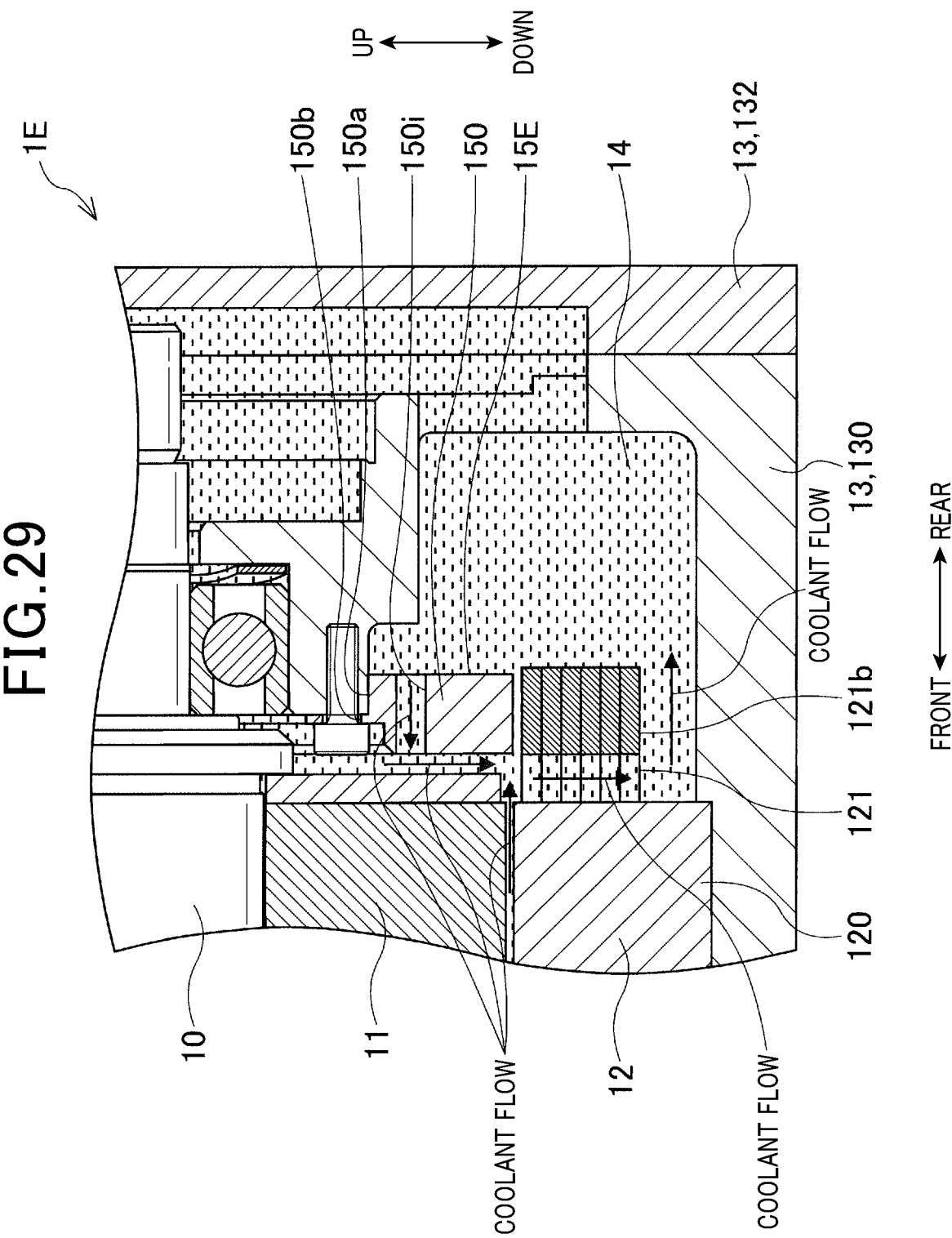
FIG. 29 is an enlarged view of a rear lower part of FIG. 25 illustrating the flow of coolant in the rotating electric machine according to the fifth embodiment.
Figure 30:
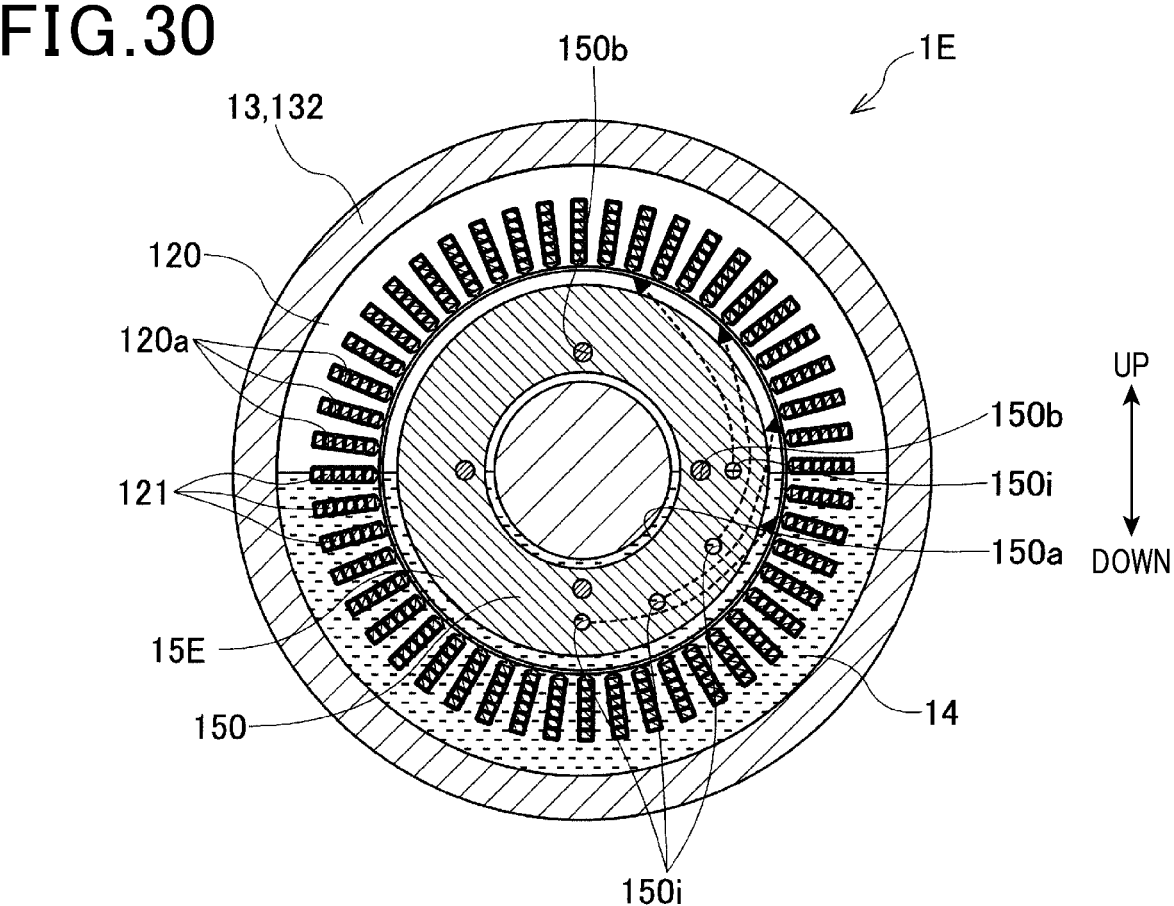
FIG. 30 is a cross-sectional view, taken along the line 30-30 in FIG. 25, illustrating the flow of coolant in the rotating electric machine according to the fifth embodiment.
Figure 31:
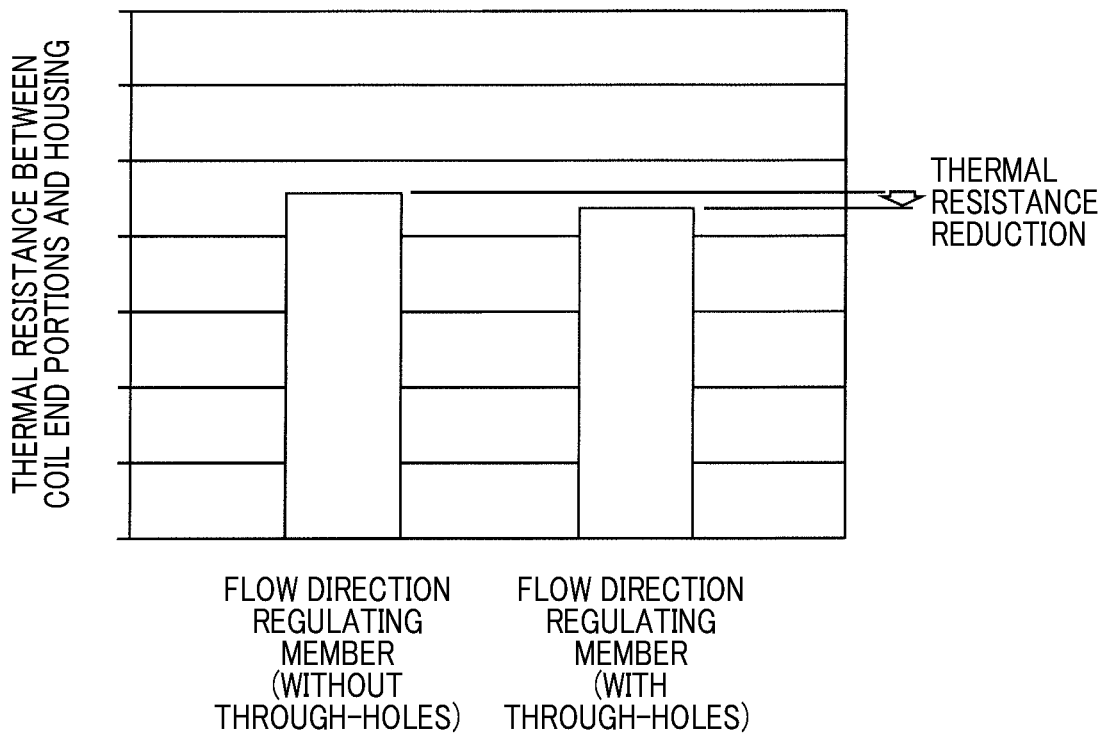
FIG. 31 is a graphical representation illustrating the effect of providing through-holes in the rear flow direction regulating member on reduction of the thermal resistance between coil end portions and a housing in an upper part of the rotating electric machine according to the fifth embodiment.

Moreover, in the rotating electric machine 1E according to the present embodiment, the flow direction regulating member 15E has the through-holes 150i formed therein. Therefore, as shown in FIG. 29, it is possible to supply the coolant 14 from the rear side of the flow direction regulating member 15E (or the opposite side of the flow direction regulating member 15E to the rotor 11) to the axial gap 150c via the through-holes 150i. Consequently, as shown in FIG. 30, it is possible to continuously introduce a sufficient amount of the coolant 14 to the coil end portions 121b, thereby more effectively cooling the coil end portions 121b. As a result, as shown in FIG. 31, it is possible to further reduce the thermal resistance between the coil end portions 121b and the housing 13 in an upper part of the rotating electric machine 1E in comparison with the case of employing the flow direction regulating member 15A (or flow direction regulating member without the through-holes 150i). Furthermore, it is also possible to reliably cool the rotor 11 with a sufficient amount of the coolant 14.

In addition, it should be noted that for the sake of convenience of explanation, "front", "rear", "up" and "down" are used in FIGS. 25-30 to distinguish directions. It also should be noted that for the sake of ease of understanding, those parts of the rotating electric machine 1E which are actually immersed in the liquid coolant 14 are also shown with continuous lines in FIGS. 25 and 29-30.

Sixth Embodiment

A rotating electric machine 1F according to a sixth embodiment includes a flow direction regulating member 15F that is a combination of the flow direction regulating member 15C of the rotating electric machine 1C according to the third embodiment and the flow direction regulating member 15E of the rotating electric machine 1E according to the fifth embodiment.

In the rotating electric machine 1C according to the third embodiment, the flow direction regulating member 15C has the protrusions 150e and the recesses 150f, but no through-holes 150i (see FIGS. 16-20). On the other hand, in the rotating electric machine 1E according to the fifth embodiment, the flow direction regulating member 15E has the through-holes 150i, but neither protrusions 150e nor recesses 150f (see FIGS. 25-30).

In comparison, in the rotating electric machine 1F according to the present embodiment, as shown in FIGS. 32-35, the flow direction regulating member 15F includes a main body 150 that has not only protrusions 150e and recesses 150f as described in the third embodiment, but also through-holes 150i as described in the fifth embodiment.

Figure 33:
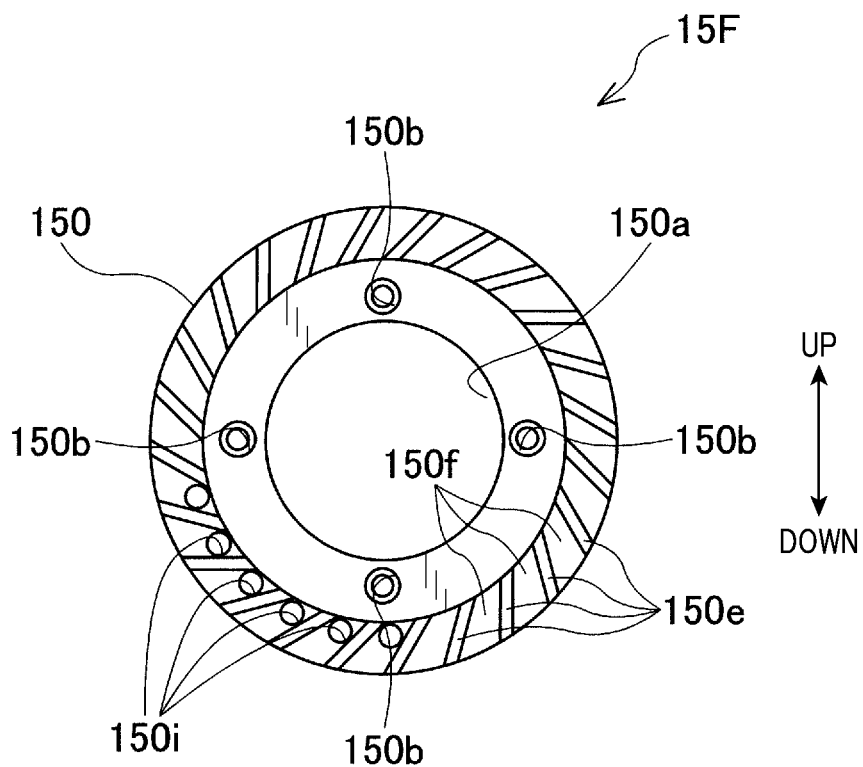
FIG. 33 is a front view of a rear flow direction regulating member of the rotating electric machine according to the sixth embodiment.
Figure 34:
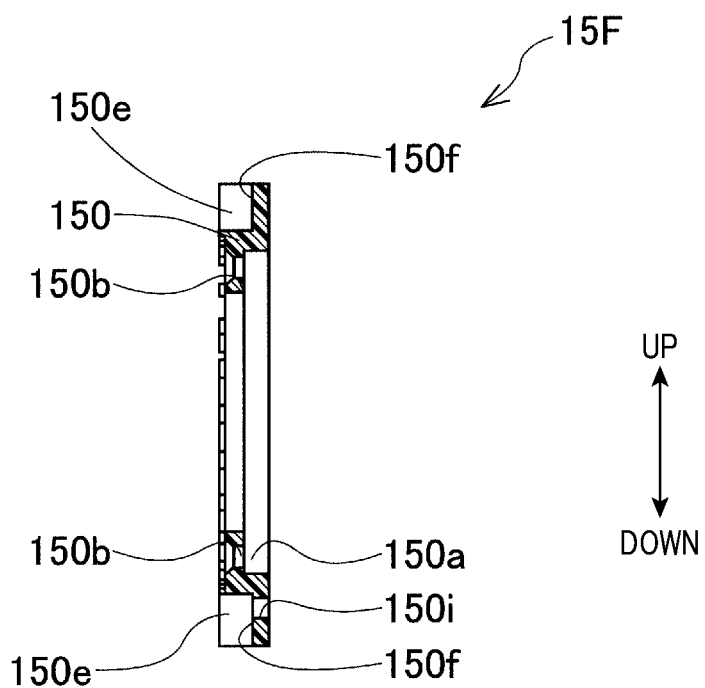
FIG. 34 is a cross-sectional view, taken along the axial direction, of the rear flow direction regulating member of the rotating electric machine according to the sixth embodiment.
Figure 35:
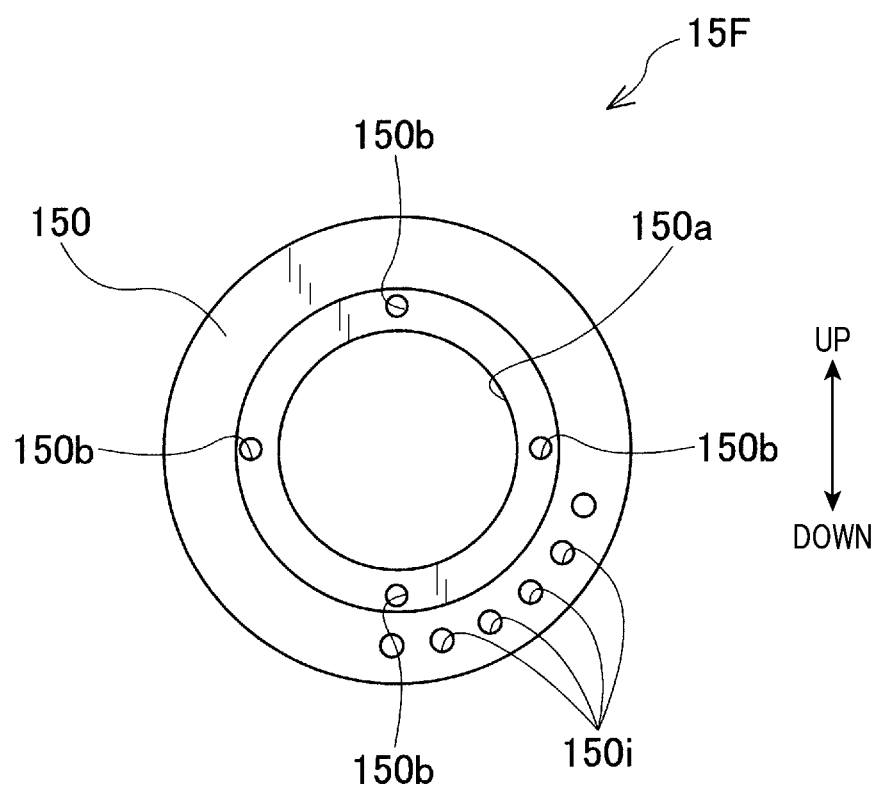
FIG. 35 is a rear view of the rear flow direction regulating member of the rotating electric machine according to the sixth embodiment.

More particularly, in the present embodiment, the main body 150 has sixth through-holes 150i each axially penetrating the main body 150. As shown in FIG. 33, the sixth through-holes 150i are respectively formed in sixth consecutive recesses 150f that are located in a left lower part of the front surface of the main body 150 when viewed from the front side (or from the rotor 11 side).

In addition, the main body 150 also has the rotating shaft insertion hole 150a and the screw insertion holes 150b as described in the third embodiment.

Figure 32:
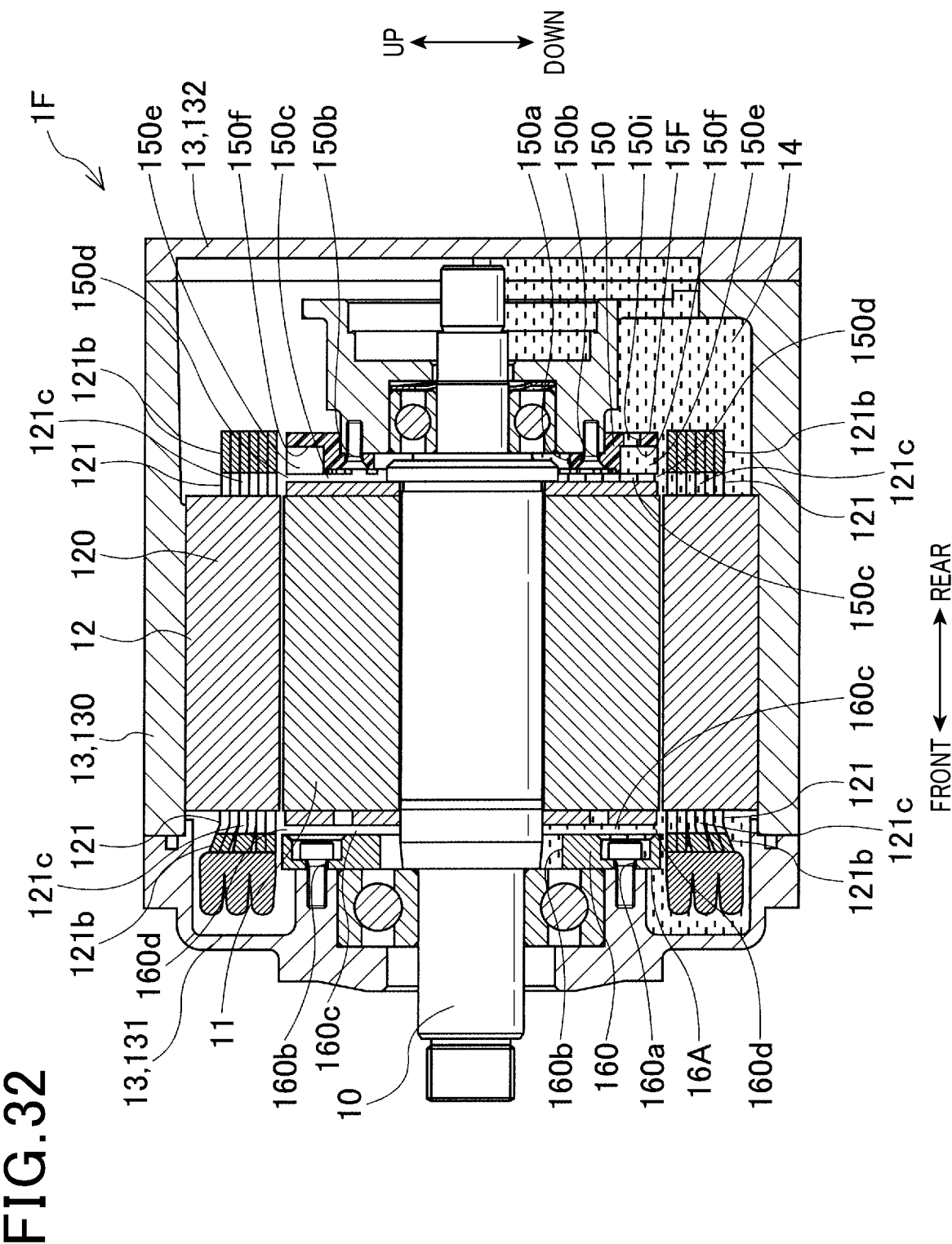
FIG. 32 is a cross-sectional view, taken along an axial direction, of a rotating electric machine according to a sixth embodiment.

As shown in FIG. 32, the flow direction regulating member 15F is arranged, with the rotating shaft 10 inserted in the rotating shaft insertion hole 150a, to have its front surface (i.e., the surface where the protrusions 150e and the recesses 150f are formed) axially facing the rear end face of the rotor 11 through an axial gap 150c formed therebetween. Moreover, the flow direction regulating member 15F is fixed to the center housing 130 by the screws respectively inserted in the screw insertion holes 150b. The flow direction regulating member 15F regulates the flow direction of the coolant 14 on the rear side of the rotor 11 by means of the axial gap 150c formed between the front surface of the flow direction regulating member 15F and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1F according to the present embodiment has not only the advantages due to the protrusions 150e and the recesses 150f as described in the third embodiment, but also the advantages due to the through-holes 150i as described in the fifth embodiment.

In addition, it should be noted that for the sake of convenience of explanation, "front", "rear", "up" and "down" are used in FIGS. 32-35 to distinguish directions. It also should be noted that for the sake of ease of understanding, those parts of the rotating electric machine 1F which are actually immersed in the liquid coolant 14 are also shown with continuous lines in FIG. 32.

Seventh Embodiment

A rotating electric machine 1G according to a seventh embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and has no coil end facing portion formed therein addition to the main body 150 (see FIGS. 1A and 3-5).

In comparison, in the present embodiment, as shown in FIGS. 36-39, the rotating electric machine 1G includes, instead of the flow direction regulating member 15A, a flow direction regulating member 15G that is arranged on the rear side of the rotor 11 and has both a main body 150 and a coil end facing portion 152.

Specifically, the main body 150 has a rotating shaft insertion hole 150a and a plurality (e.g., four) of bolt insertion holes 150b as described in the first embodiment.

The coil end facing portion 152 is arcuate plate-shaped. The coil end facing portion 152 extends radially outward from the radially outer periphery of an upper half of the main body 150 so as to axially face (or confront) those upper coil end portions 121b on the rear side of the stator core 120 which are located above the central axis of the rotating shaft 10. That is, in the present embodiment, the coil end facing portion 152 circumferentially extends over half the radially outer circumference of the main body 150. In addition, the coil end facing portion 152 is formed at the rear end of the main body 150 so as to have an axial gap formed between the coil end facing portion 152 and the upper coil end portions 121b.

Figure 36:
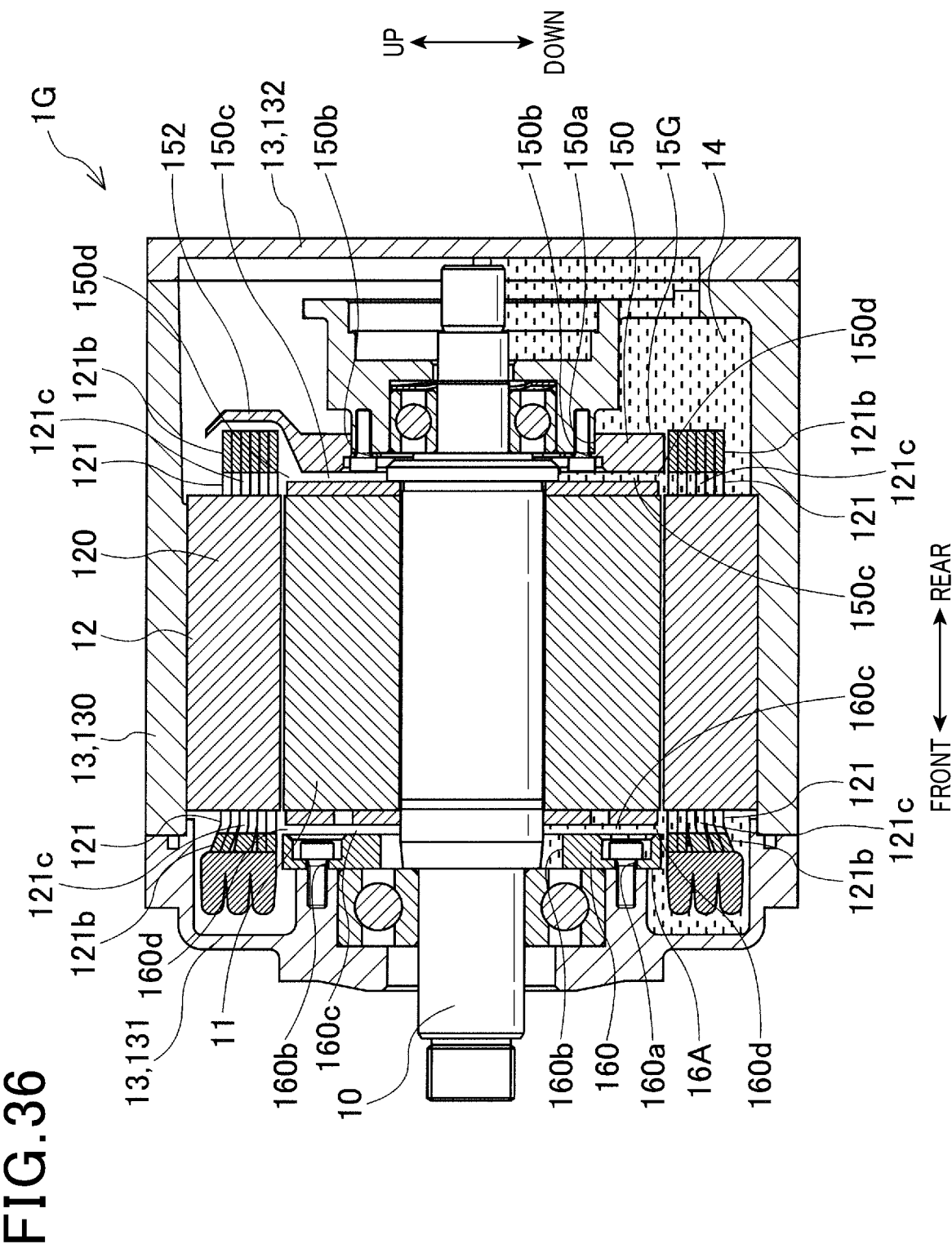
FIG. 36 is a cross-sectional view, taken along an axial direction, of a rotating electric machine according to a seventh embodiment.
Figure 37:
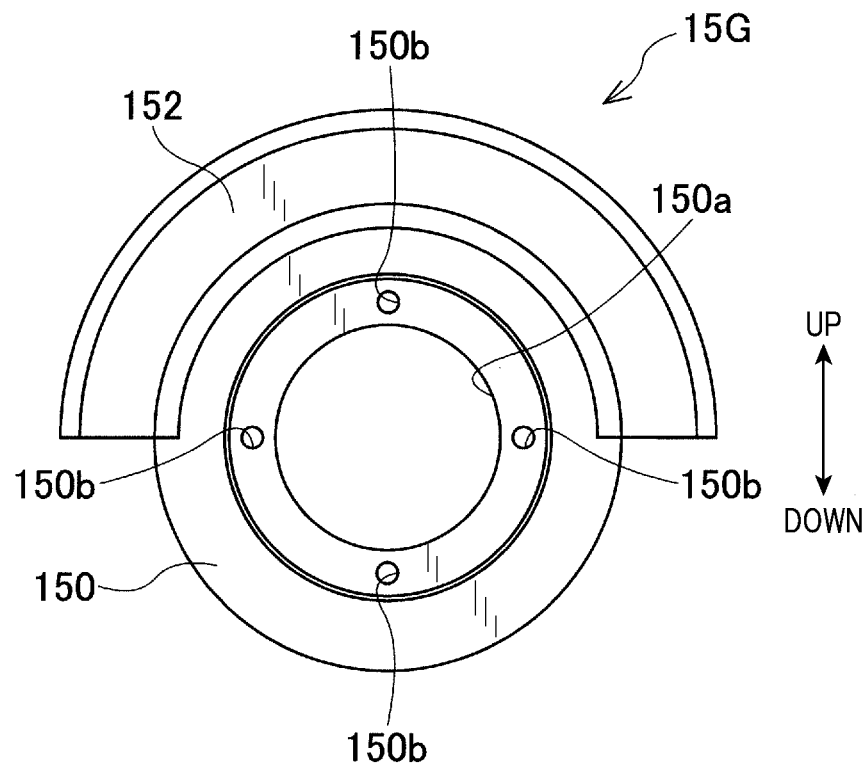
FIG. 37 is a front view of a rear flow direction regulating member of the rotating electric machine according to the seventh embodiment.
Figure 38:
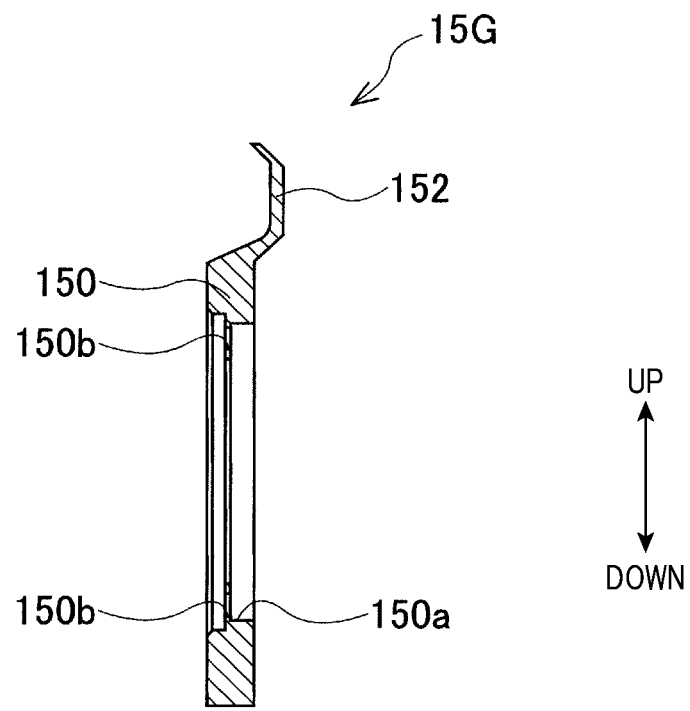
FIG. 38 is a cross-sectional view, taken along the axial direction, of the rear flow direction regulating member of the rotating electric machine according to the seventh embodiment.
Figure 39:
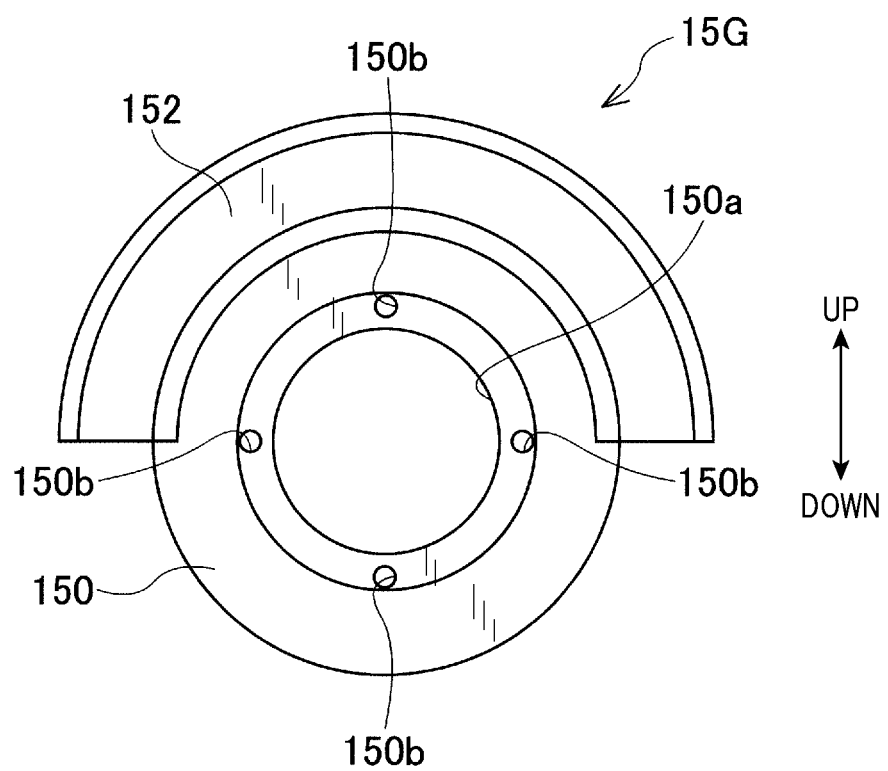
FIG. 39 is a rear view of the rear flow direction regulating member of the rotating electric machine according to the seventh embodiment.

As shown in FIG. 36, the flow direction regulating member 15G is arranged, with the rotating shaft 10 inserted in the rotating shaft insertion hole 150a, to have the main body 150 axially facing the rear end face of the rotor 11 through an axial gap 150c formed therebetween and the coil end facing portion 152 axially facing the upper coil end portions 121b through the axial gap formed therebetween. Moreover, the flow direction regulating member 15G is fixed to the center housing 130 by the bolts respectively inserted in the bolt insertion holes 150b. The flow direction regulating member 15G regulates the flow direction of the coolant 14 on the rear side of the rotor 11 by means of the axial gap 150c formed between the flow direction regulating member 15G and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1G according to the present embodiment has the same advantages as the rotating electric machine 1A according to the first embodiment.

Moreover, in the rotating electric machine 1G according to the present embodiment, the flow direction regulating member 15G further has, in addition to the main body 150, the coil end facing portion 152 that axially faces the upper coil end portions 121b through the axial gap formed therebetween. Therefore, it is possible to cause the coolant 14 to flow along the coil end facing portion 152. Consequently, it is possible to introduce the coolant 14 to radially outer parts of the upper coil end portions 121b, thereby reliably cooling the radially outer parts. As a result, it is possible to more effectively cool the upper coil end portions 121b.

In addition, it should be noted that for the sake of convenience of explanation, "front", "rear", "up" and "down" are used in FIGS. 36-39 to distinguish directions. It also should be noted that for the sake of ease of understanding, those parts of the rotating electric machine 1G which are actually immersed in the liquid coolant 14 are also shown with continuous lines in FIG. 36.

Eighth Embodiment

A rotating electric machine 1H according to an eighth embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and has neither protrusion nor recess formed in its surface facing the rotor 11 (see FIGS. 1A and 3-5).

In comparison, in the present embodiment, as shown in FIGS. 40-43, the rotating electric machine 1H includes, instead of the flow direction regulating member 15A, a flow direction regulating member 15H that is arranged on the rear side of the rotor 11 and has protrusions 150j and recesses 150k formed in its surface facing the rotor 11.

Figure 41:
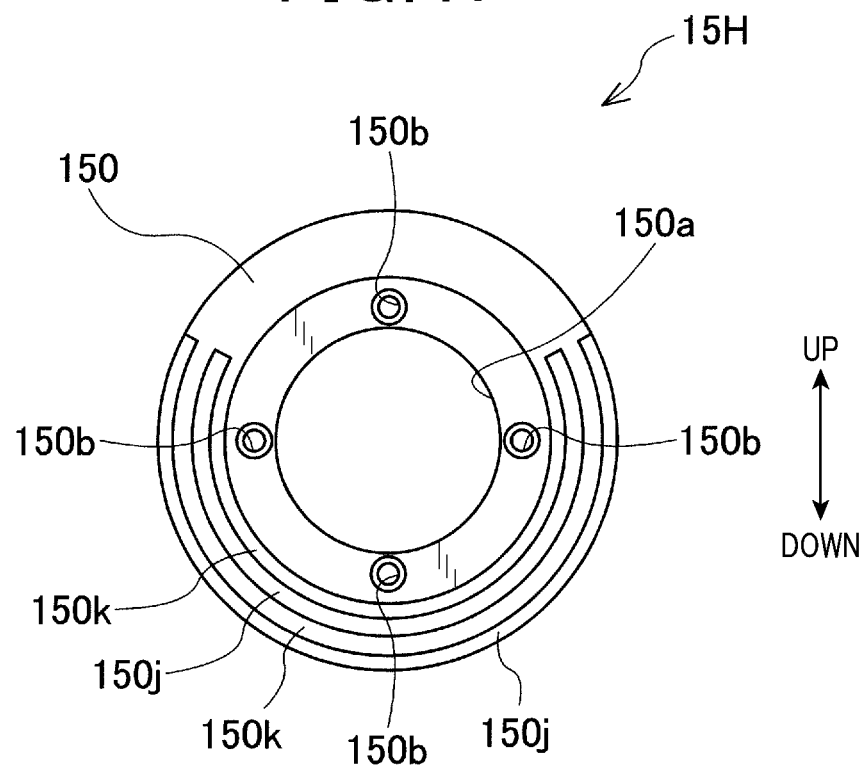
FIG. 41 is a front view of a rear flow direction regulating member of the rotating electric machine according to the eighth embodiment.
Figure 42:
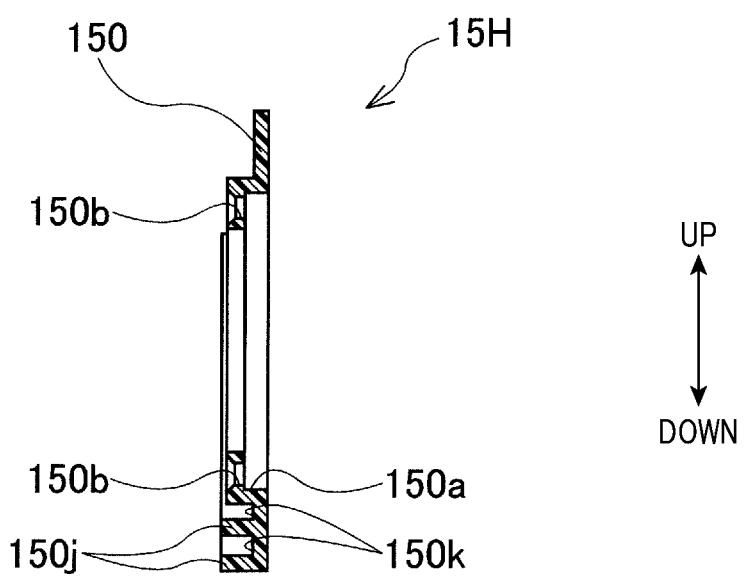
FIG. 42 is a cross-sectional view, taken along the axial direction, of the rear flow direction regulating member of the rotating electric machine according to the eighth embodiment.
Figure 43:
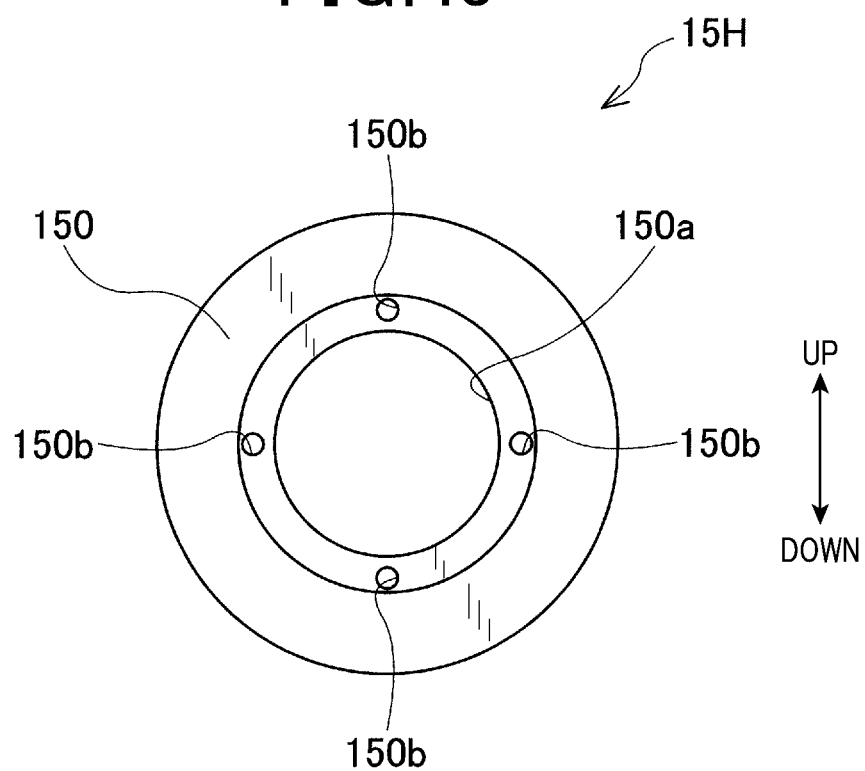
FIG. 43 is a rear view of the rear flow direction regulating member of the rotating electric machine according to the eighth embodiment.

Specifically, the flow direction regulating member 15H includes a main body 150 as shown in FIGS. 41-43. The main body 150 is made, for example, of resin and has a substantially discoid shape. The main body 150 has a flange portion formed at its rear end. In a front surface (or rotor 11-side surface) of the flange portion of the main body 150, there formed a plurality (e.g., two) protrusions 150j and a plurality (e.g., two) two recesses 150k.

Each of the protrusions 150j and the recesses 150k extends in the circumferential direction of the main body 150 of the flow direction regulating member 15H (or the circumferential direction of the rotating shaft 10) to have a circular arc shape. Moreover, the protrusions 150j are formed alternately and concentrically with the recesses 150k. In addition, the protrusions 150j and the recesses 150k are formed over an angular range of 240° on the lower side, leaving an angular range of 120° on the upper side (see FIG. 41).

In addition, the main body 150 also has a rotating shaft insertion hole 150a and a plurality (e.g., four) of screw insertion holes 150b. The rotating shaft insertion hole 150a is a circular hole into which the rotating shaft 10 is inserted. The rotating shaft insertion hole 150a is formed in a central part of the main body 150. The screw insertion holes 150b are circular holes into which screws for fixing the main body 150 are respectively inserted. The screw insertion holes 150b are formed radially outside the rotating shaft insertion hole 150a and circumferentially spaced from one another at equal intervals.

Figure 40:
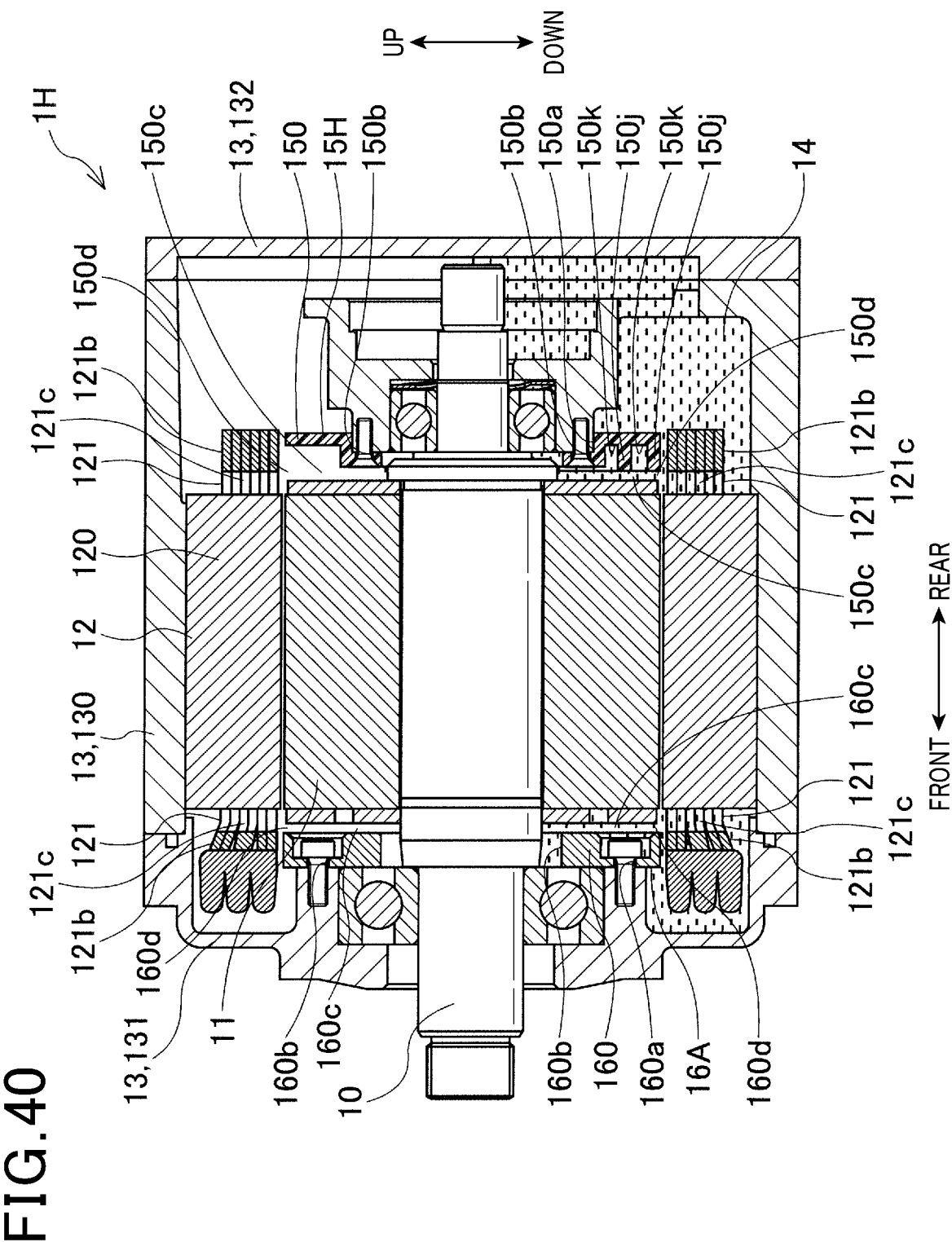
FIG. 40 is a cross-sectional view, taken along an axial direction, of a rotating electric machine according to an eighth embodiment.

As shown in FIG. 40, the flow direction regulating member 15H is arranged, with the rotating shaft 10 inserted in the rotating shaft insertion hole 150a, to have its front surface (i.e., the surface where the protrusions 150j and the recesses 150k are formed) axially facing the rear end face of the rotor 11 through an axial gap 150c formed therebetween. Moreover, the flow direction regulating member 15H is fixed to the center housing 130 by the screws respectively inserted in the screw insertion holes 150b. Consequently, each of the protrusions 150j and the recesses 150k is immersed in the coolant 14 except for its circumferential end portions. The flow direction regulating member 15H regulates the flow direction of the coolant 14 on the rear side of the rotor 11 by means of the axial gap 150c formed between the front surface of the flow direction regulating member 15H and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1H according to the present embodiment has the same advantages as the rotating electric machine 1A according to the first embodiment.

Figure 44:
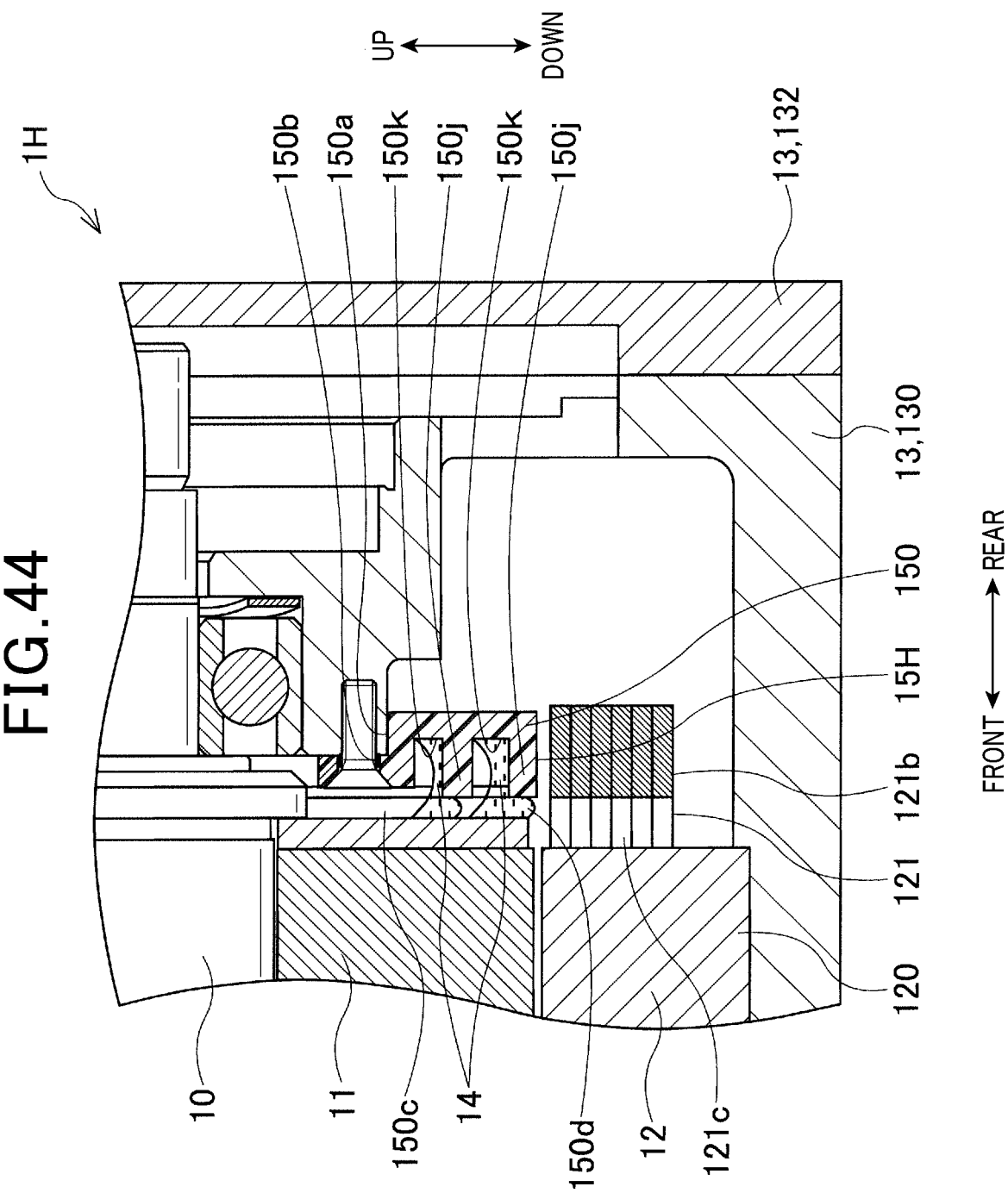
FIG. 44 is an enlarged view of a rear lower part of FIG. 40 illustrating the coolant retaining effect of the rear flow direction regulating member of the rotating electric machine according to the eighth embodiment.

Moreover, in the rotating electric machine 1H according to the present embodiment, the flow direction regulating member 15H has the protrusions 150j formed on the rotor 11-side surface of the main body 150 so as to extend in the circumferential direction of the main body 150. Consequently, as shown in FIG. 44, it is possible to retain the coolant 14 radially inside each of the protrusions 150j (or retain the coolant 14 in the recesses 150k), thereby more effectively cooling the rotor 11.

Furthermore, in the present embodiment, each of the protrusions 150j extends in the circumferential direction to have the circular arc shape. Consequently, it is possible to reliably introduce the coolant 14, which flows along the radially inner peripheral surface of the protrusion 150j, from a circumferential end of the protrusion 150j to the coil end portions 121b. Consequently, it is possible to more effectively cool the coil end portions 121b.

In addition, it should be noted that for the sake of convenience of explanation, "front", "rear", "up" and "down" are used in FIGS. 40-44 to distinguish directions. It also should be noted that for the sake of ease of understanding, those parts of the rotating electric machine 1H which are actually immersed in the liquid coolant 14 are also shown with continuous lines in FIGS. 40 and 44.

Ninth Embodiment

A rotating electric machine 1I according to a ninth embodiment has almost the same structure as the rotating electric machine 1A according to the first embodiment. Accordingly, the differences therebetween will be mainly described hereinafter.

In the first embodiment, the rotating electric machine 1A includes the flow direction regulating members 15A and 16A that are respectively arranged on the rear and front sides of the rotor 11 and both have neither protrusion nor recess formed in their respective surfaces facing the rotor 11 (see FIGS. 1A and 3-8).

In comparison, in the present embodiment, as shown in FIGS. 45-51, the rotating electric machine 1I includes, instead of the flow direction regulating members 15A and 16A, flow direction regulating members 15I and 16I that are respectively arranged on the rear and front sides of the rotor 11 and both have a protrusion and a recess formed in their respective surfaces facing the rotor 11.

Figure 46:
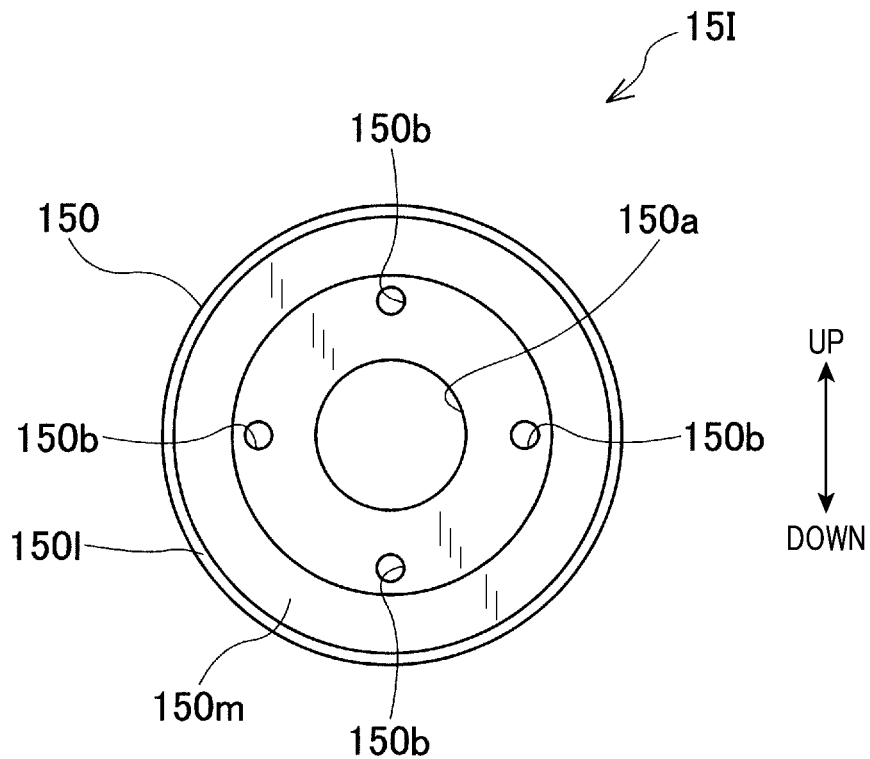
FIG. 46 is a front view of a rear flow direction regulating member of the rotating electric machine according to the ninth embodiment.
Figure 47:
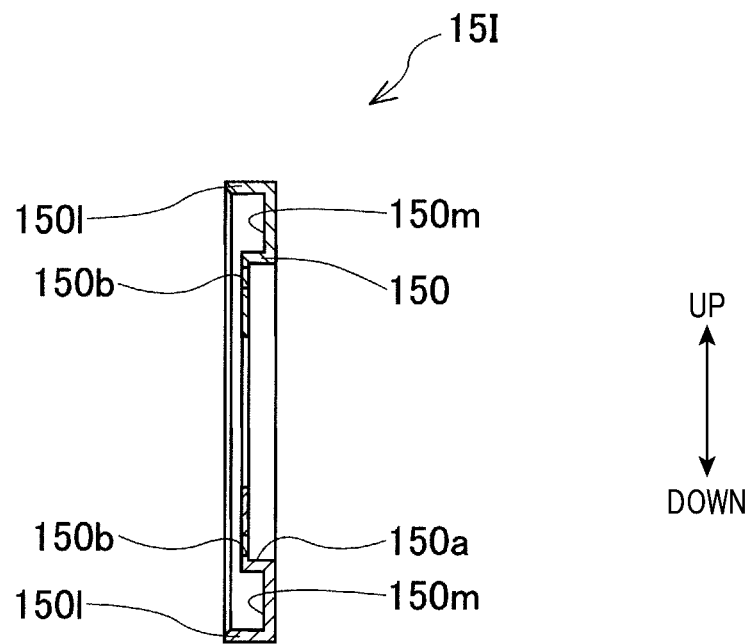
FIG. 47 is a cross-sectional view, taken along the axial direction, of the rear flow direction regulating member of the rotating electric machine according to the ninth embodiment.
Figure 48:
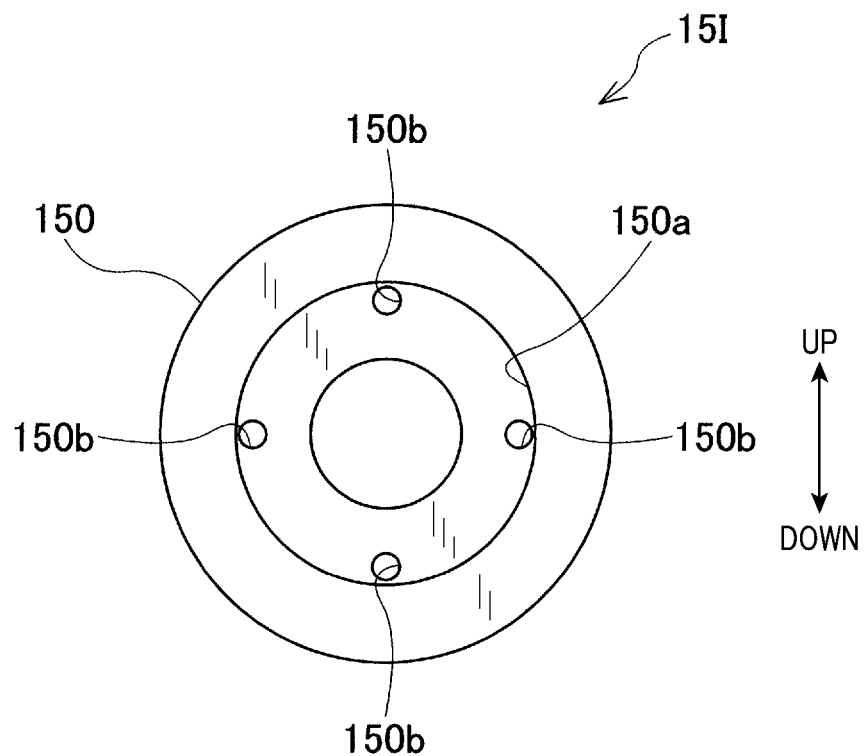
FIG. 48 is a rear view of the rear flow direction regulating member of the rotating electric machine according to the ninth embodiment.

Specifically, the flow direction regulating member 15I includes a main body 150 as shown in FIGS. 46-48. The main body 150 is made, for example, of metal and has a substantially discoid shape. The main body 150 has a flange portion formed at its rear end. In a front surface (or rotor 11-side surface) of the flange portion of the main body 150, there formed both a protrusion 150l and a recess 150m.

Each of the protrusion 150l and the recess 150m extends in the circumferential direction of the main body 150 of the flow direction regulating member 15I (or the circumferential direction of the rotating shaft 10) to have an annular shape (or circular ring shape). The protrusion 150l is formed at the radially outer periphery on the front surface of the flange portion of the main body 150. The recess 150m is formed radially inside the protrusion 150l on the front surface of the flange portion of the main body 150.

In addition, the main body 150 also has a rotating shaft insertion hole 150a and a plurality (e.g., four) of bolt insertion holes 150b as described in the first embodiment.

Figure 45:
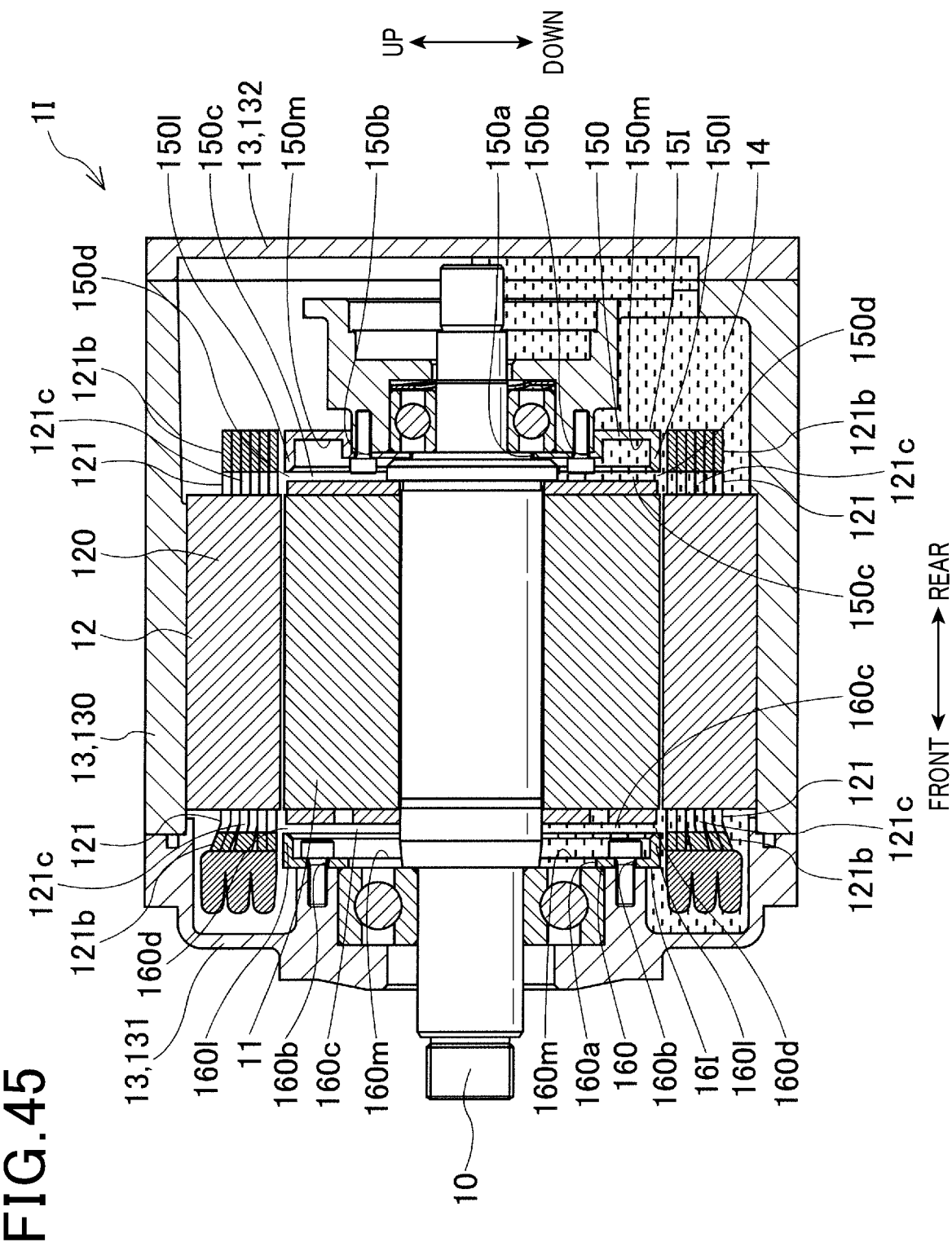
FIG. 45 is a cross-sectional view, taken along an axial direction, of a rotating electric machine according to a ninth embodiment.

As shown in FIG. 45, the flow direction regulating member 15I is arranged, with the rotating shaft 10 inserted in the rotating shaft insertion hole 150a, to have its front surface (i.e., the surface where the protrusion 150l and the recess 150m are formed) axially facing the rear end face of the rotor 11 through an axial gap 150c formed therebetween. Moreover, the flow direction regulating member 15I is fixed to the center housing 130 by the bolts respectively inserted in the bolt insertion holes 150b. The flow direction regulating member 15I regulates the flow direction of the coolant 14 on the rear side of the rotor 11 by means of the axial gap 150c formed between the front surface of the flow direction regulating member 15I and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

Figure 49:
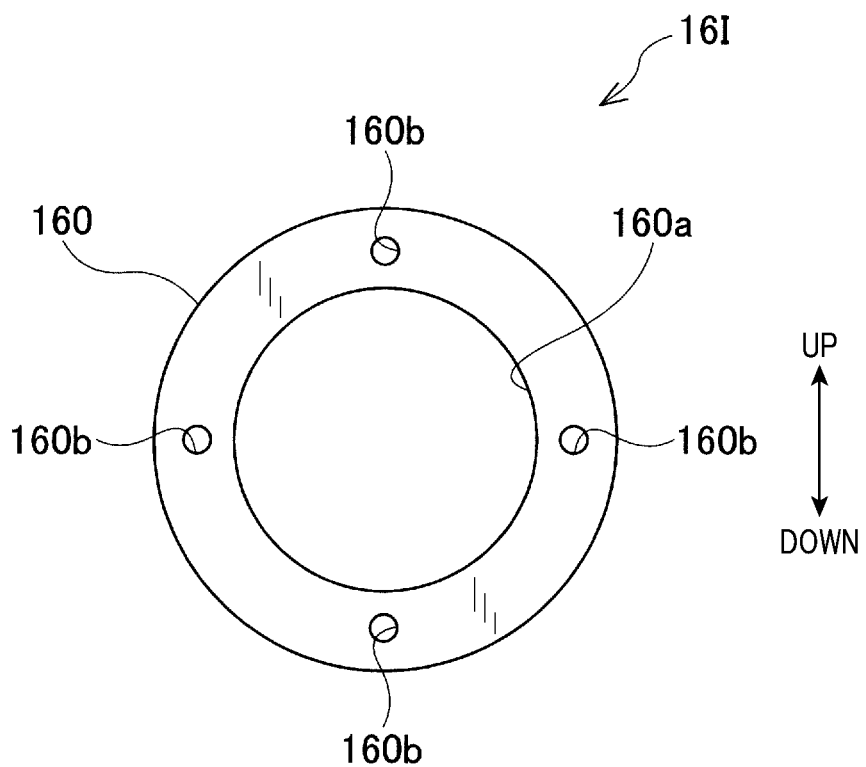
FIG. 49 is a front view of a front flow direction regulating member of the rotating electric machine according to the ninth embodiment.
Figure 50:
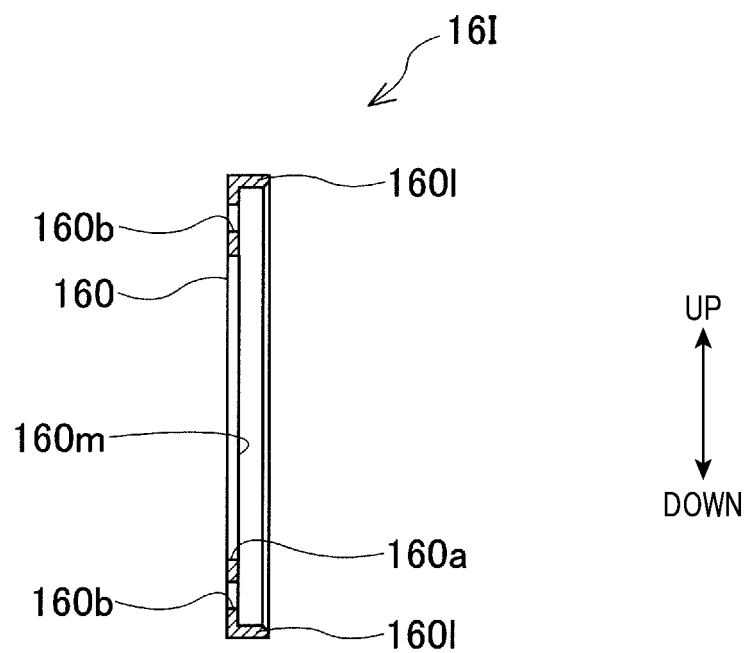
FIG. 50 is a cross-sectional view, taken along the axial direction, of the front flow direction regulating member of the rotating electric machine according to the ninth embodiment.
Figure 51:
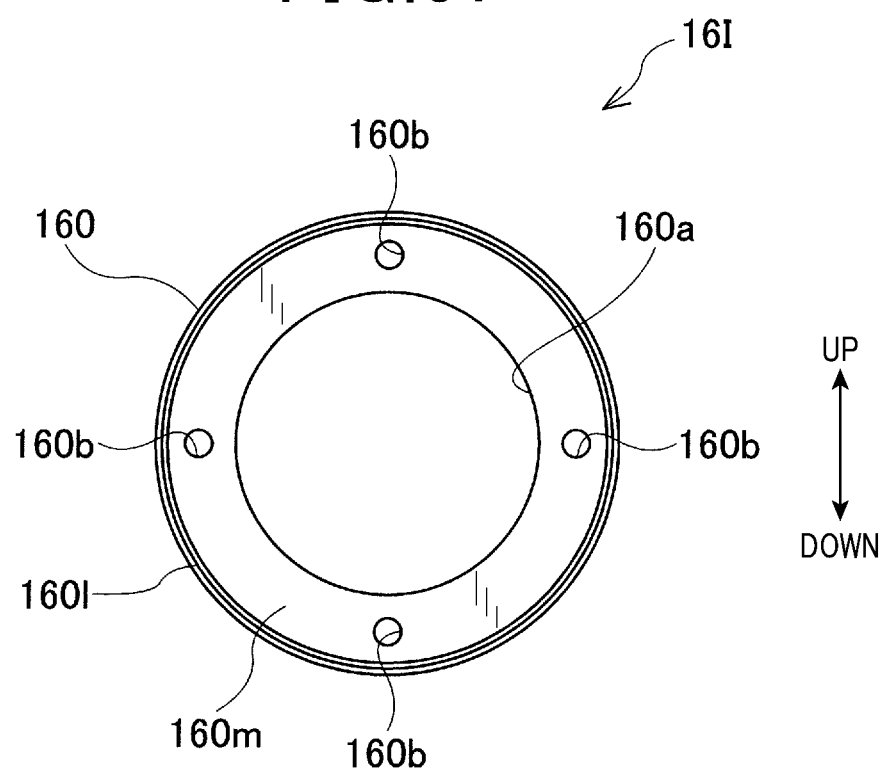
FIG. 51 is a rear view of the front flow direction regulating member of the rotating electric machine according to the ninth embodiment.

On the other hand, the flow direction regulating member 16I includes a main body 160 as shown in FIGS. 49-51. The main body 160 is made, for example, of metal and has a substantially discoid shape. In a rear surface (or rotor 11-side surface) of the main body 160, there formed both a protrusion 160l and a recess 160m.

The protrusion 160l extends in the circumferential direction of the main body 160 of the flow direction regulating member 16I (or the circumferential direction of the rotating shaft 10) to have an annular shape. The protrusion 160l is formed at the radially outer periphery on the rear surface of the main body 160. The recess 160m is formed radially inside and surrounded by the protrusion 160l on the rear surface of the main body 160.

In addition, the main body 160 also has a rotating shaft insertion hole 160a and a plurality (e.g., four) of bolt insertion holes 160b as described in the first embodiment.

As shown in FIG. 45, the flow direction regulating member 16I is arranged, with the rotating shaft 10 inserted in the rotating shaft insertion hole 160a, to have its rear surface (i.e., the surface where the protrusion 160l and the recess 160m are formed) axially facing the front end face of the rotor 11 through an axial gap 160c formed therebetween.

Moreover, the flow direction regulating member 16I is fixed to the front housing 131 by the bolts respectively inserted in the bolt insertion holes 160b. The flow direction regulating member 16I regulates the flow direction of the coolant 14 on the front side of the rotor 11 by means of the axial gap 160c formed between the rear surface of the flow direction regulating member 16I and the front end face of the rotor 11. In addition, the axial gap 160c is axially positioned so that an opening 160d of the axial gap 160c, which is located at the radially outer periphery of the axial gap 160c, radially faces the coil end portions 121b and the space portions 121c on the front side of the stator core 120.

The rotating electric machine 1I according to the present embodiment has the same advantages as the rotating electric machine 1A according to the first embodiment.

Figure 52:
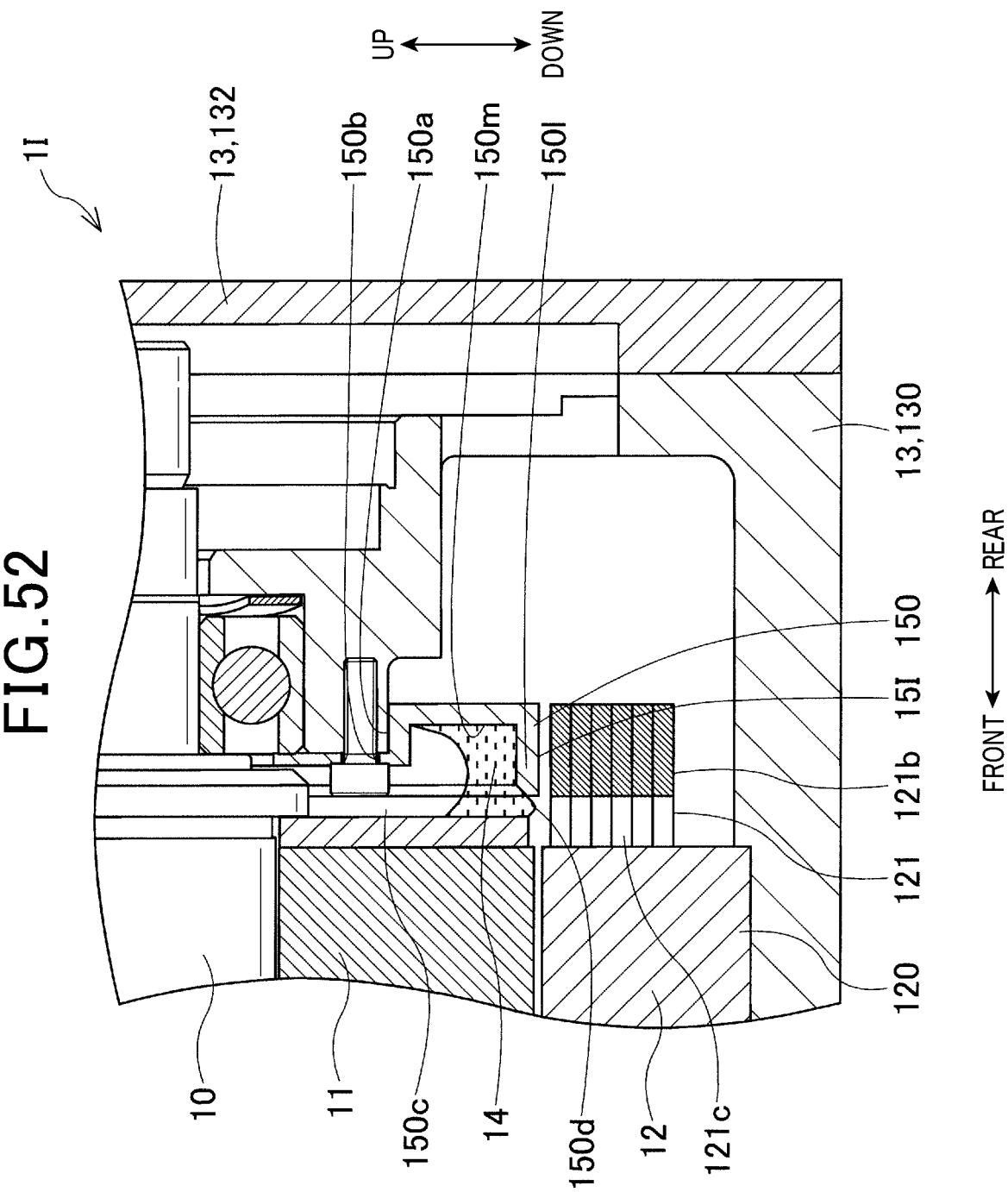
FIG. 52 is an enlarged view of a rear lower part of FIG. 45 illustrating the coolant retaining effect of the rear flow direction regulating member of the rotating electric machine according to the ninth embodiment.

Moreover, in the rotating electric machine 1I according to the present embodiment, the flow direction regulating member 15I has the protrusion 150l formed on the rotor 11-side surface of the main body 150 and extending in the circumferential direction of the main body 150 to have the annular shape. Consequently, as shown in FIG. 52, it is possible to retain the coolant 14 radially inside the annular protrusion 150l over the entire circumference thereof, thereby more effectively cooling the rotor 11 from the rear side. Similarly, the flow direction regulating member 16I has the protrusion 160l formed on the rotor 11-side surface of the main body 160 and extending in the circumferential direction of the main body 160 to have the annular shape. Consequently, though not shown in the figures, it is possible to retain the coolant 14 radially inside the annular protrusion 160l over the entire circumference thereof, thereby more effectively cooling the rotor 11 from the front side.

In addition, it should be noted that for the sake of convenience of explanation, "front", "rear", "up" and "down" are used in FIGS. 45-52 to distinguish directions. It also should be noted that for the sake of ease of understanding, those parts of the rotating electric machine 1I which are actually immersed in the liquid coolant 14 are also shown with continuous lines in FIGS. 45 and 52.

Tenth Embodiment

A rotating electric machine 1J according to a tenth embodiment has almost the same structure as the rotating electric machine 1I according to the ninth embodiment. Accordingly, the differences therebetween will be mainly described hereinafter.

In the ninth embodiment, the rotating electric machine 1I includes the flow direction regulating member 15I that is arranged on the rear side of the rotor 11 and fixed to the center housing 130 (see FIG. 45).

Figure 53:
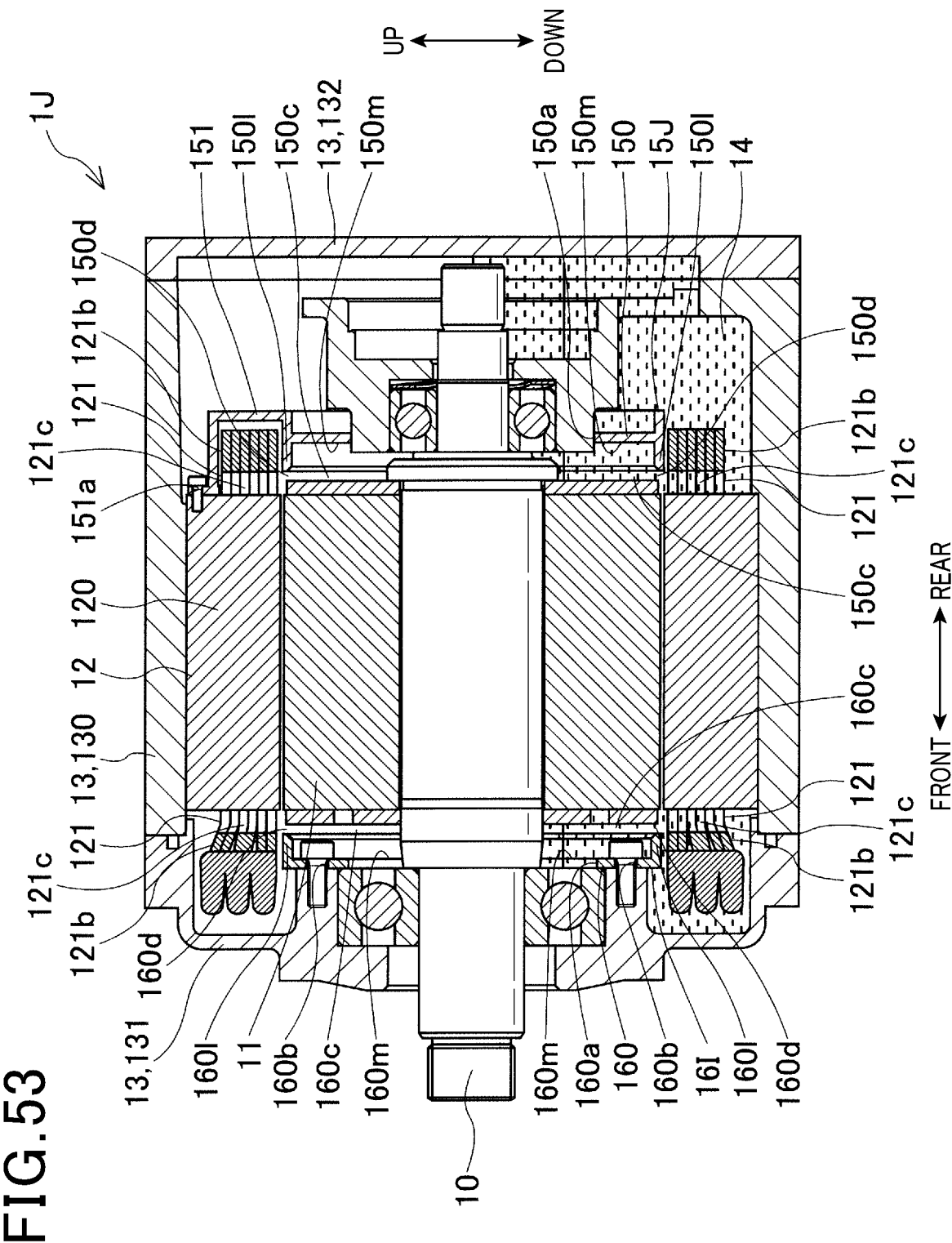
FIG. 53 is a cross-sectional view, taken along an axial direction, of a rotating electric machine according to a tenth embodiment.

In comparison, in the present embodiment, as shown in FIG. 53, the rotating electric machine 1J includes, instead of the flow direction regulating member 15I, a flow direction regulating member 15J that is arranged on the rear side of the rotor 11 and fixed to the stator 12.

Figure 54:
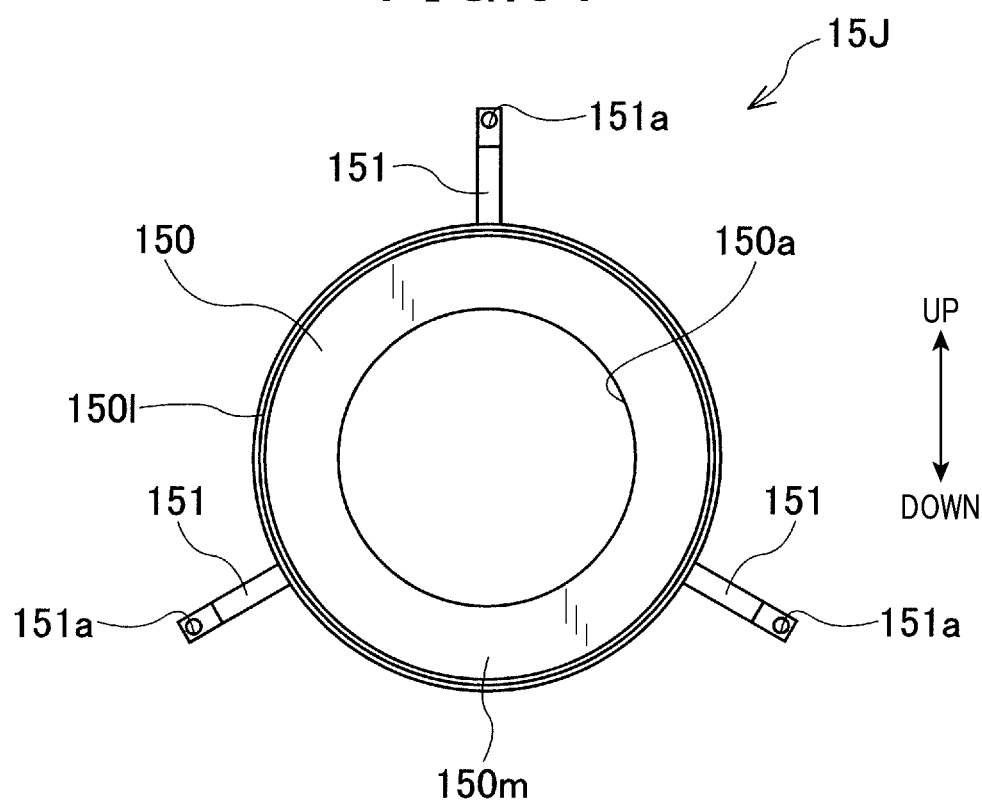
FIG. 54 is a front view of a rear flow direction regulating member of the rotating electric machine according to the tenth embodiment.
Figure 55:
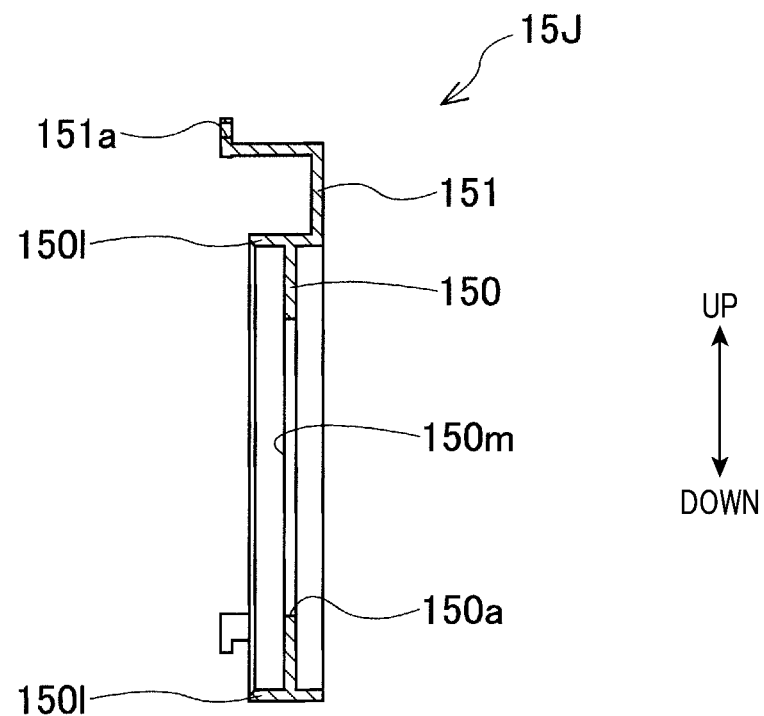
FIG. 55 is a cross-sectional view, taken along the axial direction, of the rear flow direction regulating member of the rotating electric machine according to the tenth embodiment.
Figure 56:
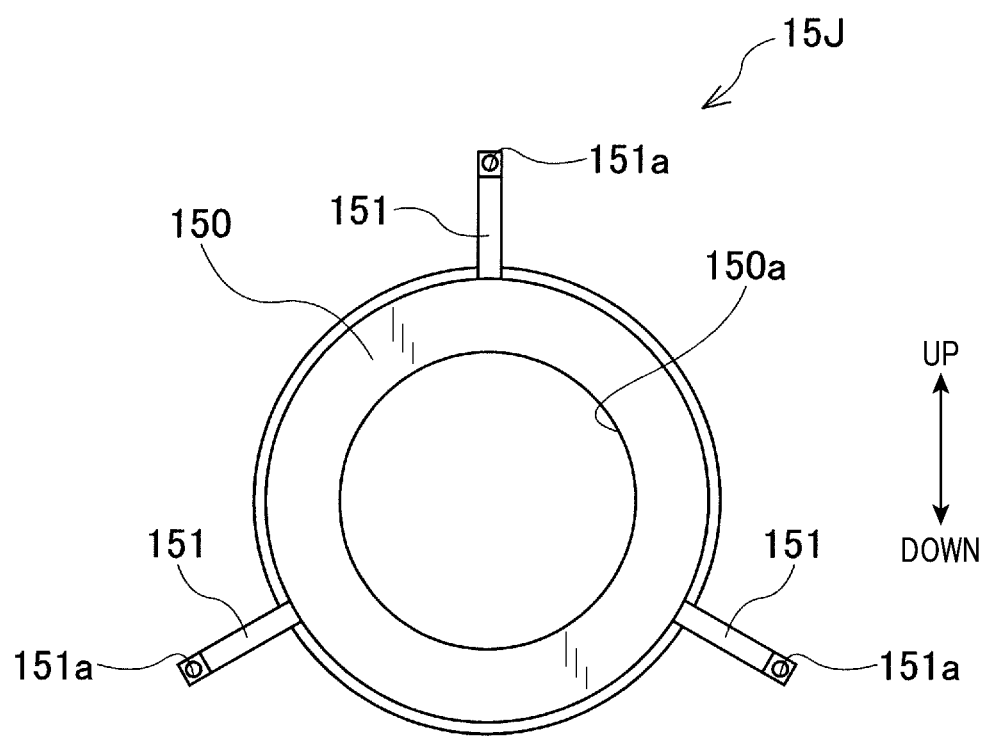
FIG. 56 is a rear view of the rear flow direction regulating member of the rotating electric machine according to the tenth embodiment.

As shown in FIGS. 54-56, the flow direction regulating member 15J includes a main body 150 and a plurality (e.g., three) of fixing portions 151.

The main body 150 is made, for example, of metal and has a substantially discoid shape. In a front surface (or rotor 11-side surface) of the main body 150, there are formed both a protrusion 150l and a recess 150m.

The protrusion 150l extends in the circumferential direction of the main body 150 of the flow direction regulating member 15J (or the circumferential direction of the rotating shaft 10) to have an annular shape. The protrusion 150l is formed at the radially outer periphery on the front surface of the main body 150. The recess 150m is formed radially inside and surrounded by the protrusion 150l on the front surface of the main body 150.

The fixing portions 151 are formed radially outside the main body 150 and circumferentially spaced from one another at equal intervals. Each of the fixing portions 151 is provided in the form of a bent strip to fix the main body 150 to the stator core 120. Each of the fixing portions 151 has a bolt insertion hole 151a formed in a radially outer end portion thereof. The bolt insertion hole 151a is a circular hole into which a bolt for fixing the fixing portion 151 is inserted.

As shown in FIG. 53, the flow direction regulating member 15J is arranged, with the rotating shaft 10 inserted in the rotating shaft insertion hole 150a, to have its front surface (i.e., the surface where the protrusion 150l and the recess 150m are formed) axially facing the rear end face of the rotor 11 through an axial gap 150c formed therebetween. Moreover, the flow direction regulating member 15J is fixed to the stator core 120 by the bolts respectively inserted in the bolt insertion holes 151a. The flow direction regulating member 15J regulates the flow direction of the coolant 14 on the rear side of the rotor 11 by means of the axial gap 150c formed between the front surface of the flow direction regulating member 15J and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1J according to the present embodiment has the same advantages as the rotating electric machine 1I according to the ninth embodiment.

In particular, in the rotating electric machine 1J, the flow direction regulating member 15J is fixed to the stator 12. Therefore, the flow direction regulating member 15J is kept stationary. Consequently, it becomes possible to eliminate the loss which otherwise might be caused by movement (or rotation) of the flow direction regulating member 15J.

In addition, it should be noted that for the sake of convenience of explanation, "front", "rear", "up" and "down" are used in FIGS. 53-56 to distinguish directions. It also should be noted that for the sake of ease of understanding, those parts of the rotating electric machine 1J which are actually immersed in the liquid coolant 14 are also shown with continuous lines in FIG. 53.

Eleventh Embodiment

A rotating electric machine 1K according to an eleventh embodiment has almost the same structure as the rotating electric machine 1A according to the first embodiment. Accordingly, the differences therebetween will be mainly described hereinafter.

In the first embodiment, the rotating electric machine 1A includes the flow direction regulating members 15A and 16A that are arranged respectively on the rear and front sides of the rotor 11 and fixed respectively to the center and front housings 130 and 131 (see FIGS. 1A and 3-8).

In comparison, in the present embodiment, as shown in FIGS. 57-63, the rotating electric machine 1K includes, instead of the flow direction regulating members 15A and 16A, flow direction regulating members 15K and 16K that are respectively arranged on the rear and front sides of the rotor 11 and both fixed to the rotating shaft 10.

Figure 58:
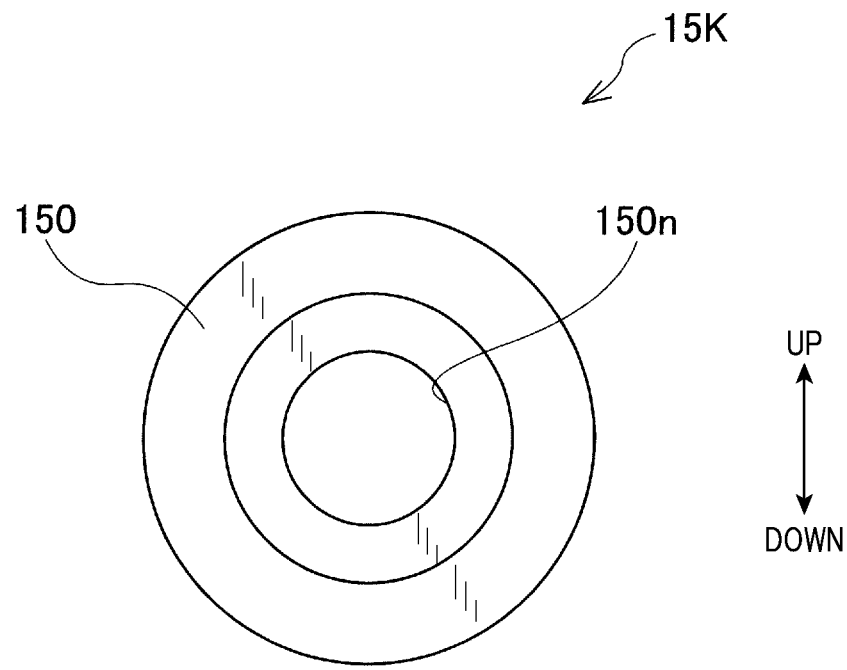
FIG. 58 is a front view of a rear flow direction regulating member of the rotating electric machine according to the eleventh embodiment.
Figure 59:
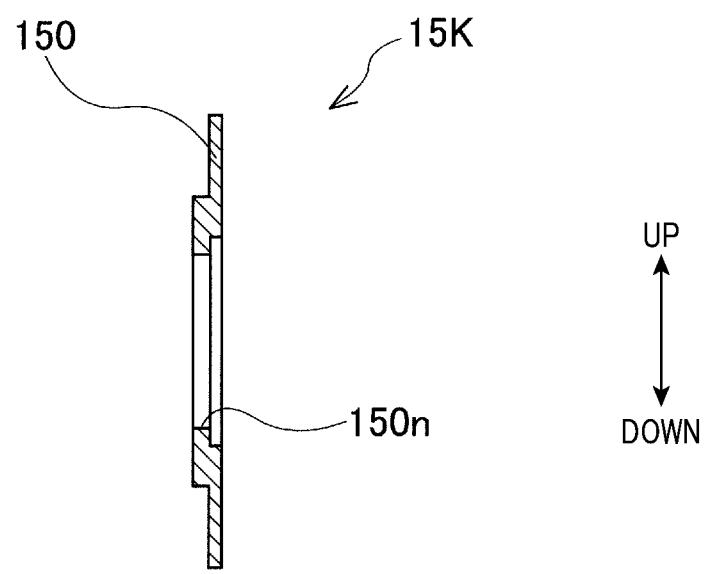
FIG. 59 is a cross-sectional view, taken along the axial direction, of the rear flow direction regulating member of the rotating electric machine according to the eleventh embodiment.
Figure 60:
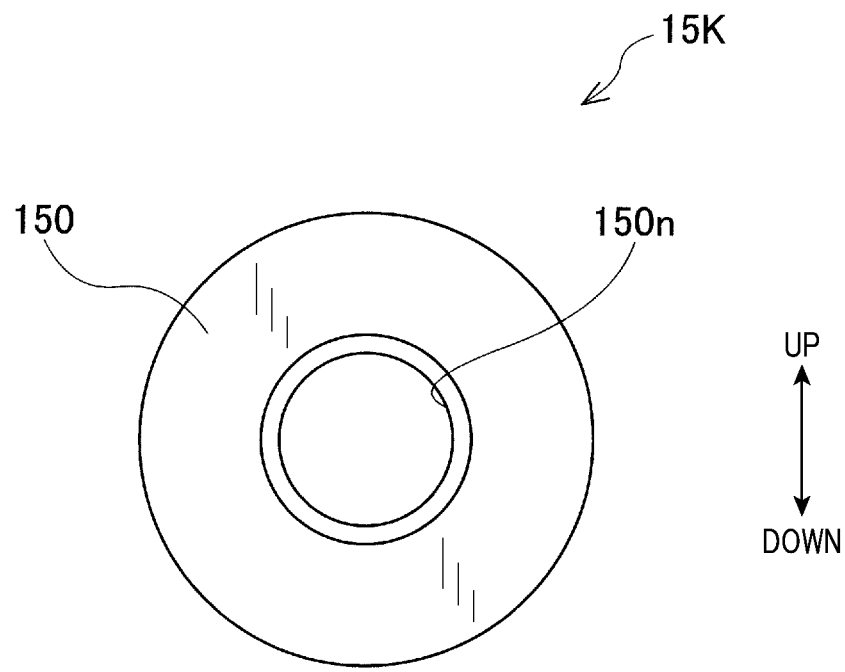
FIG. 60 is a rear view of the rear flow direction regulating member of the rotating electric machine according to the eleventh embodiment.

Specifically, the flow direction regulating member 15K includes a main body 150 as shown in FIGS. 58-60. The main body 150 is made, for example, of metal and has a substantially discoid shape. The main body 150 has a rotating shaft fitting hole 150n formed in a central part thereof. The rotating shaft fitting hole 150n is a circular hole into which the rotating shaft 10 is press-fitted. In addition, the main body 150 has a flange portion formed at its rear end.

Figure 57:
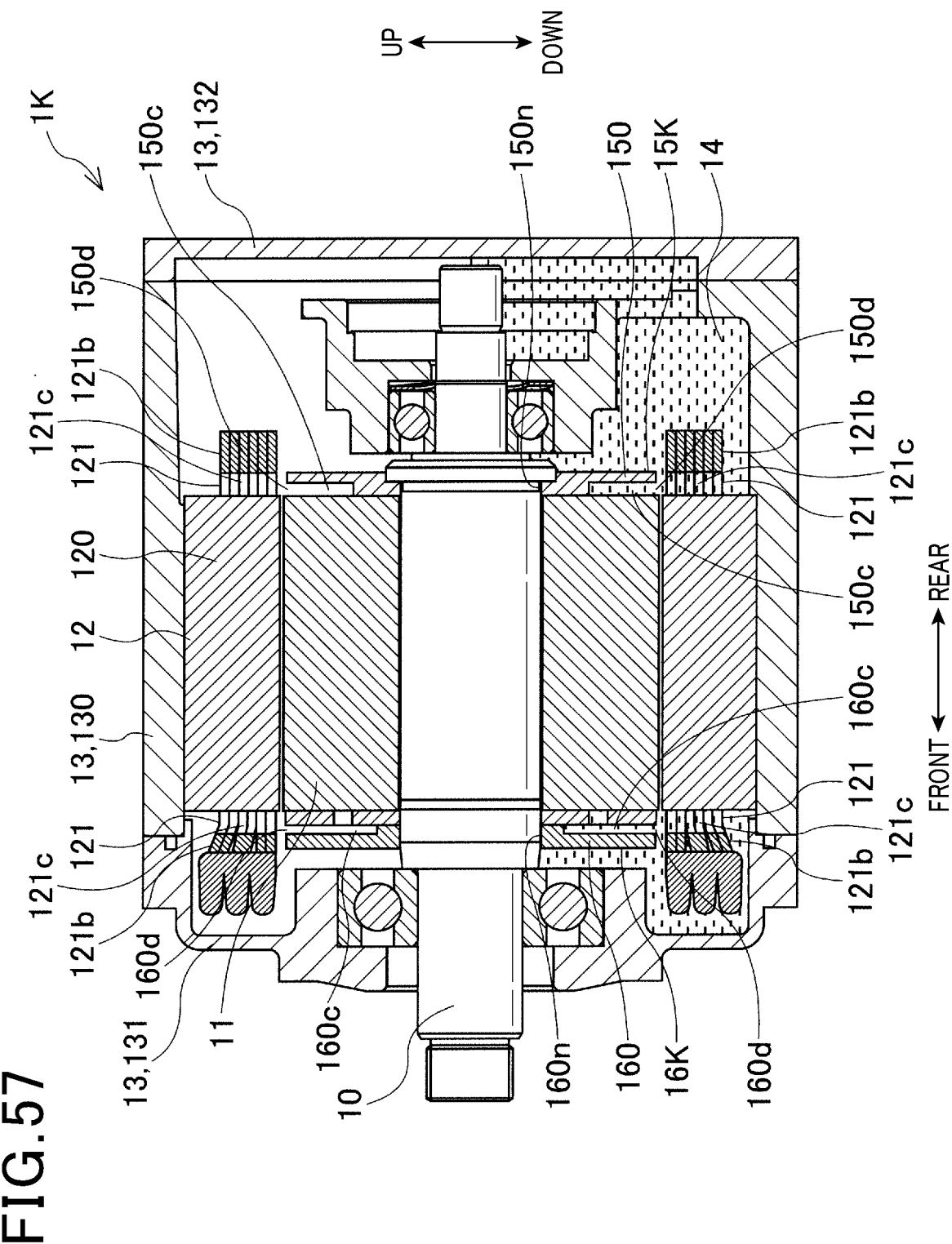
FIG. 57 is a cross-sectional view, taken along an axial direction, of a rotating electric machine according to an eleventh embodiment.

As shown in FIG. 57, the flow direction regulating member 15K is fixed to the rotating shaft 10, by press-fitting the rotating shaft 10 into the rotating shaft fitting hole 150n, so as to axially face the rear end face of the rotor 11 through an axial gap 150c formed therebetween. The flow direction regulating member 15K regulates the flow direction of the coolant 14 on the rear side of the rotor 11 by means of the axial gap 150c formed between the flow direction regulating member 15K and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

Figure 61:
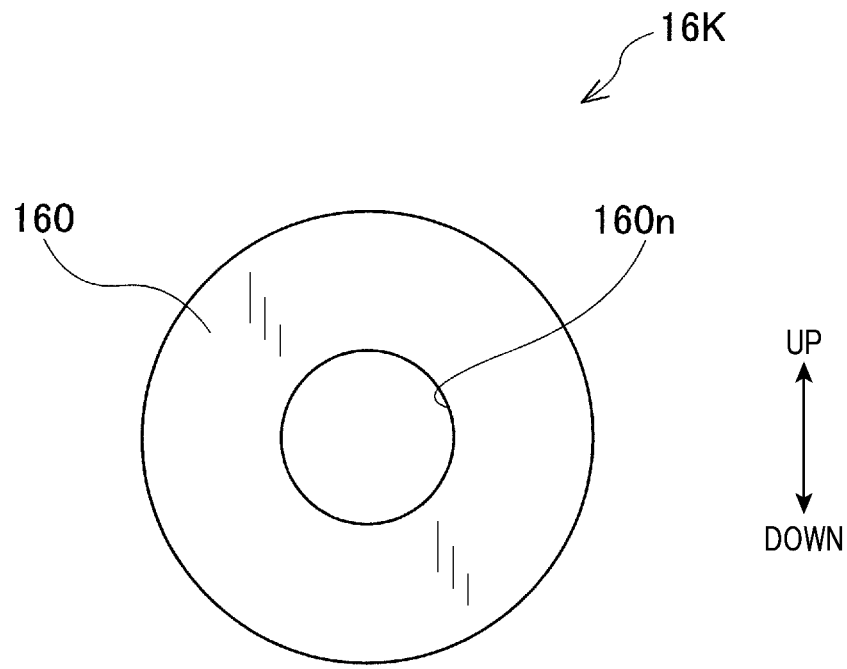
FIG. 61 is a front view of a front flow direction regulating member of the rotating electric machine according to the eleventh embodiment.
Figure 62:
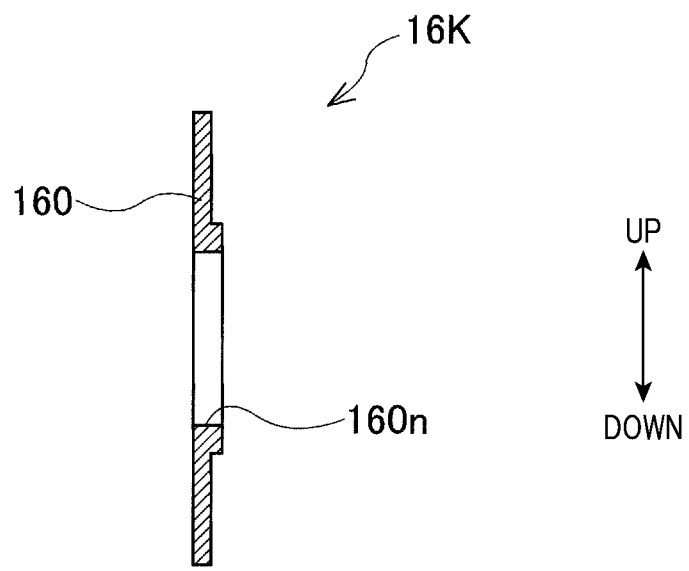
FIG. 62 is a cross-sectional view, taken along the axial direction, of the front flow direction regulating member of the rotating electric machine according to the eleventh embodiment.
Figure 63:
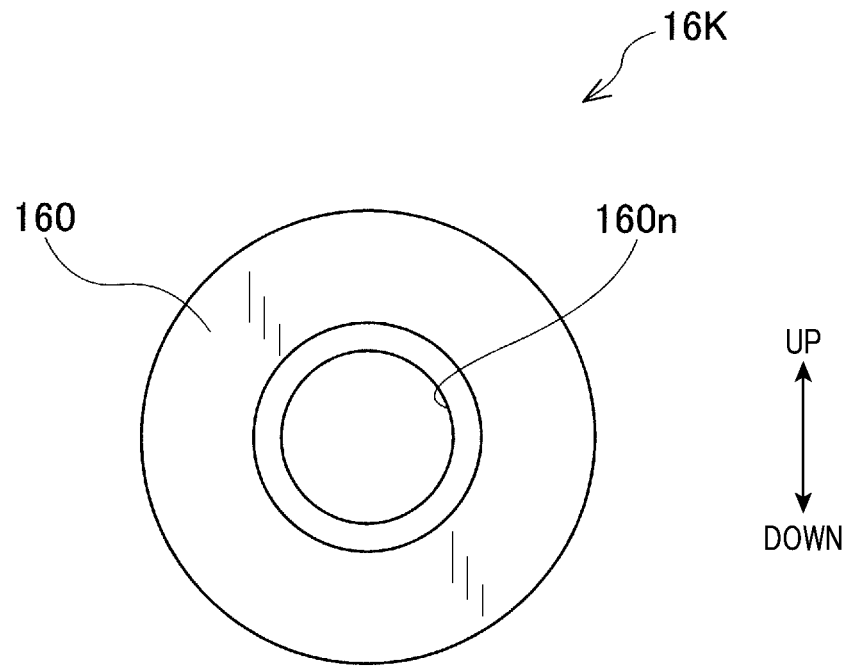
FIG. 63 is a rear view of the front flow direction regulating member of the rotating electric machine according to the eleventh embodiment.

Similarly, the flow direction regulating member 16K includes a main body 160 as shown in FIGS. 61-63. The main body 160 is made, for example, of metal and has a substantially discoid shape. The main body 160 has a rotating shaft fitting hole 160n formed in a central part thereof. The rotating shaft fitting hole 160n is a circular hole into which the rotating shaft 10 is press-fitted. In addition, the main body 160 has a flange portion formed at its front end.

As shown in FIG. 57, the flow direction regulating member 16K is fixed to the rotating shaft 10, by press-fitting the rotating shaft 10 into the rotating shaft fitting hole 160n, so as to axially face the front end face of the rotor 11 through an axial gap 160c formed therebetween. The flow direction regulating member 16K regulates the flow direction of the coolant 14 on the front side of the rotor 11 by means of the axial gap 160c formed between the flow direction regulating member 16K and the front end face of the rotor 11. In addition, the axial gap 160c is axially positioned so that an opening 160d of the axial gap 160c, which is located at the radially outer periphery of the axial gap 160c, radially faces the coil end portions 121b and the space portions 121c on the front side of the stator core 120.

The rotating electric machine 1K according to the present embodiment has the same advantages as the rotating electric machine 1A according to the first embodiment.

Moreover, in the rotating electric machine 1K according to the present embodiment, both the flow direction regulating members 15K and 16K are fixed to the rotating shaft 10. Therefore, both the flow direction regulating members 15K and 16K rotate together with the rotor 11. Consequently, compared to the case where both the flow direction regulating members 15K and 16K are kept stationary without rotating together with the rotor 11, it is possible to increase the flow speed of the coolant 14 in the axial gaps 150c and 160c, thereby more effectively discharging the coolant 14 which has flowed into the annular gap between the radially inner peripheral surface of the stator 12 and the radially outer peripheral surface of the rotor 11.

In addition, it should be noted that for the sake of convenience of explanation, "front", "rear", "up" and "down" are used in FIGS. 57-63 to distinguish directions. It also should be noted that for the sake of ease of understanding, those parts of the rotating electric machine 1K which are actually immersed in the liquid coolant 14 are also shown with continuous lines in FIG. 57.

Twelfth Embodiment

A rotating electric machine 1L according to a twelfth embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and fixed to the center housing 130 (see FIG. 1A).

In comparison, in the present embodiment, as shown in FIGS. 64-71, the rotating electric machine 1L includes, instead of the flow direction regulating member 15A, a flow direction regulating member 15L that is arranged on the rear side of the rotor 11 and configured to be axially movable.

Specifically, the rotating electric machine 1L according to the present embodiment includes the flow direction regulating member 15L, a supporting member 17L for supporting the flow direction regulating member 15L, and a plurality (e.g., three) pressing members 18 for pressing the flow direction regulating member 15L backward (or in the axial direction away from the rotor 11).

Figure 65:
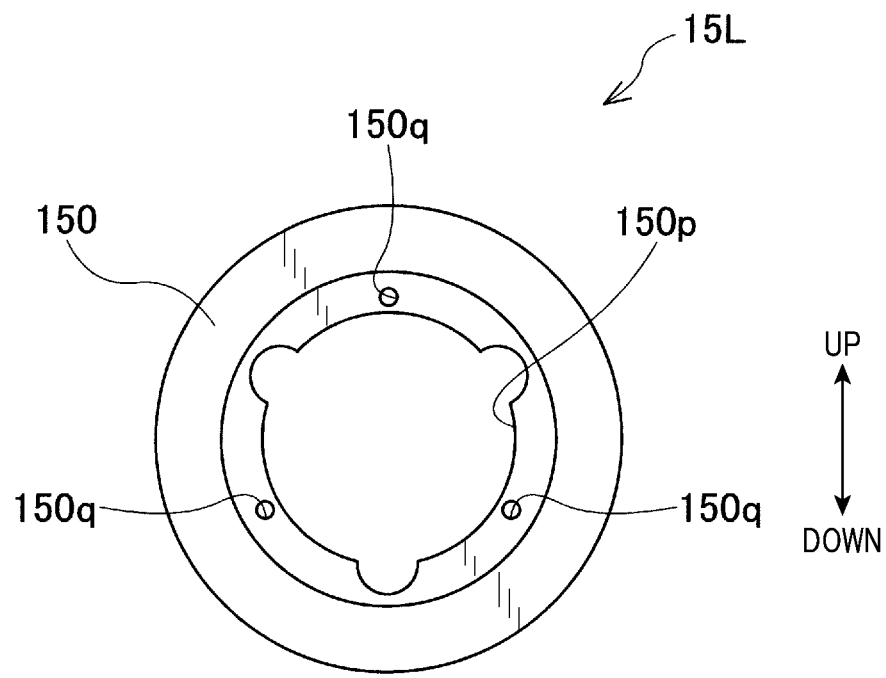
FIG. 65 is a front view of a rear flow direction regulating member of the rotating electric machine according to the twelfth embodiment.
Figure 66:
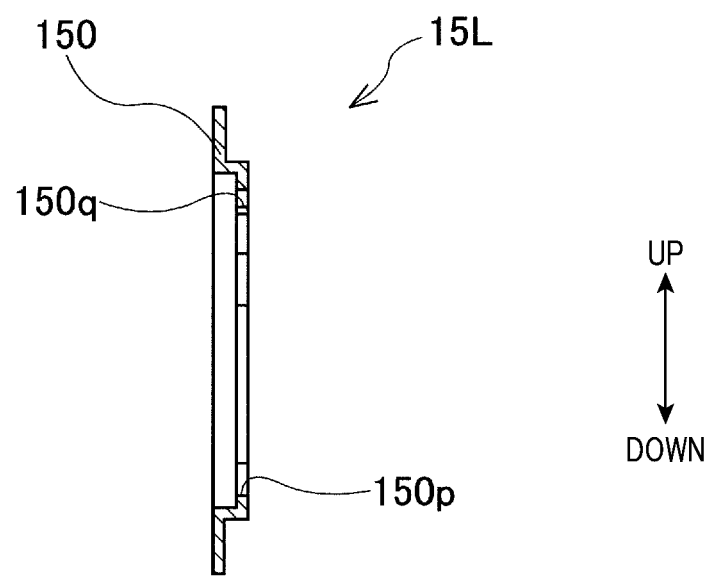
FIG. 66 is a cross-sectional view, taken along the axial direction, of the rear flow direction regulating member of the rotating electric machine according to the twelfth embodiment.
Figure 67:
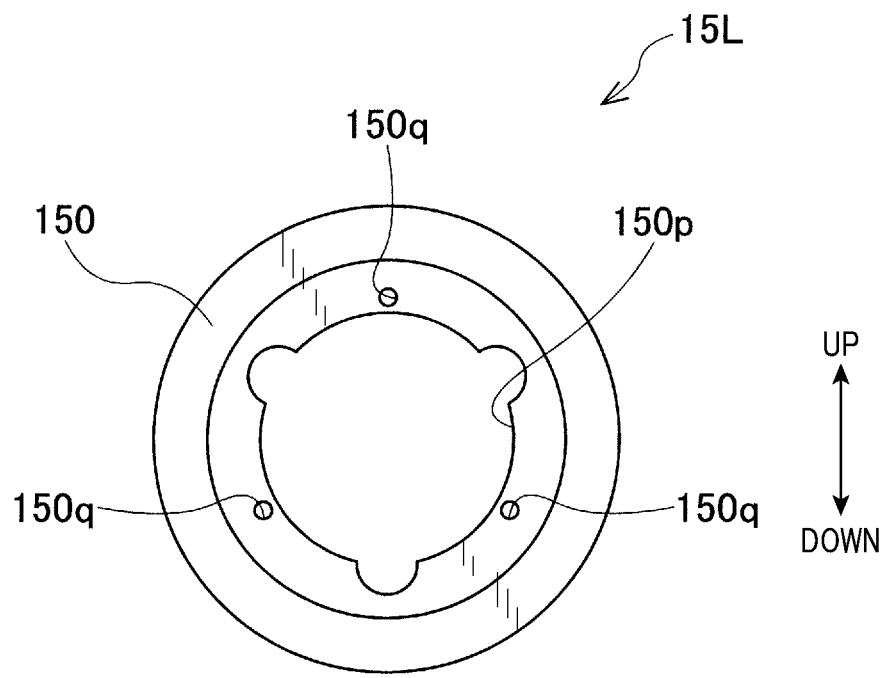
FIG. 67 is a rear view of the rear flow direction regulating member of the rotating electric machine according to the twelfth embodiment.

The flow direction regulating member 15L includes a main body 150 as shown in FIGS. 65-67. The main body 150 is made, for example, of metal and has a substantially discoid shape. The main body 150 has a supporting member insertion hole 150p and a plurality (e.g., three) of pin insertion holes 150q. In addition, the main body 150 has a flange portion formed at its front end.

The supporting member insertion hole 150p is a hole into which the supporting member 17L is inserted. The dimensions of the supporting member insertion hole 150p are set so that the flow direction regulating member 15L is axially movable along the supporting member 17L. The supporting member insertion hole 150p is formed in a central part of the main body 150.

The pin insertion holes 150q are holes into which pins for holding the pressing members 18 are respectively inserted. The inner diameter of the pin insertion holes 150q is set to be greater than the outer diameter of the pins. The pin insertion holes 150q are formed radially outside the supporting member insertion hole 150p and circumferentially spaced from one another at equal intervals.

Figure 68:
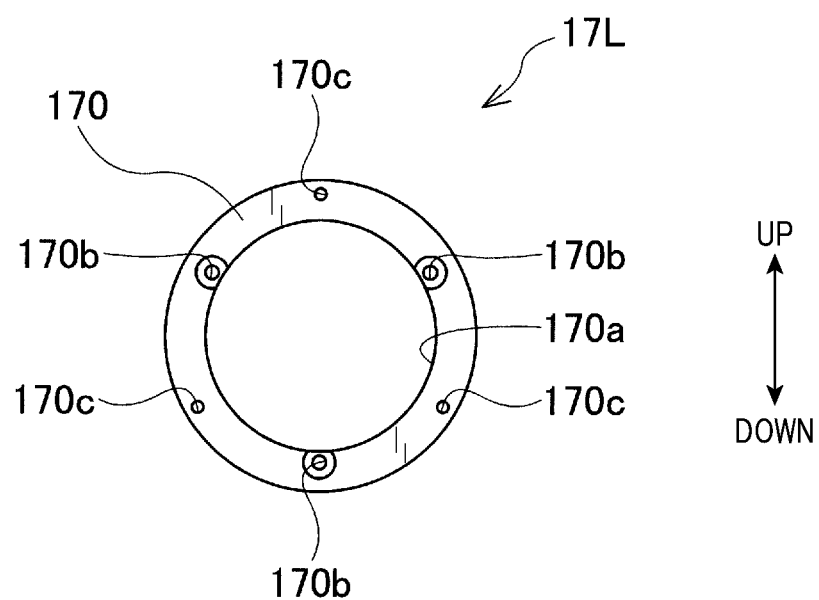
FIG. 68 is a front view of a supporting member of the rotating electric machine according to the twelfth embodiment.
Figure 69:
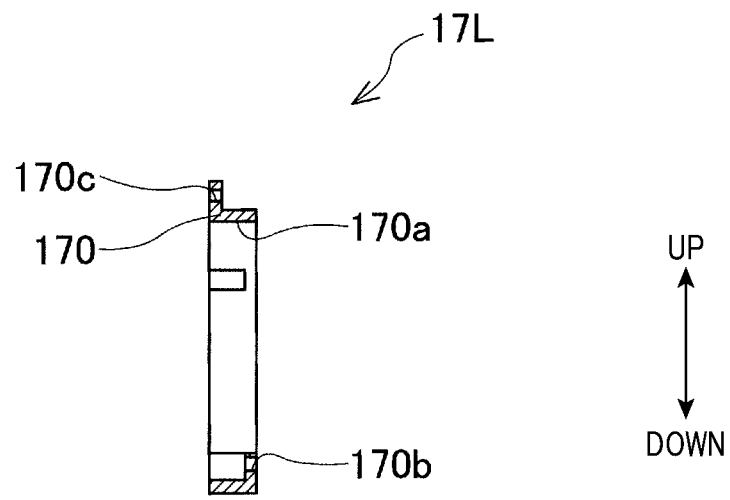
FIG. 69 is a cross-sectional view, taken along the axial direction, of the supporting member of the rotating electric machine according to the twelfth embodiment.
Figure 70:
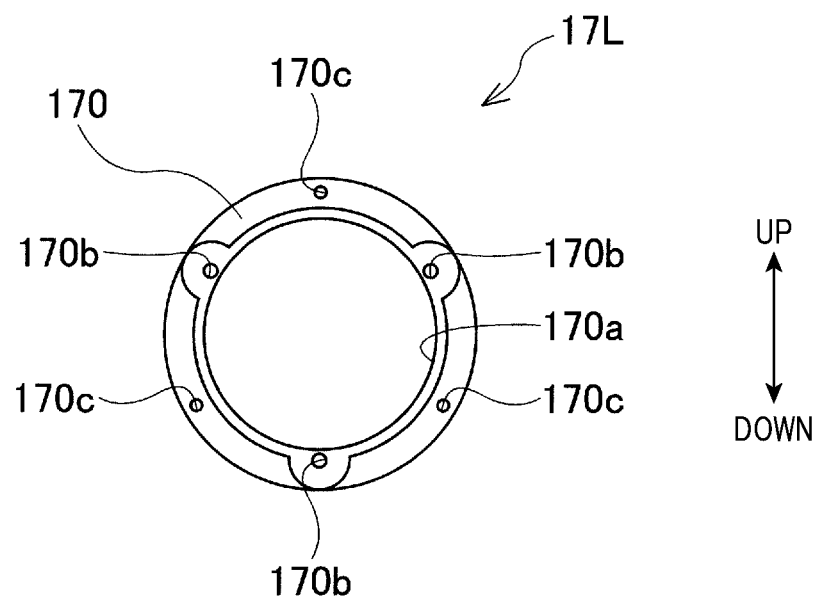
FIG. 70 is a rear view of the supporting member of the rotating electric machine according to the twelfth embodiment.

The supporting member 17L is provided to axially movably support the flow direction regulating member 15L. The supporting member 17L includes a main body 170 as shown in FIGS. 68-70. The main body 170 is made, for example, of metal and has a substantially discoid shape. The main body 170 has a rotating shaft insertion hole 170a, a plurality (e.g., three) of bolt insertion holes 170b and a plurality (e.g., three) of pin fitting holes 170c. In addition, the main body 170 has a flange portion formed at its front end.

The rotating shaft insertion hole 170a is a circular hole into which the rotating shaft 10 is inserted. The rotating shaft insertion hole 170a is formed in a central part of the main body 170.

The bolt insertion holes 170b are circular holes into which bolts for fixing the main body 170 are respectively inserted. The bolt insertion holes 170b are formed radially outside the rotating shaft insertion hole 170a and circumferentially spaced from one another at equal intervals.

The pin fitting holes 170c are holes into which the pins for holding the pressing members 18 are respectively fitted. The pin fitting holes 170c are formed radially outside the rotating shaft insertion hole 170a and circumferentially spaced from one another at equal intervals. In addition, the pin fitting holes 170c are circumferentially arranged alternately with the bolt insertion holes 170b.

The pressing members 18 are provided to press the flow direction regulating member 15L backward (or in the axial direction away from the rotor 11). Each of the pressing members 18 is held by one of the pins. In addition, each of the pressing members 18 is implemented by, for example, a spring 180.

Figure 64:
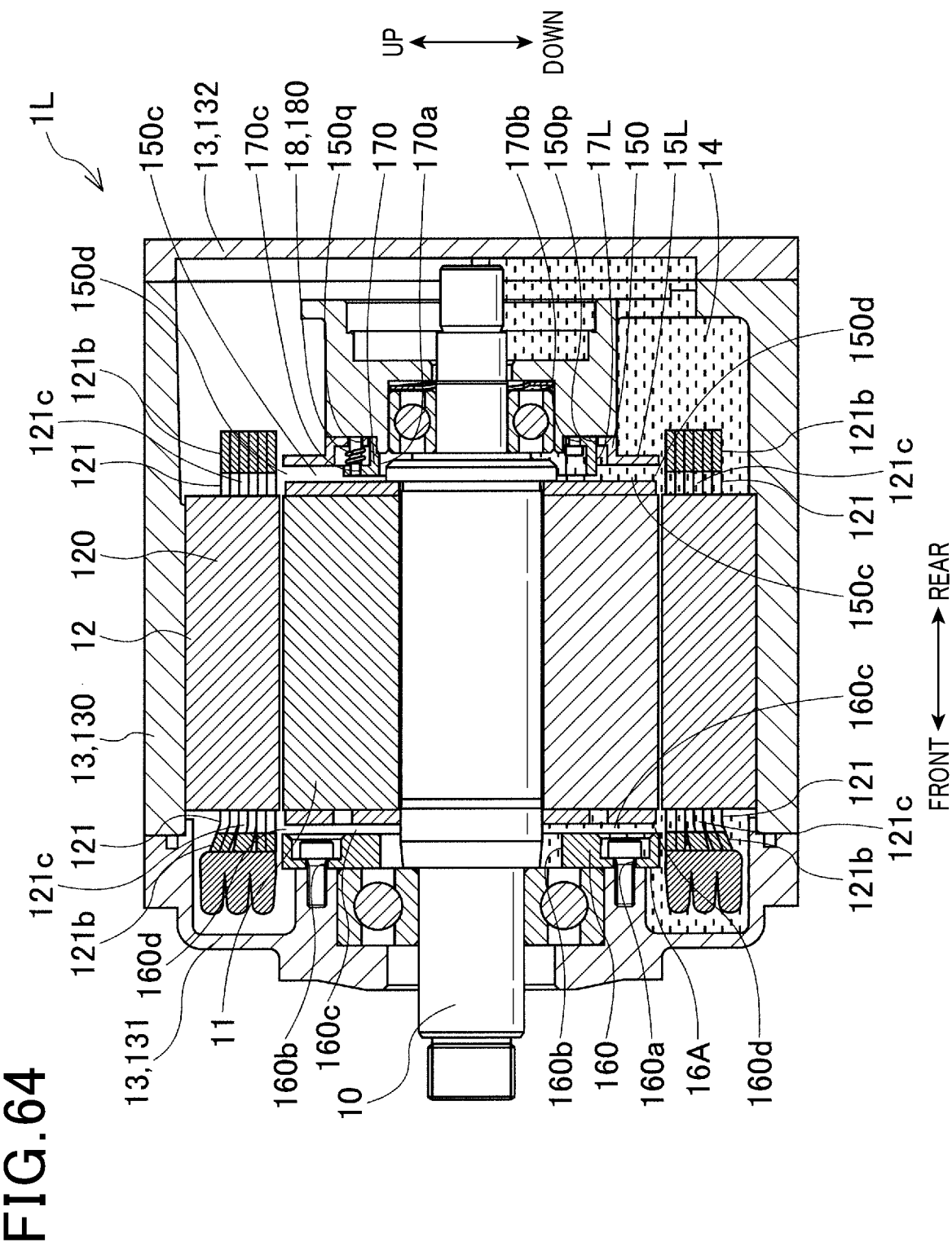
FIG. 64 is a cross-sectional view, taken along an axial direction, of a rotating electric machine according to a twelfth embodiment.

As shown in FIG. 64, the flow direction regulating member 15L is arranged to axially face the rear end face of the rotor 11 through an axial gap 150c formed therebetween. The supporting member 17L is arranged on the front side of the flow direction regulating member 15L, with the rotating shaft 10 inserted in the rotating shaft insertion hole 170a and a rear end portion of the main body 170 inserted in the supporting member insertion hole 150p of the flow direction regulating member 15L. Moreover, the supporting member 17L is fixed to the center housing 130 by the bolts respectively inserted in the bolt insertion holes 170b. With the above configuration, the flow direction regulating member 15L is axially movable along the main body 170 of the supporting member 17L. The flow direction regulating member 15L regulates the flow direction of the coolant 14 on the rear side of the rotor 11 by means of the axial gap 150c formed between the flow direction regulating member 15L and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

Each of the pins has one of the pressing members 18 (or the springs 180) held thereon. Moreover, each of the pins has its front end fixedly fitted in one of the pin fitting holes 170c of the supporting member 17L and its rear end inserted in one of the pin insertion holes 150q of the flow direction regulating member 15L. With the above configuration, when the flow direction regulating member 15L is moved forward (or in the axial direction toward the rotor 11), the pressing members 18 press the flow direction regulating member 15L backward (or in the axial direction away from the rotor 11).

The rotating electric machine 1L according to the present embodiment has the same advantages as the rotating electric machine 1A according to the first embodiment.

Moreover, in the rotating electric machine 1L according to the present embodiment, the flow direction regulating member 15L is provided in an axially movable manner. Therefore, it is possible to adjust the size of the axial gap 150c between the flow direction regulating member 15L and the rear end face of the rotor 11 by axially moving the flow direction regulating member 15L. Consequently, it is possible to adjust the flow speed of the coolant 14 in the axial gap 150c. As a result, it is possible to adjust the negative pressure created by the Venturi effect, thereby adjusting the capability of the rotating electric machine 1L to discharge the coolant 14 which has flowed into the annular gap between the radially inner peripheral surface of the stator 12 and the radially outer peripheral surface of the rotor 11.

Figure 71:
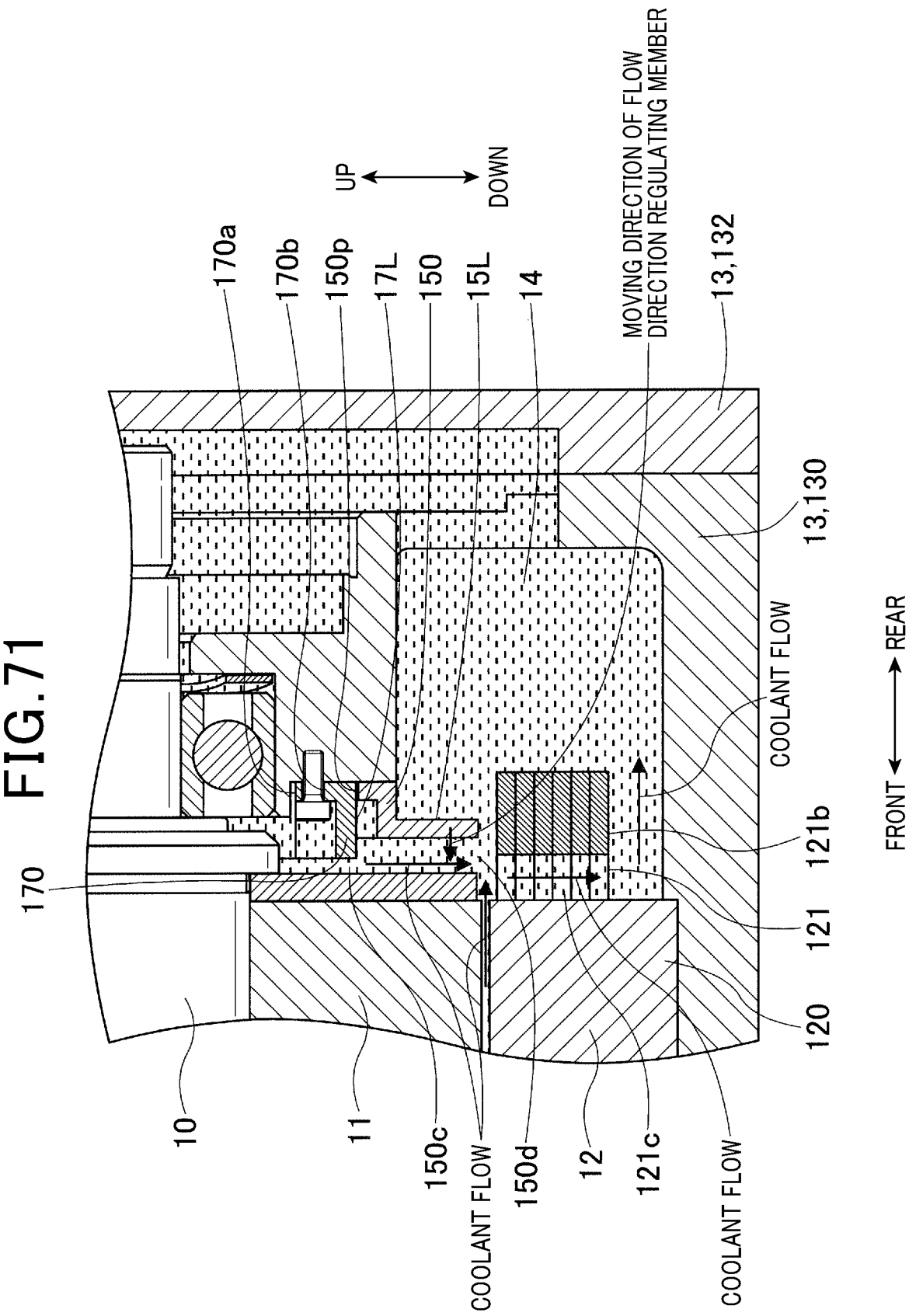
FIG. 71 is an enlarged view of a rear lower part of FIG. 64 illustrating the operation of the rear flow direction regulating member of the rotating electric machine according to the twelfth embodiment.

Furthermore, with increase in the rotational speed of the rotor 11, the flow speed of the coolant 14 in the axial gap 150c increases, thereby increasing the negative pressure created by the Venturi effect. Consequently, by the increased negative pressure, the flow direction regulating member 15L is moved forward (or axially toward the rotor 11) as shown in FIG. 71. However, in the present embodiment, there are provided the pressing members 18 to press the flow direction regulating member 15L backward (or in the axial direction away from the rotor 11). Consequently, due to the pressing force of the pressing members 18, the flow direction regulating member 15L is gradually moved forward with increase in the rotational speed of the rotor 11. As a result, it is possible to gradually increase the capability of the rotating electric machine 1L to discharge the coolant 14 with increase in the rotational speed of the rotor 11.

In the present embodiment, each of the pressing members 18 is implemented by a spring 180. Consequently, by the springs 180, it is possible to reliably press the flow direction regulating member 15L backward.

In addition, it should be noted that for the sake of convenience of explanation, "front", "rear", "up" and "down" are used in FIGS. 64-71 to distinguish directions. It also should be noted that for the sake of ease of understanding, those parts of the rotating electric machine 1L which are actually immersed in the liquid coolant 14 are also shown with continuous lines in FIGS. 64 and 71.

Thirteenth Embodiment

A rotating electric machine 1M according to a thirteenth embodiment has almost the same structure as the rotating electric machine 1L according to the twelfth embodiment. Accordingly, the differences therebetween will be mainly described hereinafter.

In the twelfth embodiment, the rotating electric machine 1L includes the flow direction regulating member 15L that is arranged on the rear side of the rotor 11 and pressed backward by the pressing members 18 each of which is implemented by a spring 180 (see FIG. 64).

Figure 72:
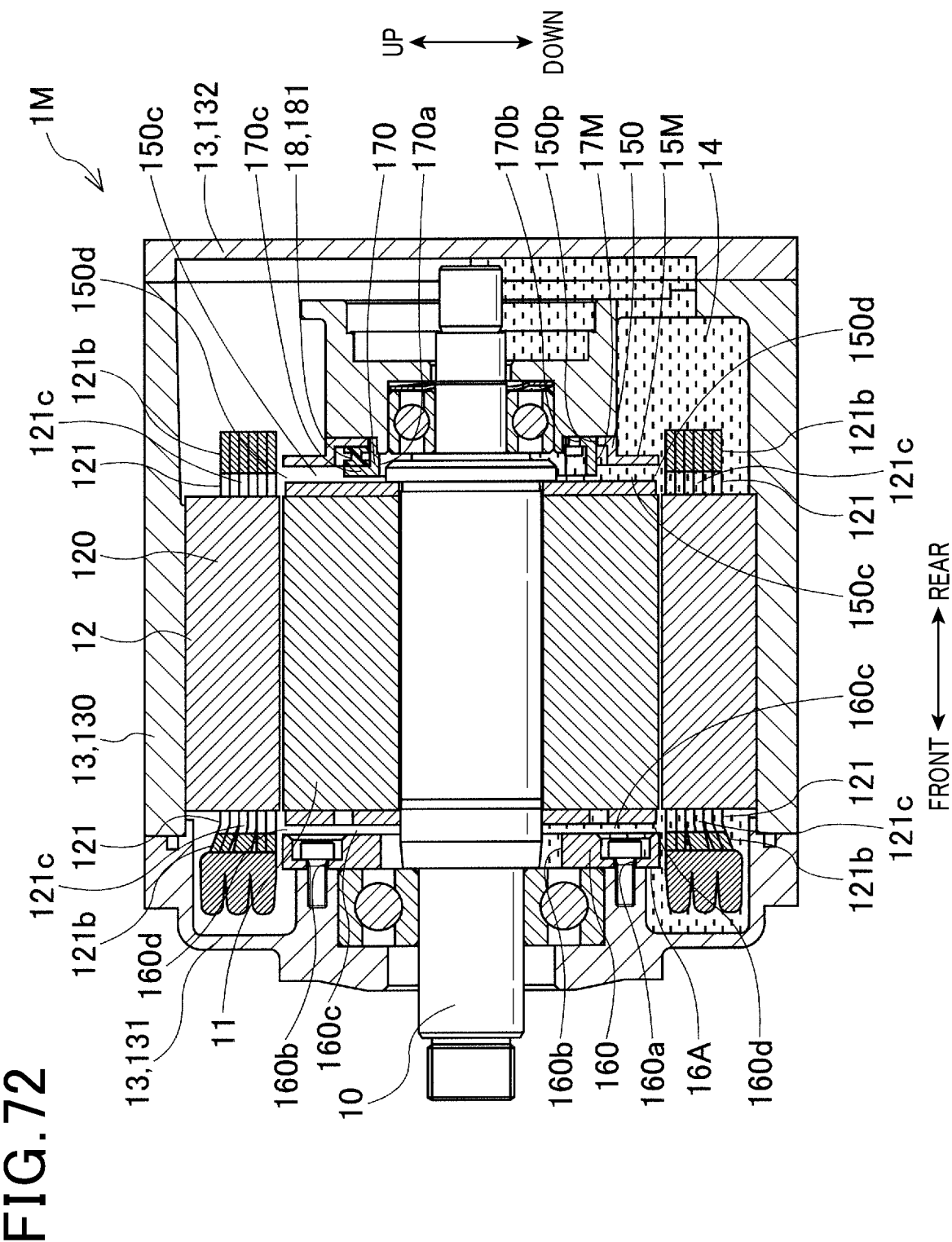
FIG. 72 is a cross-sectional view, taken along an axial direction, of a rotating electric machine according to a thirteenth embodiment.

In comparison, in the present embodiment, as shown in FIG. 72, the rotating electric machine 1M includes, instead of the flow direction regulating member 15L, a flow direction regulating member 15M that is arranged on the rear side of the rotor 11 and pressed backward by a pressing member 18 that is implemented by a rubber member 181.

Specifically, the rotating electric machine 1M according to the present embodiment includes the flow direction regulating member 15M, a supporting member 17M for supporting the flow direction regulating member 15M, and the pressing member 18 for pressing the flow direction regulating member 15M backward (or in the axial direction away from the rotor 11).

The flow direction regulating member 15M differs from the flow direction regulating member 15L described in the twelfth embodiment only in that the flow direction regulating member 15M has no pin insertion holes 150q formed therein.

The supporting member 17M differs from the supporting member 17L described in the twelfth embodiment only in that the supporting member 17M has no pin fitting holes 170c formed therein.

In the present embodiment, the pressing member 18 is implemented by the rubber member 181 that is annular in overall shape and has a substantially H-shaped cross section.

The flow direction regulating member 15M and the supporting member 17M are arranged in the same manner as the flow direction regulating member 15L and the supporting member 17L described in the twelfth embodiment. The rubber member 181 is axially interposed between the flow direction regulating member 15M and the supporting member 17M.

The rotating electric machine 1M according to the present embodiment has the same advantages as the rotating electric machine 1L according to the twelfth embodiment.

In particular, in the rotating electric machine 1M according to the present embodiment, the pressing member 18 is implemented by the rubber member 181. Consequently, by the rubber member 181, it is possible to reliably press the flow direction regulating member 15M backward.

In addition, it should be noted that for the sake of convenience of explanation, "front", "rear", "up" and "down" are used in FIG. 72 to distinguish directions. It also should be noted that for the sake of ease of understanding, those parts of the rotating electric machine 1M which are actually immersed in the liquid coolant 14 are also shown with continuous lines in FIG. 72.

Fourteenth Embodiment

A rotating electric machine 1N according to a fourteenth embodiment has almost the same structure as the rotating electric machine 1A according to the first embodiment. Accordingly, the differences therebetween will be mainly described hereinafter.

In the first embodiment, the rotating electric machine 1A includes the flow direction regulating member 15A that is arranged on the rear side of the rotor 11 and has no elastic flange portion provided therein (see FIGS. 1A and 3-5).

In comparison, in the present embodiment, as shown in FIGS. 73-77, the rotating electric machine 1N includes, instead of the flow direction regulating member 15A, a flow direction regulating member 15N that is arranged on the rear side of the rotor 11 and has an elastic flange portion 150s provided therein.

Figure 74:
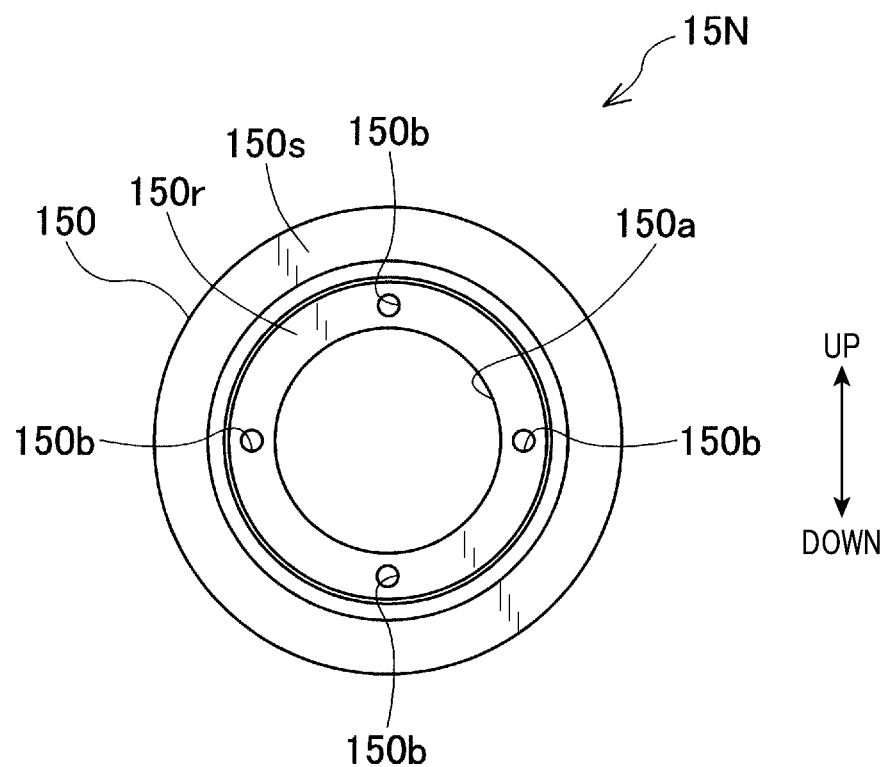
FIG. 74 is a front view of a rear flow direction regulating member of the rotating electric machine according to the fourteenth embodiment.
Figure 75:
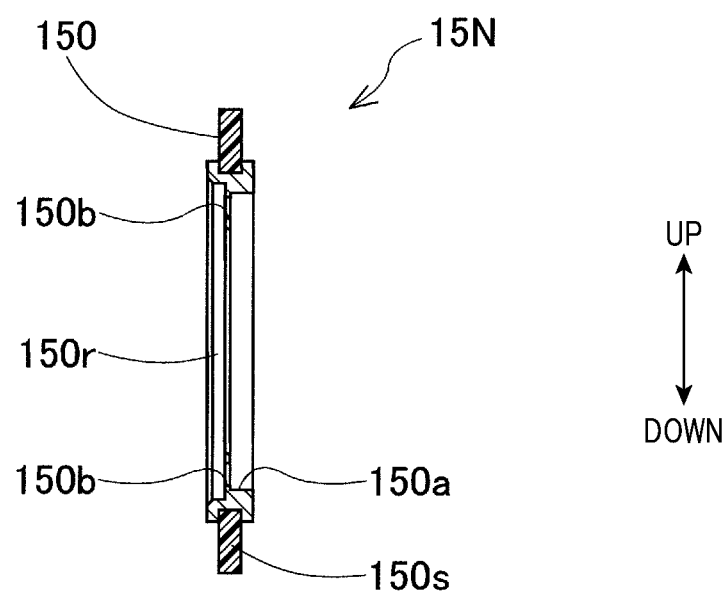
FIG. 75 is a cross-sectional view, taken along the axial direction, of the rear flow direction regulating member of the rotating electric machine according to the fourteenth embodiment.
Figure 76:
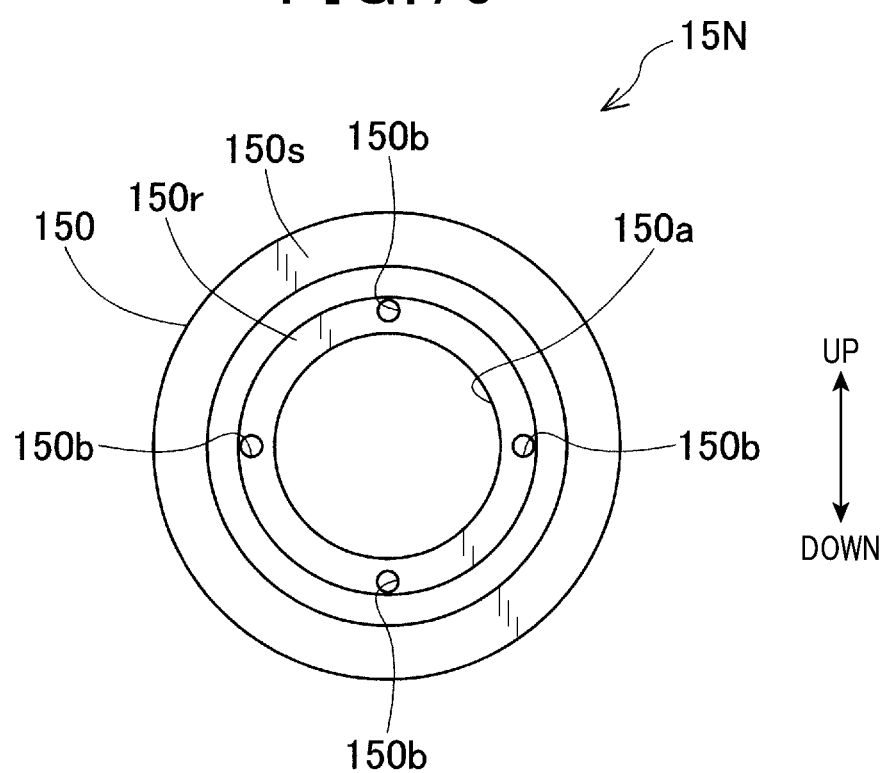
FIG. 76 is a rear view of the rear flow direction regulating member of the rotating electric machine according to the fourteenth embodiment.

Specifically, the flow direction regulating member 15N includes a main body 150 as shown in FIGS. 74-76. The main body 150 has a disc portion 150r and the flange portion 150s.

The disc portion 150r is made, for example, of metal and has a substantially discoid shape. The disc portion 150r has a rotating shaft insertion hole 150a and a plurality (e.g., four) of bolt insertion holes 150b.

The rotating shaft insertion hole 150a is a circular hole into which the rotating shaft 10 is inserted. The rotating shaft insertion hole 150a is formed in a central part of the disc portion 150r.

The bolt insertion holes 150b are circular holes into which bolts for fixing the main body 150 are respectively inserted. The bolt insertion holes 150b are formed radially outside the rotating shaft insertion hole 150a and circumferentially spaced from one another at equal intervals.

The flange portion 150s is annular in shape and has elasticity (or resilience). The flange portion 150s is formed separately from and fixed to the disc portion 150r. More particularly, in the present embodiment, the flange portion 150s is fixedly fitted in an annular groove formed in a radially outer peripheral surface of the disc portion 150r.

That is, in the present embodiment, the flow direction regulating member 15N has a radially outer peripheral portion constituted of an annular plate-shaped member having elasticity.

Figure 73:
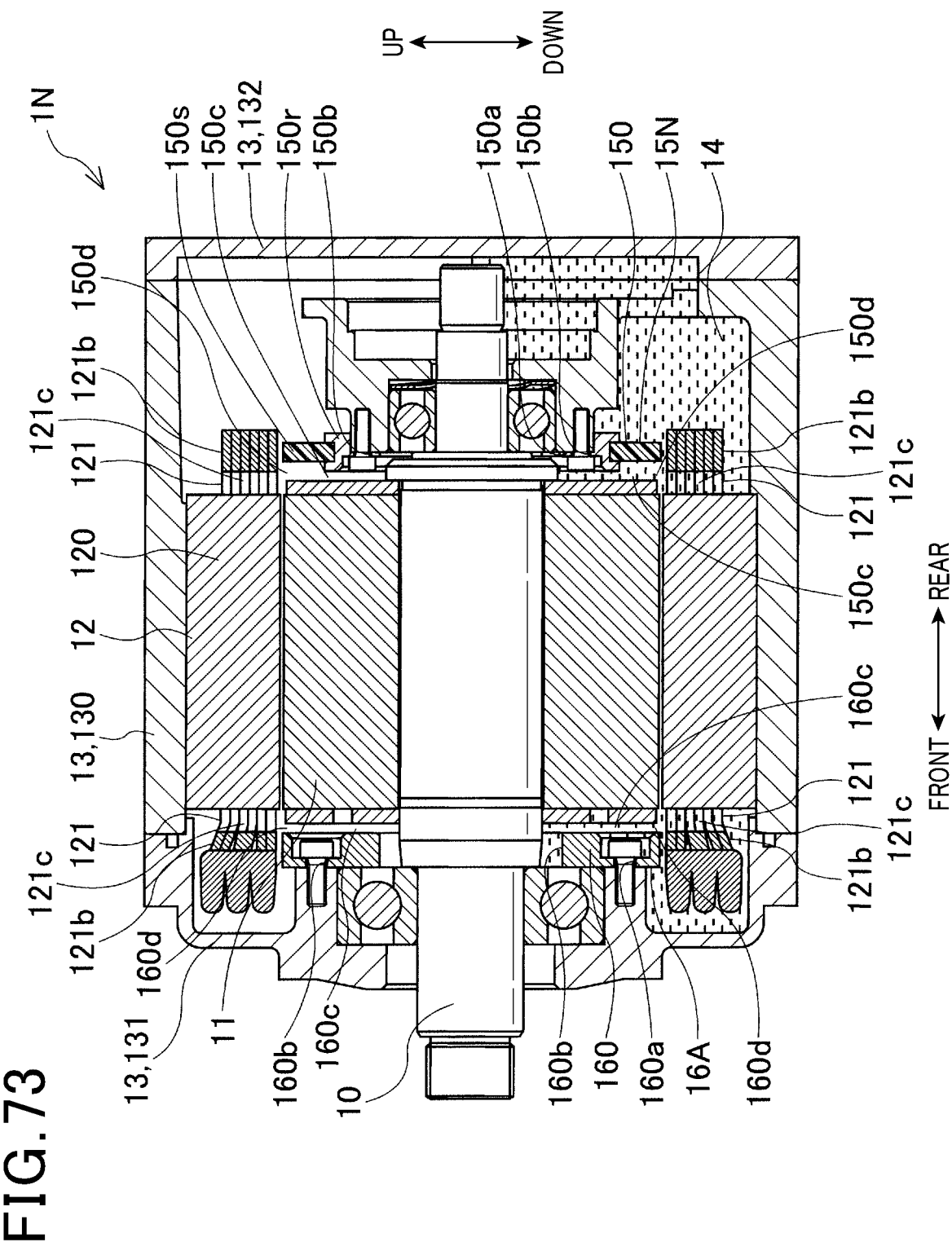
FIG. 73 is a cross-sectional view, taken along an axial direction, of a rotating electric machine according to a fourteenth embodiment.

As shown in FIG. 73, the flow direction regulating member 15N is arranged, with the rotating shaft 10 inserted in the rotating shaft insertion hole 150a, to axially face the rear end face of the rotor 11 through an axial gap 150c formed therebetween. Moreover, the flow direction regulating member 15N is fixed to the center housing 130 by the bolts respectively inserted in the bolt insertion holes 150b.

The flow direction regulating member 15N regulates the flow direction of the coolant 14 on the rear side of the rotor 11 by means of the axial gap 150c formed between the flow direction regulating member 15N and the rear end face of the rotor 11. In addition, the axial gap 150c is axially positioned so that an opening 150d of the axial gap 150c, which is located at the radially outer periphery of the axial gap 150c, radially faces the coil end portions 121b and the space portions 121c on the rear side of the stator core 120.

The rotating electric machine 1N according to the present embodiment has the same advantages as the rotating electric machine 1A according to the first embodiment.

Figure 77:
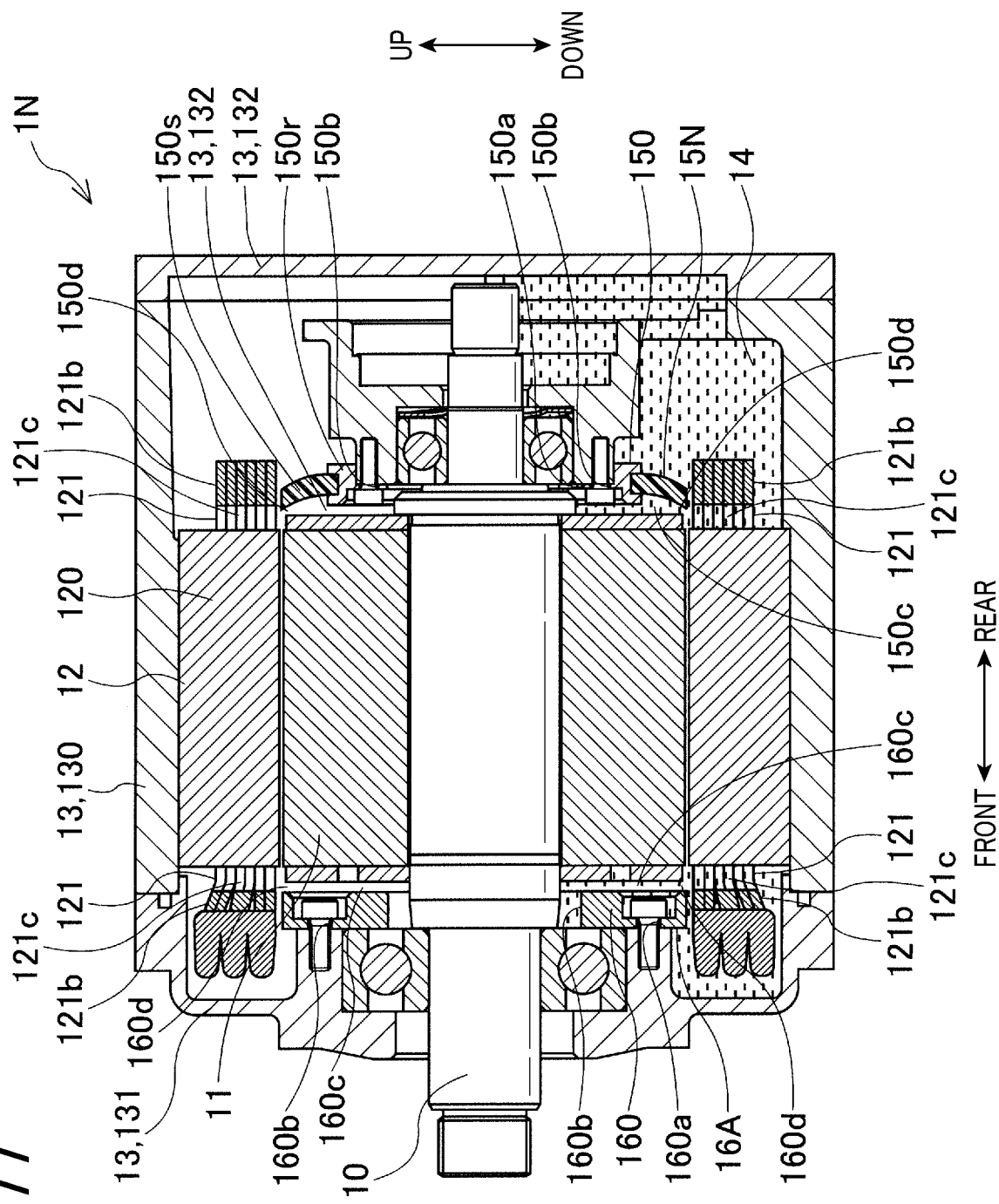
FIG. 77 is a cross-sectional view, taken along the axial direction, of the rotating electric machine according to the fourteenth embodiment illustrating the operation of the rear flow direction regulating member.

Moreover, with increase in the rotational speed of the rotor 11, the flow speed of the coolant 14 in the axial gap 150c increases, thereby increasing the negative pressure created by the Venturi effect. In the present embodiment, the flow direction regulating member 15N has the flange portion 150s (or radially outer peripheral portion) constituted of an annular plate-shaped member having elasticity. Therefore, with increase in the rotational speed of the rotor 11, the flange portion 150s of the flow direction regulating member 15N is gradually elastically deformed, thereby being displaced forward (or axially toward the rotor 11) as shown in FIG. 77. Consequently, the opening 150d of the axial gap 150c is gradually narrowed, thereby causing the flow speed of the coolant 14 in the axial gap 150c to gradually increase. As a result, it is possible to gradually increase, with increase in the rotational speed of the rotor 11, the capability of the rotating electric machine 1N to discharge the coolant 14 which has flowed into the annular gap between the radially inner peripheral surface of the stator 12 and the radially outer peripheral surface of the rotor 11.

In addition, it should be noted that for the sake of convenience of explanation, "front", "rear", "up" and "down" are used in FIGS. 73-77 to distinguish directions. It also should be noted that for the sake of ease of understanding, those parts of the rotating electric machine 1N which are actually immersed in the liquid coolant 14 are also shown with continuous lines in FIGS. 73 and 77.

Fifteenth Embodiment

A rotating electric machine 1P according to a fifteenth embodiment has almost the same structure as the rotating electric machine 1L according to the twelfth embodiment. Accordingly, the differences therebetween will be mainly described hereinafter.

Compared to the rotating electric machine 1L (see FIG. 64) according to the twelfth embodiment, the rotating electric machine 1P according to the present embodiment further includes an actuator 19 that actuates the flow direction regulating member 15L to axially move.

Figure 78:
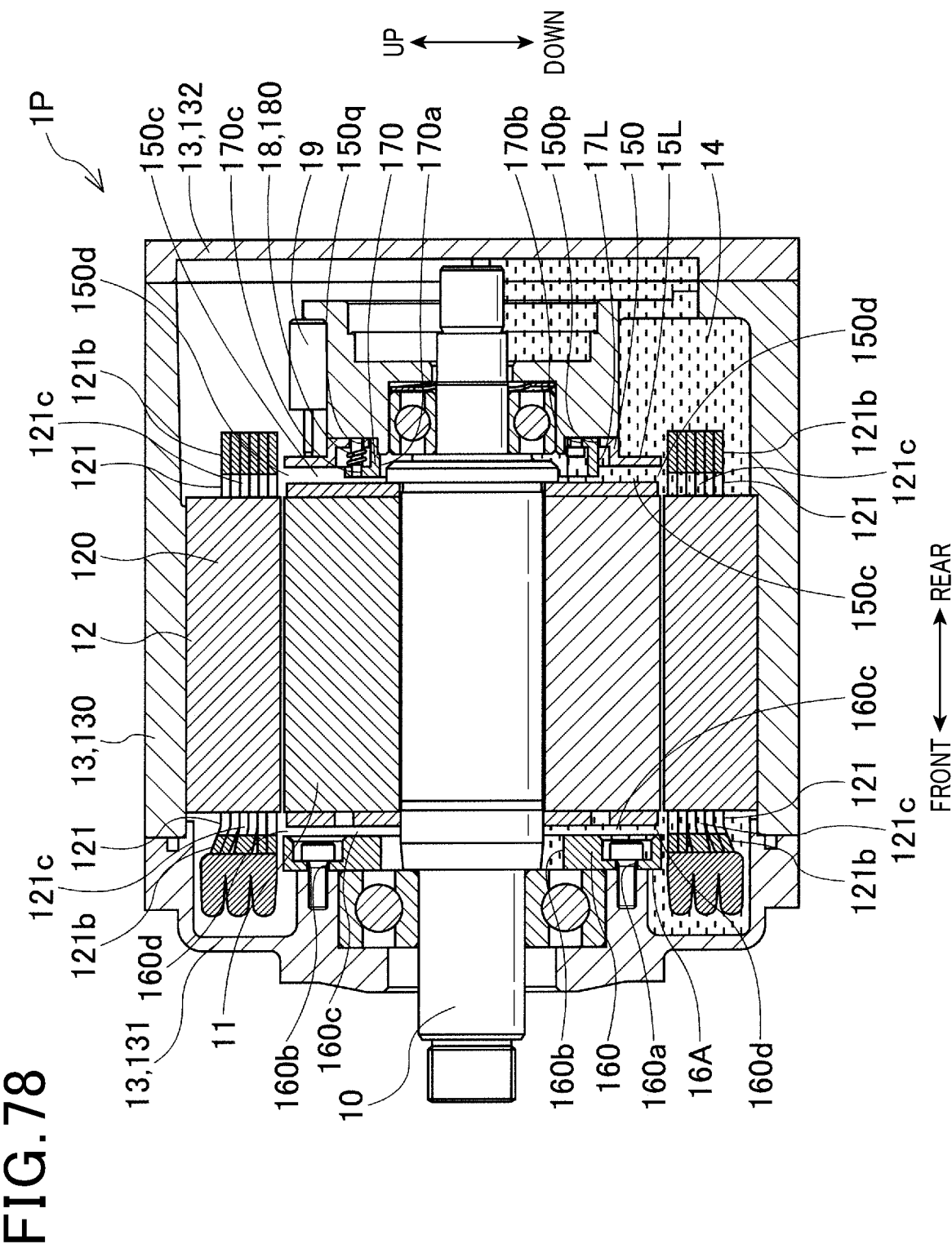
FIG. 78 is a cross-sectional view, taken along an axial direction, of a rotating electric machine according to a fifteenth embodiment.

Specifically, in the present embodiment, as shown in FIG. 78, the actuator 19 is fixed to the center housing 130. The actuator 19 includes a movable shaft that is axially movable. A front end (or rotor 11-side end) of the movable shaft of the actuator 19 is fixed to the flow direction regulating member 15L.

The rotating electric machine 1P according to the present embodiment has the same advantages as the rotating electric machine 1L according to the twelfth embodiment.

Moreover, in the present embodiment, with the actuator 19, it is possible to axially move the flow direction regulating member 15L by a desired amount. Consequently, it is possible to suitably adjust the capability of the rotating electric machine 1P to discharge the coolant 14 which has flowed into the annular gap between the radially inner peripheral surface of the stator 12 and the radially outer peripheral surface of the rotor 11.

In addition, it should be noted that for the sake of convenience of explanation, "front", "rear", "up" and "down" are used in FIG. 78 to distinguish directions. It also should be noted that for the sake of ease of understanding, those parts of the rotating electric machine 1P which are actually immersed in the liquid coolant 14 are also shown with continuous lines in FIG. 78.

Modifications to First to Fifteenth Embodiments

In the first to the fifteenth embodiments, the coolant 14 is provided in the internal space formed in the housing 13 so that the components of the rotating electric machine received in housing 13 are immersed in the coolant 14 on the lower side of the central axis of the rotating shaft 10. Thus, the coolant 14 flows into a lower half of the annular gap formed between the radially inner peripheral surface of the stator 12 and the radially outer peripheral surface of the rotor 11.

However, the coolant 14 may be provided in the internal space formed in the housing 13 so as to flow into at least part of the annular gap formed between the radially inner peripheral surface of the stator 12 and the radially outer peripheral surface of the rotor 11.

In the eleventh embodiment, the flow direction regulating member 15K is fixed to the rotating shaft 10. Alternatively, the flow direction regulating member 15K may be fixed to the rotor 11.

In the fourteenth embodiment, only the flange portion 150s (or radially outer peripheral portion) of the flow direction regulating member 15N is constituted of an annular plate-shaped member having elasticity. Alternatively, the entire flow direction regulating member 15N may be constituted of a circular plate-shaped member having elasticity. That is, it is possible to constitute at least the radially outer peripheral portion of the flow direction regulating member 15N with a plate-shaped member having elasticity.

In addition, it is also possible to combine the configurations of the rotating electric machines 1A-1P according to the first to the fifteenth embodiments in any suitable manner.

Sixteenth Embodiment

A rotating electric machine 1Q according to a sixteenth embodiment has almost the same structure as the rotating electric machine 1A according to the first embodiment. Accordingly, the differences therebetween will be mainly described hereinafter.

Compared to the rotating electric machine 1A according to the first embodiment, the rotating electric machine 1Q according to the present embodiment further includes a blocking member 122 that is provided to block splashing of the coolant 14 radially outward which occurs with rotation of the rotor 11.

Figure 79:
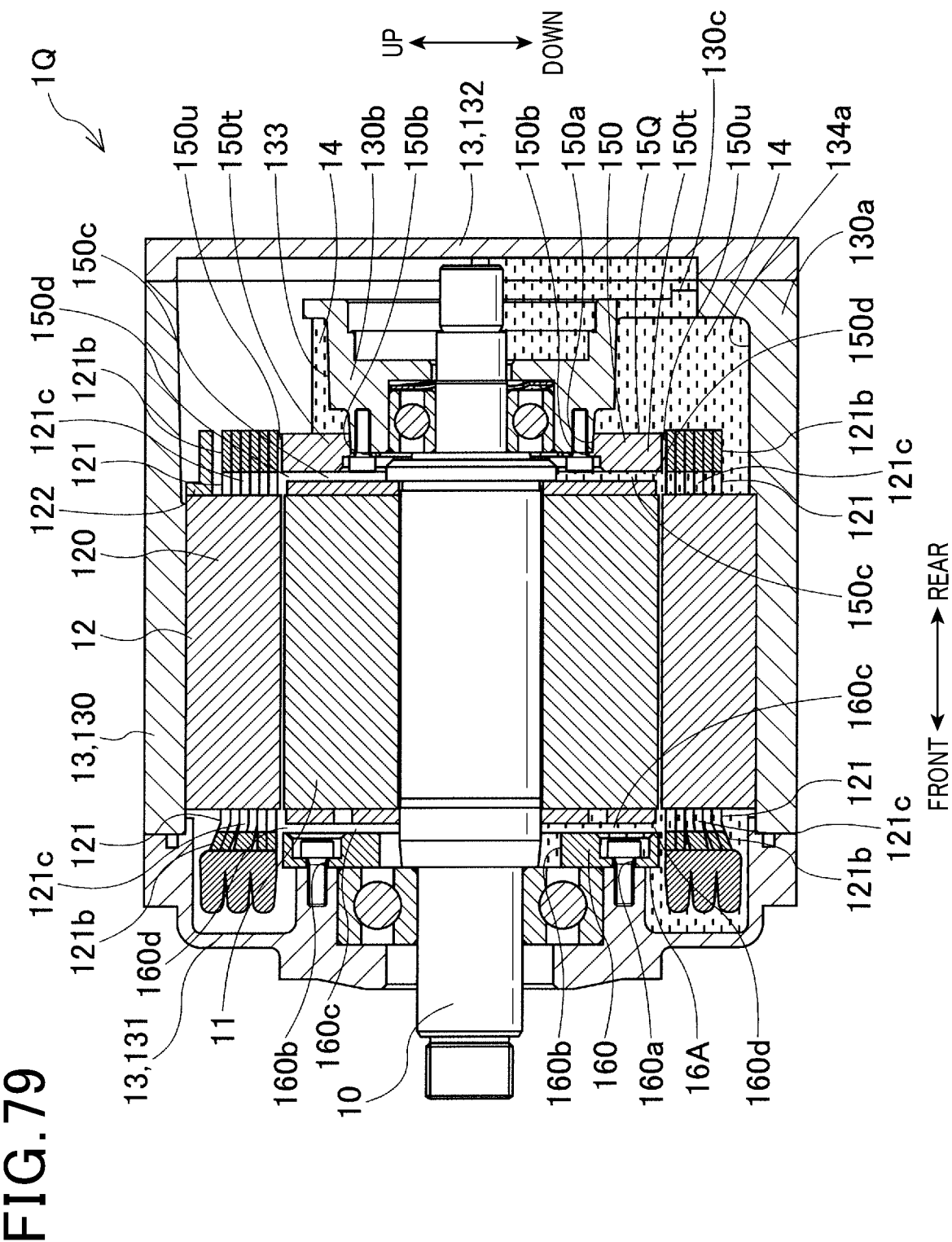
FIG. 79 is a cross-sectional view, taken along an axial direction, of a rotating electric machine according to a sixteenth embodiment.
Figure 80:
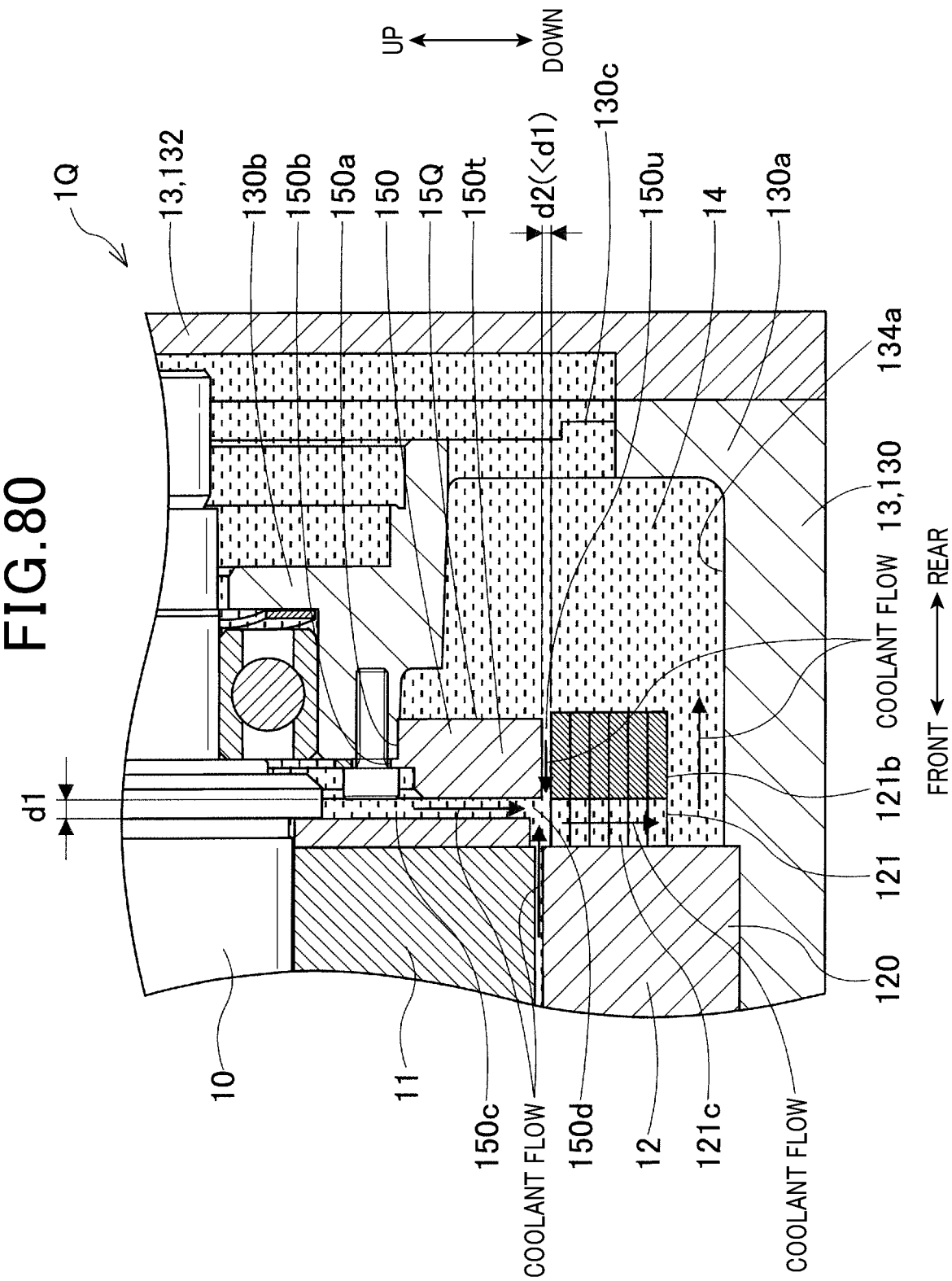
FIG. 80 is an enlarged view of a rear lower part of FIG. 79 illustrating the flow of coolant in the rotating electric machine according to the sixteenth embodiment.
Figure 81:
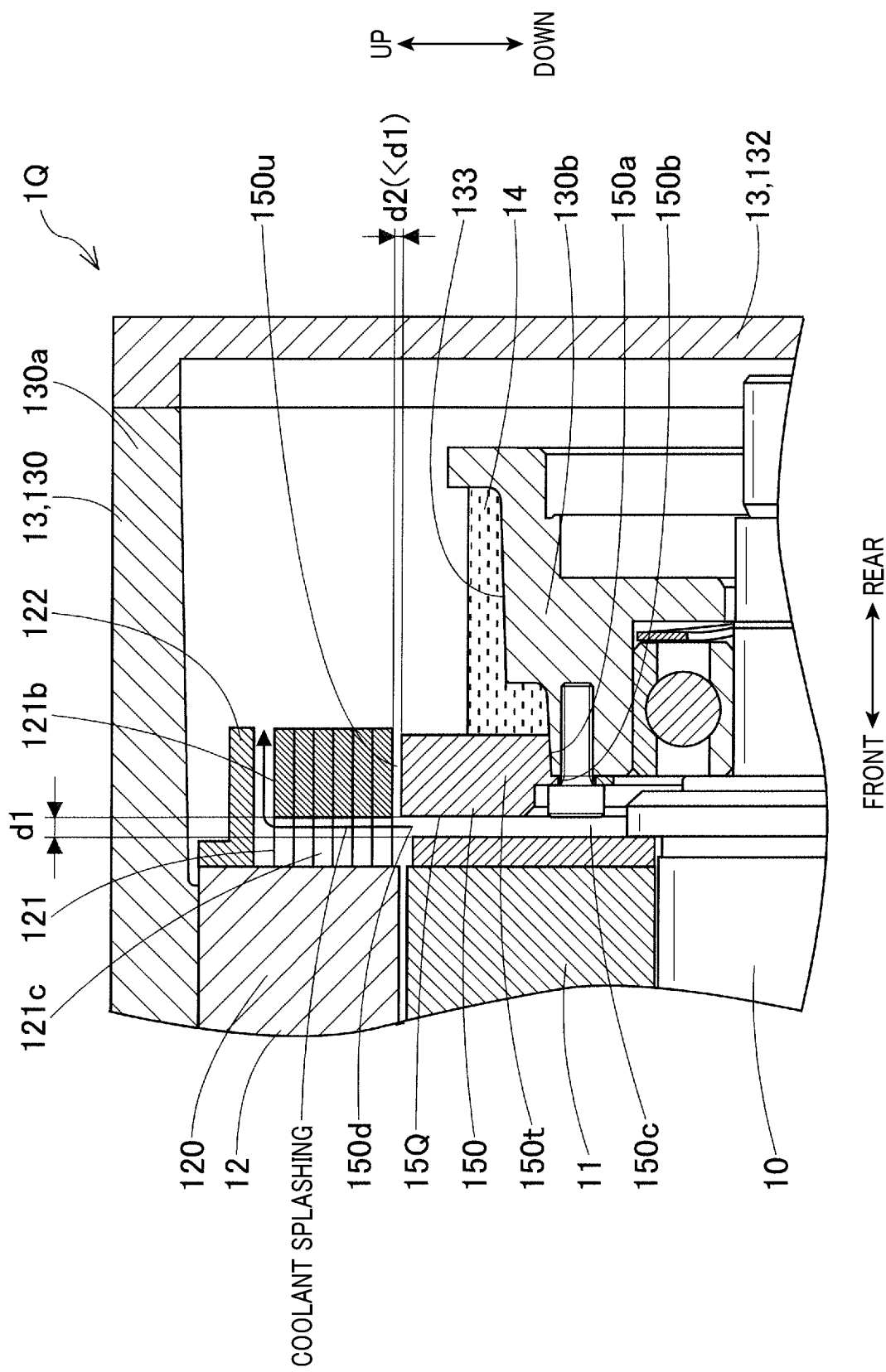
FIG. 81 is an enlarged view of a rear upper part of FIG. 79 illustrating the flow of coolant in the rotating electric machine according to the sixteenth embodiment.

Specifically, as shown in FIGS. 79-81, the blocking member 122 is circular arc-shaped and arranged on the rear side of the stator core 120 and radially outside the coil end portions 121b which are not immersed in the coolant 14. Moreover, the blocking member 122 radially faces the coil end portions 121b through a radial gap formed therebetween. That is, the blocking member 122 covers the coil end portions 121b which are not immersed in the coolant 14 from the radially outside of the coil end portions 121b. In addition, the blocking member 122 is made of metal, resin or a metal-resin composite.

In the present embodiment, the center housing 130 includes a main body 130a, a supporting portion 130b and a fixing portion 130c.

The main body 130a has a hollow cylindrical shape and receives both the rotor 11 and the stator 12 therein.

The supporting portion 130b has a substantially cylindrical shape and is arranged on the rear side of a flow direction regulating member 15Q to rotatably support the rear end portion of the rotating shaft 10. A radially outer peripheral surface of the supporting portion 130b is tapered forward (or toward the rotor 11). Part of the supporting portion 130b on the lower side is fixed to the main body 130a via the fixing member 130c.

The flow direction regulating member 15Q is substantially identical to the flow direction regulating member 15A described in the first embodiment. The flow direction regulating member 15Q has a wall portion 150t that blocks the coolant 14 on the rear side of the flow direction regulating member 15Q from entering the axial gap 150c formed between the flow direction regulating member 15Q and the rear end face of the rotor 11. The flow direction regulating member 15Q is fixed to a front end face of the supporting portion 130b of the center housing 130 so as to radially face the coil end portions 121b on the rear side of the stator core 120 through a radial gap 150u formed therebetween. Here, the coil end portions 121b are always in a stationary state. The radial gap 150u is formed between the flow direction regulating member 15Q and the coil end portions 121b over the entire axial length of the flow direction regulating member 15Q. Moreover, the width (or size) d2 of the radial gap 150u is set to be less than the width (or size) d1 of the axial gap 150c formed between the flow direction regulating member 15Q and the rear end face of the rotor 11. Furthermore, the flow direction regulating member 15Q is provided so that when the rotor 11 is in a stationary state, at least part of the flow direction regulating member 15Q (or at least part of the rotor 11) is immersed in the coolant 14.

In the rotating electric machine 1Q according to the present embodiment, there is also provided a coolant returning portion 133 that returns the coolant 14, which is splashed radially outward with rotation of the rotor 11, to a coolant accumulating portion 134a. The coolant returning portion 133 is formed (or defined) by the supporting portion 130b of the center housing 130 and the flow direction regulating member 15Q. More specifically, the coolant returning portion 133 is formed by the supporting portion 130b of the center housing 130 and the wall portion 150t of the flow direction regulating member 15Q.

The rotating electric machine 1Q according to the present embodiment has the same advantages as the rotating electric machine 1A according to the first embodiment.

Moreover, in the rotating electric machine 1Q according to the present embodiment, when the rotor 11 is in a stationary state (or non-rotating state), at least part of the flow direction regulating member 15Q is immersed in the coolant 14.

With the above configuration, upon rotation of the rotor 11, negative pressure is immediately created by the Venturi effect. Thus, the coolant 14, which has flowed into the annular gap between the radially inner peripheral surface of the stator 12 and the radially outer peripheral surface of the rotor 11, is immediately discharged. Consequently, it is possible to promptly reduce the loss that is caused, during rotation of the rotor 11, by the shearing force of the coolant 14 which has flowed into the annular gap between the radially inner peripheral surface of the stator 12 and the radially outer peripheral surface of the rotor 11.

In the rotating electric machine 1Q according to the present embodiment, the flow direction regulating member 15Q is provided so as to radially face the coil end portions 121b on the rear side of the stator core 120, which are always in a stationary state, through the radial gap 150u formed therebetween. Moreover, the width d2 of the radial gap 150u formed between the flow direction regulating member 15Q and the coil end portions 121b is set to be less than the width d1 of the axial gap 150c formed between the flow direction regulating member 15Q and the rear end face of the rotor 11.

With the above configuration, not only the coolant 14 which has flowed into the annular gap between the radially inner peripheral surface of the stator 12 and the radially outer peripheral surface of the rotor 11 but also the coolant 14 which has flowed into the radial gap 150u is discharged due to the negative pressure created by the Venturi effect. As a result, the amount of the coolant 14 in the axial gap 150c is further suppressed, thereby further reducing the agitation loss caused by the rotor 11 agitating the coolant 14 during its rotation.

In the rotating electric machine 1Q according to the present embodiment, the flow direction regulating member 15Q has the wall portion 150t that blocks the coolant 14 on the rear side of the flow direction regulating member 15Q (or on the opposite side of the flow direction regulating member 15Q to the rotor 11) from entering the axial gap 150c formed between the flow direction regulating member 15Q and the rear end face of the rotor 11.

Consequently, with the wall portion 150t, it is possible to block the coolant 14 from entering the axial gap 150c from the rear side of the flow direction regulating member 15Q, thereby preventing the negative pressure created by the Venturi effect from being lowed.

In the rotating electric machine 1Q according to the present embodiment, the coolant 14, which is splashed radially outward with rotation of the rotor 11, passes through the space portions 121c formed in the coil end portions 121b on the rear side of the stator core 120 and is then blocked by the blocking member 122 provided radially outside the coil end portions 121b. Thereafter, the coolant 14 blocked by the blocking member 122 is discharged to the rear side of the coil end portions 121b while making contact with the coil end portions 121b. However, in the rotating electric machine 1Q according to the present embodiment, there is also provided the coolant returning portion 133 that returns the discharged coolant 14 to the coolant accumulating portion 134a.

Consequently, with the coolant returning portion 133, it is possible to reliably return the coolant 14 splashed with rotation of the rotor 11 to the coolant accumulating portion 134a. As a result, it is possible to keep a sufficient amount of the coolant 14 constantly in the coolant accumulating portion 134a, thereby preventing the cooling performance from being lowered.

In the rotating electric machine 1Q according to the present embodiment, the housing 13 has the supporting portion 130b located on the rear side of the flow direction regulating member 15Q (or on the opposite side of the flow direction regulating member 15Q to the rotor 11) to rotatably support the rotating shaft 10. The supporting portion 130b has its radially outer peripheral surface tapered forward (or toward the rotor 11). The coolant returning portion 133 is formed by the supporting portion 130b and the flow direction regulating member 15Q.

With the above configuration, it is possible to reliably form the coolant returning portion 133 between the radially outer peripheral surface of the supporting portion 130b and the rear surface of the flow direction regulating member 15Q. Moreover, with the radially outer peripheral surface of the supporting portion 130b tapered forward, it is possible to reliably collect the splashed coolant 14. Consequently, it is possible to reliably keep a sufficient amount of the coolant 14 constantly in the coolant accumulating portion 134a.

In the rotating electric machine 1Q according to the present embodiment, there is provided the blocking member 122 radially outside the coil end portions 121b on the rear side of the stator core 120 (or radially outside an axial end portion of the stator 12).

Consequently, with the blocking member 122, it is possible to block the coolant 14, which is splashed radially outward with rotation of the rotor 11 and passes through the space portions 121c formed in the coil end portions 121b, from being further splashed radially outward. Moreover, it is also possible to bring the coolant 14 blocked by the blocking member 122 into contact with the coil end portions 121b. Consequently, it is possible to more effectively cool the coil end portions 121b (or the axial end portion of the stator 12).

In addition, in the present embodiment, as described above, the flow direction regulating member 15Q is arranged to radially face the coil end portions 121b on the rear side of the stator core 120 through the radial gap 150u formed therebetween; and the width d2 of the radial gap 150u is set to be less than the width d1 of the axial gap 150c formed between the flow direction regulating member 15Q and the rear end face of the rotor 11. However, it is also possible to: arrange the flow direction regulating member 15Q to radially face a predetermined member other than the coil end portions 121b, which is always in a stationary state, through a radial gap formed therebetween; and set the width of the radial gap to be less than the width d1 of the axial gap 150c.

The rotating electric machine 1Q according to the present embodiment is obtained by modifying the rotating electric machine 1A according to the first embodiment. It should be appreciated that the same modification can also be made to the rotating electric machines according to the second to the fifteenth embodiments.

In addition, it should be noted that for the sake of convenience of explanation, "front", "rear", "up" and "down" are used in FIGS. 79-81 to distinguish directions. It also should be noted that for the sake of ease of understanding, those parts of the rotating electric machine 1Q which are actually immersed in the liquid coolant 14 are also shown with continuous lines in FIGS. 79 and 80.

Seventeenth Embodiment

A rotating electric machine 1R according to a seventeenth embodiment has almost the same structure as the rotating electric machine 1I according to the ninth embodiment. Accordingly, the differences therebetween will be mainly described hereinafter.

In the ninth embodiment, the rotating electric machine 1I includes the flow direction regulating member 15I that is arranged on the rear side of the rotor 11 and constituted of a one-piece member (see FIGS. 45-48).

Figure 82:
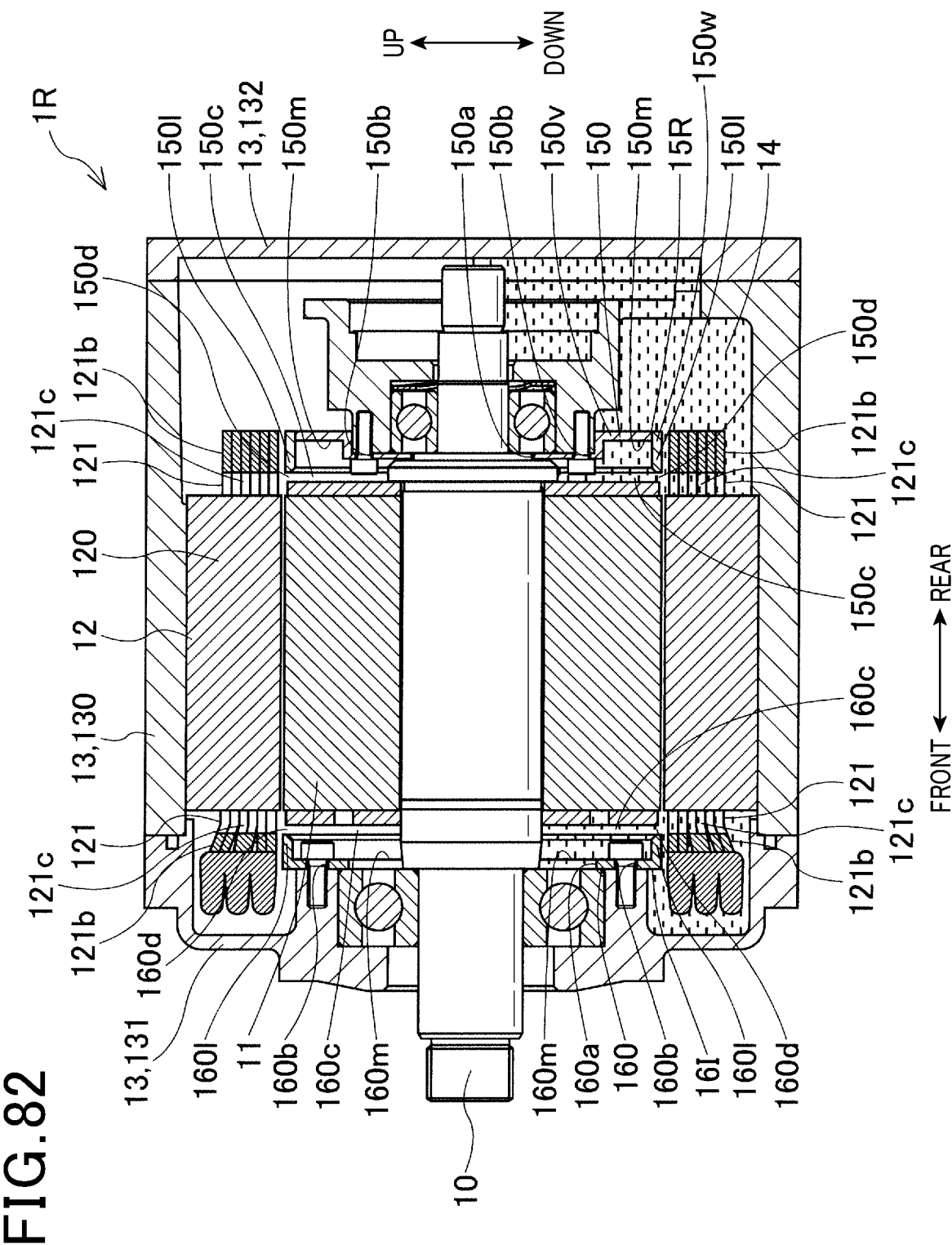
FIG. 82 is a cross-sectional view, taken along an axial direction, of a rotating electric machine according to a seventeenth embodiment.

In comparison, in the present embodiment, as shown in FIG. 82, the rotating electric machine 1R includes, instead of the flow direction regulating member 15I, a flow direction regulating member 15R that is arranged on the rear side of the rotor 11 and constituted of a plurality of members that are assembled together.

Specifically, as shown in FIG. 82, the flow direction regulating member 15R is constituted of a disc member 150v and a cylindrical member 150w that are assembled to each other.

The disc member 150v has a discoid shape and is made of metal, resin or a metal-resin composite. The cylindrical member 150w has a hollow cylindrical shape and is made of metal, resin or a metal-resin composite. The cylindrical member 150w is fixed to the disc member 150v with a radially inner peripheral surface of a rear end portion of the cylindrical member 150w in abutment (or intimate contact) with a radially outer peripheral surface of the disc member 150v.

The rotating electric machine 1R according to the present embodiment has the same advantages as the rotating electric machine 1I according to the ninth embodiment.

Moreover, in the rotating electric machine 1R according to the present embodiment, the flow direction regulating member 15R is constituted of the disc member 150v and the cylindrical member 150w that are assembled to each other. Therefore, though the flow direction regulating member 15R has a complicated shape, it is still possible to easily manufacture the flow direction regulating member 15R at low cost.

It should be noted that the other flow direction regulating members in the rotating electric machines according to the first to the sixteenth embodiments may also be each constituted of a plurality members that are assembled together.

In addition, it should be noted that for the sake of convenience of explanation, "front", "rear", "up" and "down" are used in FIG. 82 to distinguish directions. It also should be noted that for the sake of ease of understanding, those parts of the rotating electric machine 1R which are actually immersed in the liquid coolant 14 are also shown with continuous lines in FIG. 82.

Eighteenth Embodiment

A rotating electric machine 1S according to an eighteenth embodiment has almost the same structure as the rotating electric machine 1A according to the first embodiment. Accordingly, the differences therebetween will be mainly described hereinafter.

Compared to the rotating electric machine 1A according to the first embodiment, the rotating electric machine 1S according to the present embodiment further includes a power transmission device 20.

Figure 83:
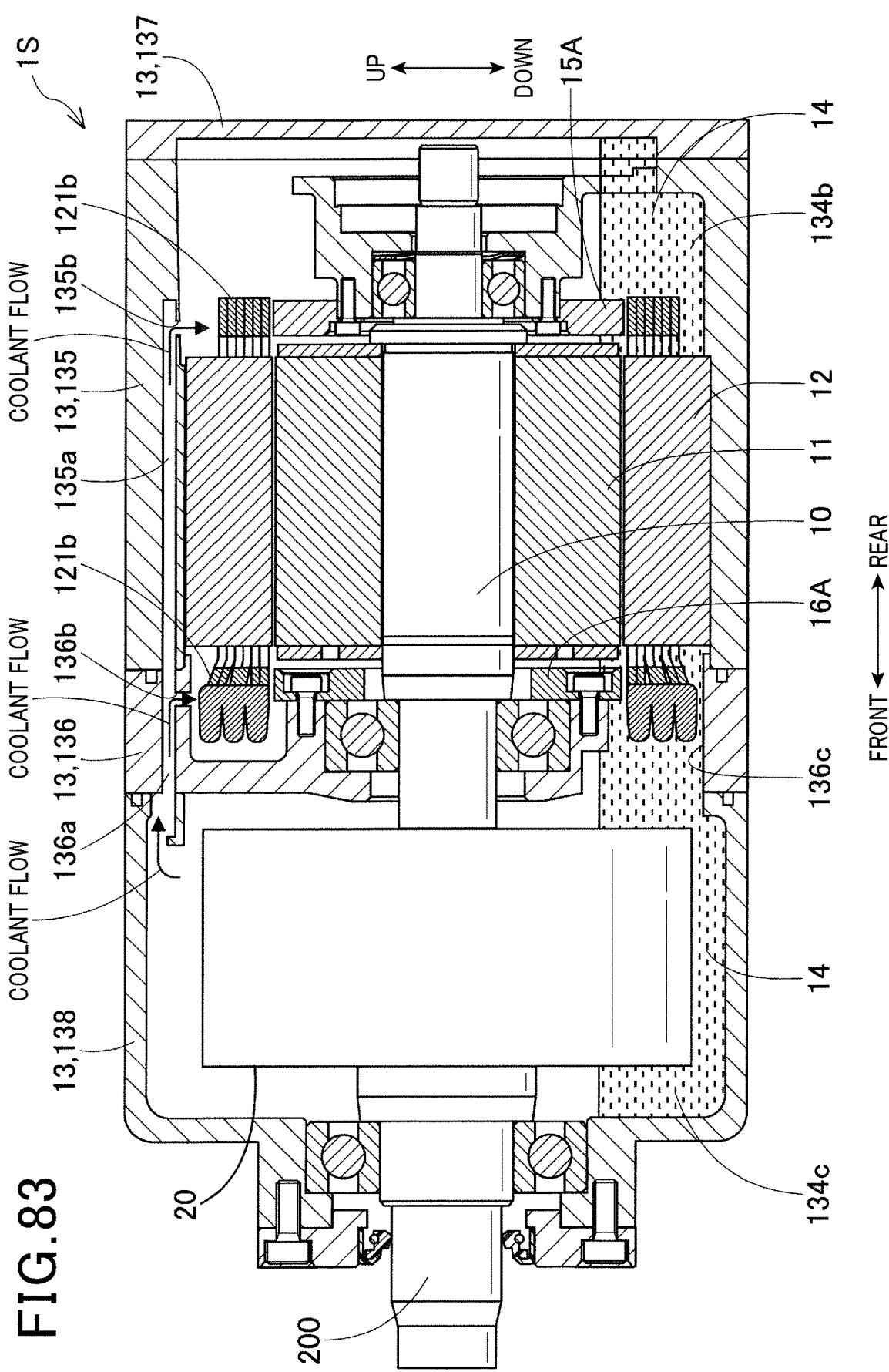
FIG. 83 is a cross-sectional view, taken along an axial direction, of a rotating electric machine according to an eighteenth embodiment.

Specifically, as shown in FIG. 83, the rotating electric machine 1S according to the present embodiment includes the power transmission device 20 in addition to a rotating shaft 10, a rotor 11, a stator 12, a housing 13, a coolant 14 and flow direction regulating members 15A and 16A.

The power transmission device 20 is configured to transmit mechanical power (or torque) from the rotating shaft 10 to an output shaft 200. In other words, the power transmission device 20 is configured to output mechanical power, which is transmitted to the device 20 via the rotating shaft 10, through the output shaft 200. The power transmission device 20 may be implemented by, for example, a transmission including a plurality of gears.

The housing 13 covers both the axial ends of the stator 12 and rotatably supports the rotating shaft 10. Moreover, the housing 13 receives the power transmission device 20 therein and rotatably supports the output shaft 200 as well. In the present embodiment, the housing 13 is comprised of a center housing 135, a first front housing 136, a rear housing 137 and a second front housing 138.

The center housing 135 is made of metal and has a hollow cylindrical shape. The center housing 135 receives both the rotor 11 and the stator 12 therein and rotatably supports a rear end portion of the rotating shaft 10. Moreover, a radially outer peripheral surface of the stator core 120 is fixed to a radially inner peripheral surface of the center housing 135. The rear end portion of the rotating shaft 10 is rotatably supported by the center housing 135 via a bearing.

The first front housing 136 is also made of metal and has a bottomed cylindrical shape. The first front housing 136 is fixed to the center housing 135 so as to cover a front opening of the center housing 135. Moreover, a front end portion of the rotating shaft 10 is rotatably supported by the first front housing 136 via a bearing.

The rear housing 137 is also made of metal and has a bottomed cylindrical shape. The rear housing 137 is fixed to the center housing 135 so as to cover a rear opening of the center housing 135.

The second front housing 138 is also made of metal and has a bottomed cylindrical shape. The second front housing 138 is fixed to the first front housing 136 so as to cover the first front housing 136 from the front side. The second front housing 138 receives the power transmission device 20 therein and rotatably supports the output shaft 200. Specifically, the power transmission device 20 is received in the second front housing 138 with the front end portion of the rotating shaft 10 connected to the second front housing 138. The output shaft 200 is rotatably supported by the second front housing 138 via a bearing.

In an upper part of the first front housing 136, there is formed a coolant passage 136a through which the coolant 14 splashed with rotation of the power transmission device 20 flows backward. The coolant passage 136a has an opening 136b formed at a position radially facing the front coil end portions 121b. Consequently, part of the coolant 14 flowing backward through the coolant passage 136a will fall down from the opening 136b onto the front coil end portions 121b, thereby cooling the front coil end portions 121b.

In an upper part of the center housing 135, there is formed a coolant passage 135a which communicates with the coolant passage 136a and through which the coolant 14 from the coolant passage 136a further flows backward. The coolant passage 135a has an opening 135b formed at a position radially facing the rear coil end portions 121b. Consequently, the coolant 14 flowing backward through the coolant passage 135a will fall down from the opening 135b onto the rear coil end portions 121b, thereby cooling the rear coil end portions 121b.

In a lower part of the center housing 135, there is formed a first coolant accumulating portion 134b where the coolant 14 is accumulated to have the rotor 11 and the stator 12 partially immersed therein. In a lower part of the second front housing 138, there is formed a second coolant accumulating portion 134c where the coolant 14 is accumulated have the power transmission device 20 partially immersed therein. In a lower part of the first front housing 136, there is formed a through-hole 136c through which the coolant 14 flows between the first and second coolant accumulating portions 134b and 134c. The size of the through-hole 136c is set so that though the coolant 14 flows from the internal space of the second front housing 138 to the internal space of the center housing 135 via the coolant passages 136a and 135a, it is still possible to keep the surface levels of the coolant 14 in the first and second coolant accumulating portions 134b and 134c flush with each other. In other words, the size of the through-hole 136c is set so that it is possible to immediately return the coolant 14 from the internal space of the center housing 135 to the internal space of the second front housing 138 via the through-hole 136c by the same amount as the coolant 14 transferred from the internal space of the second front housing 138 to the internal space of the center housing 135 via the coolant passages 136a and 135a.

The coolant 14 is a liquid material for cooling the rotor 11, the stator 12 and the power transmission device 20. The coolant 14 also functions as a lubricant for the power transmission device 20. More particularly, in the present embodiment, the coolant 14 is implemented by oil. The coolant 14 is provided in the internal space formed in the housing 13 by: (1) placing the rotating electric machine 1S so that the axial direction of the rotating shaft 10 coincides with a horizontal direction (or the front-rear direction in FIG. 83); and (2) injecting the coolant 14 into the internal space, with the rotating shaft 10, the rotor 11 and the power transmission device 20 in a stationary state, until the coolant 14 has flowed into the annular gap between the radially outer peripheral surface of the rotor 11 and the radially inner peripheral surface of the stator 12 and a lower part of the power transmission device 20 is immersed in the coolant 14.

In operation of the rotating electric machine 15, with rotation of the power transmission device 20, the coolant 14 accumulated in the second coolant accumulating portion 134c is splashed radially outward. The splashed coolant 14 enters the coolant passage 136a and flows backward through the coolant passage 136a. Part of the coolant 14 flowing backward through the coolant passage 136a falls down from the opening 136b onto the front coil end portions 121b, thereby cooling the front coil end portions 121b. The remaining coolant 14 further flows backward through the coolant passage 135a and then falls down from the opening 135b onto the rear coil end portions 121b, thereby cooling the rear coil end portions 121b. After cooling the front and rear coil end portions 121b, all of the coolant 14 transferred from the internal space of the second front housing 138 to the internal space of the center housing 135 via the coolant passages 136a and 135a flows to the first coolant accumulating portion 134b. At the same time, the coolant 14 accumulated in the first coolant accumulating portion 134b flows to the second coolant accumulating portion 134c via the through-hole 136c, thereby keeping the surface levels of the coolant 14 in the first and second coolant accumulating portions 134b and 134c flush with each other.

The rotating electric machine 1S according to the present embodiment has the same advantages as the rotating electric machine 1A according to the first embodiment.

Moreover, the rotating electric machine 1S according to the present embodiment further includes the output shaft 200 rotatably supported by the housing 13 (more specifically, by the second front housing 138) and the power transmission device 20 that transmits mechanical power from the rotating shaft 10 to the output shaft 200. The power transmission device 20 is received in the housing 13 (more specifically, in the second front housing 138) and partially immersed in the coolant 14. In the housing 13 (more specifically, in the first front housing 136 and the center housing 135), there are formed the coolant passages 136a and 135a to introduce the coolant 14, which is splashed radially outward with rotation of the power transmission device 20, to the front and rear coil end portions 121b.

With the above configuration, it is possible to utilize the coolant 14, which is splashed radially outward with rotation of the power transmission device 20, for cooling the front and rear coil end portions 121b.

In the rotating electric machine 1S according to the present embodiment, the coolant 14 also functions as a lubricant for the power transmission device 20.

Consequently, compared to the case of supplying a dedicated lubricant to the power transmission device 20, it is possible to simplify the structure of the rotating electric machine 1S, thereby lowering the manufacturing cost.

In addition, it should be noted that for the sake of convenience of explanation, "front", "rear", "up" and "down" are used in FIG. 83 to distinguish directions. It also should be noted that for the sake of ease of understanding, those parts of the rotating electric machine 1S which are actually immersed in the liquid coolant 14 are also shown with continuous lines in FIG. 83.

Nineteenth Embodiment

A rotating electric machine 1T according to a nineteenth embodiment has almost the same structure as the rotating electric machine 1S according to the eighteenth embodiment. Accordingly, the differences therebetween will be mainly described hereinafter.

Compared to the rotating electric machine 1S according to the eighteenth embodiment, the rotating electric machine 1T according to the present embodiment further includes a surface level adjusting portion 139a.

Figure 84:
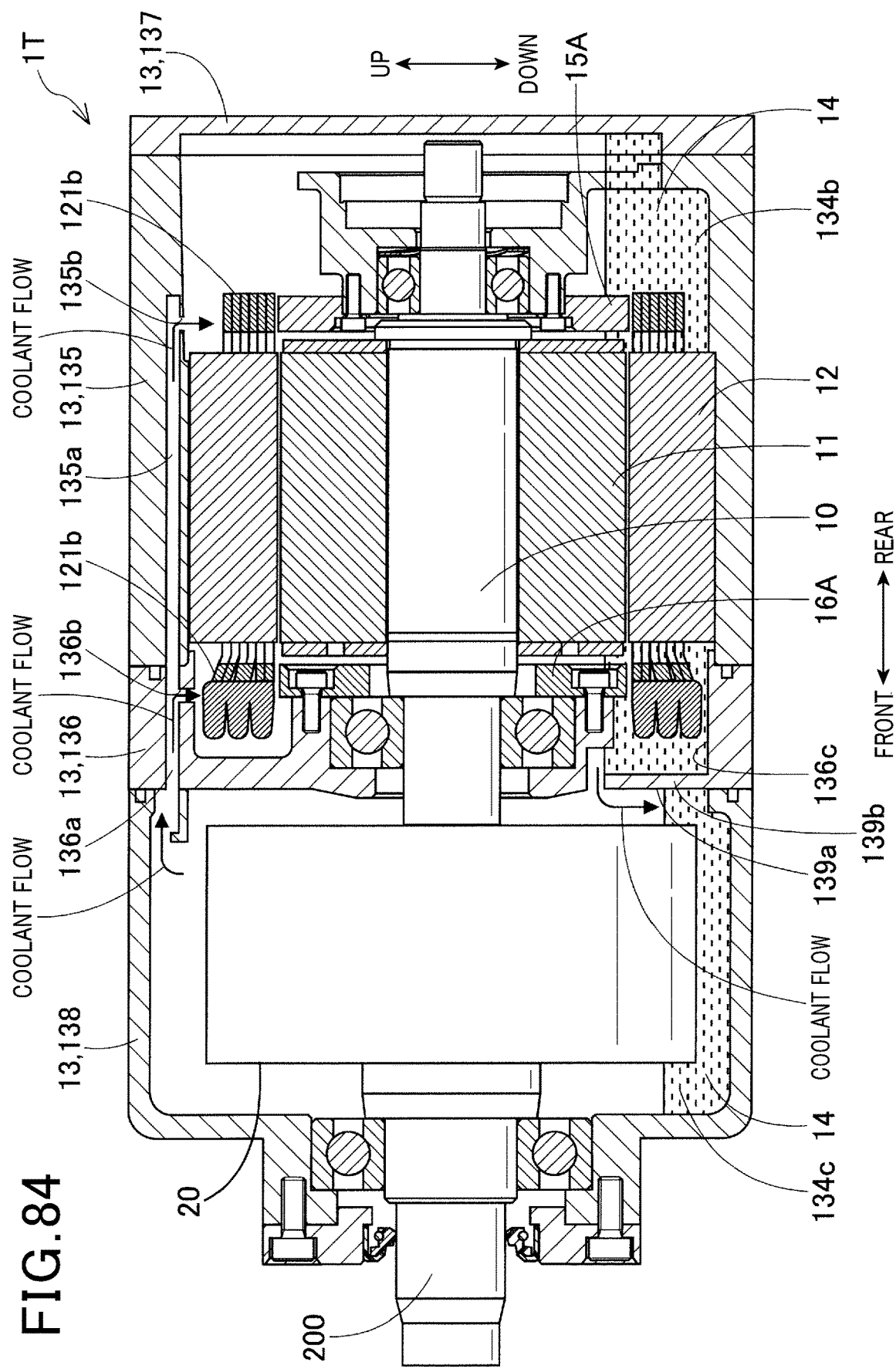
FIG. 84 is a cross-sectional view, taken along an axial direction, of a rotating electric machine according to a nineteenth embodiment.

Specifically, as shown in FIG. 84, the rotating electric machine 1T according to the present embodiment includes the surface level adjusting portion 139a that separates the first and second coolant accumulating portions 134b and 134c from each other and adjusts the surface level of the coolant 14 accumulated in the first coolant accumulating portion 134b and the surface level of the coolant 14 accumulated in the second coolant accumulating portion 134c.

More particularly, in the present embodiment, the surface level adjusting portion 139a adjusts the surface level of the coolant 14 accumulated in the first coolant accumulating portion 134b and the surface level of the coolant 14 accumulated in the second coolant accumulating portion 134c to be different from each other.

In operation of the rotating electric machine 1T, with increase in the rotational speed of the output shaft 200, the amount of the coolant 14 flowing from the internal space of the second front housing 138 to the internal space of the center housing 135 via the coolant passages 136a and 135a increases. However, the surface level adjusting portion 139a keeps the surface level of the coolant 14 in the first coolant accumulating portion 134b constant regardless of the rotational speed of the output shaft 200.

In the present embodiment, the surface level adjusting portion 139a is provided in the lower part of the first front housing 136 to obstruct the through-hole 136c. The surface level adjusting portion 139a includes a wall portion 139b that blocks the coolant 14 from flowing from the first coolant accumulating portion 134b to the second coolant accumulating portion 134c. Consequently, with the wall portion 139b, the surface level of the coolant 14 in the first coolant accumulating portion 134b is kept constant and higher than the surface level of the coolant 14 in the second coolant accumulating portion 134c regardless of the rotational speed of the output shaft 200.

The rotating electric machine 1T according to the present embodiment has the same advantages as the rotating electric machine 1S according to the eighteenth embodiment.

Moreover, there are both a suitable surface level of the coolant 14 in the first coolant accumulating portion 134b for effectively cooling the stator 12 and a suitable surface level of the coolant 14 in the second coolant accumulating portion 134c for facilitating the lubrication of the power transmission device 20 by the coolant 14. The rotating electric machine 1T according to the present embodiment includes the surface level adjusting portion 139a that separates the first and second coolant accumulating portions 134b and 134c from each other and adjusts the surface level of the coolant 14 accumulated in the first coolant accumulating portion 134b and the surface level of the coolant 14 accumulated in the second coolant accumulating portion 134c.

Consequently, with the surface level adjusting portion 139a, it is possible to adjust the surface level of the coolant 14 in the first coolant accumulating portion 134b and the surface level of the coolant 14 in the second coolant accumulating portion 134c to the respective suitable surface levels, thereby effectively cooling the stator 12 while facilitating the lubrication of the power transmission device 20 by the coolant 14.

Furthermore, the suitable surface level of the coolant 14 in the first coolant accumulating portion 134b for effectively cooling the stator 12 and the suitable surface level of the coolant 14 in the second coolant accumulating portion 134c for facilitating the lubrication of the power transmission device 20 by the coolant 14 are different. Therefore, in the rotating electric machine 1T according to the present embodiment, the surface level adjusting portion 139a adjusts the surface levels of the coolant 14 in the first and second coolant accumulating portions 134b and 134c to be different from each other.

Consequently, with the above adjustment, it is possible to effectively cool the stator 12 while facilitating the lubrication of the power transmission device 20 by the coolant 14.

In the rotating electric machine 1T according to the present embodiment, the surface level adjusting portion 139a adjusts the surface level of the coolant 14 in the first coolant accumulating portion 134b to be constant regardless of the rotational speed of the output shaft 200.

Consequently, with the above adjustment, it is possible to accumulate a sufficient amount of the coolant 14 in the first coolant accumulating portion 134b and thereby reliably cool the stator 12 regardless of the rotational speed of the output shaft 200.

In addition, it should be noted that for the sake of convenience of explanation, "front", "rear", "up" and "down" are used in FIG. 84 to distinguish directions. It also should be noted that for the sake of ease of understanding, those parts of the rotating electric machine 1T which are actually immersed in the liquid coolant 14 are also shown with continuous lines in FIG. 84.

Twentieth Embodiment

A rotating electric machine 1U according to a twentieth embodiment has almost the same structure as the rotating electric machine 1T according to the nineteenth embodiment. Accordingly, the differences therebetween will be mainly described hereinafter.

In the nineteenth embodiment, the rotating electric machine 1T includes the surface level adjusting portion 139a that adjusts the surface level of the coolant 14 in the first coolant accumulating portion 134b to be constant regardless of the rotational speed of the output shaft 200 (see FIG. 84).

Figure 85:
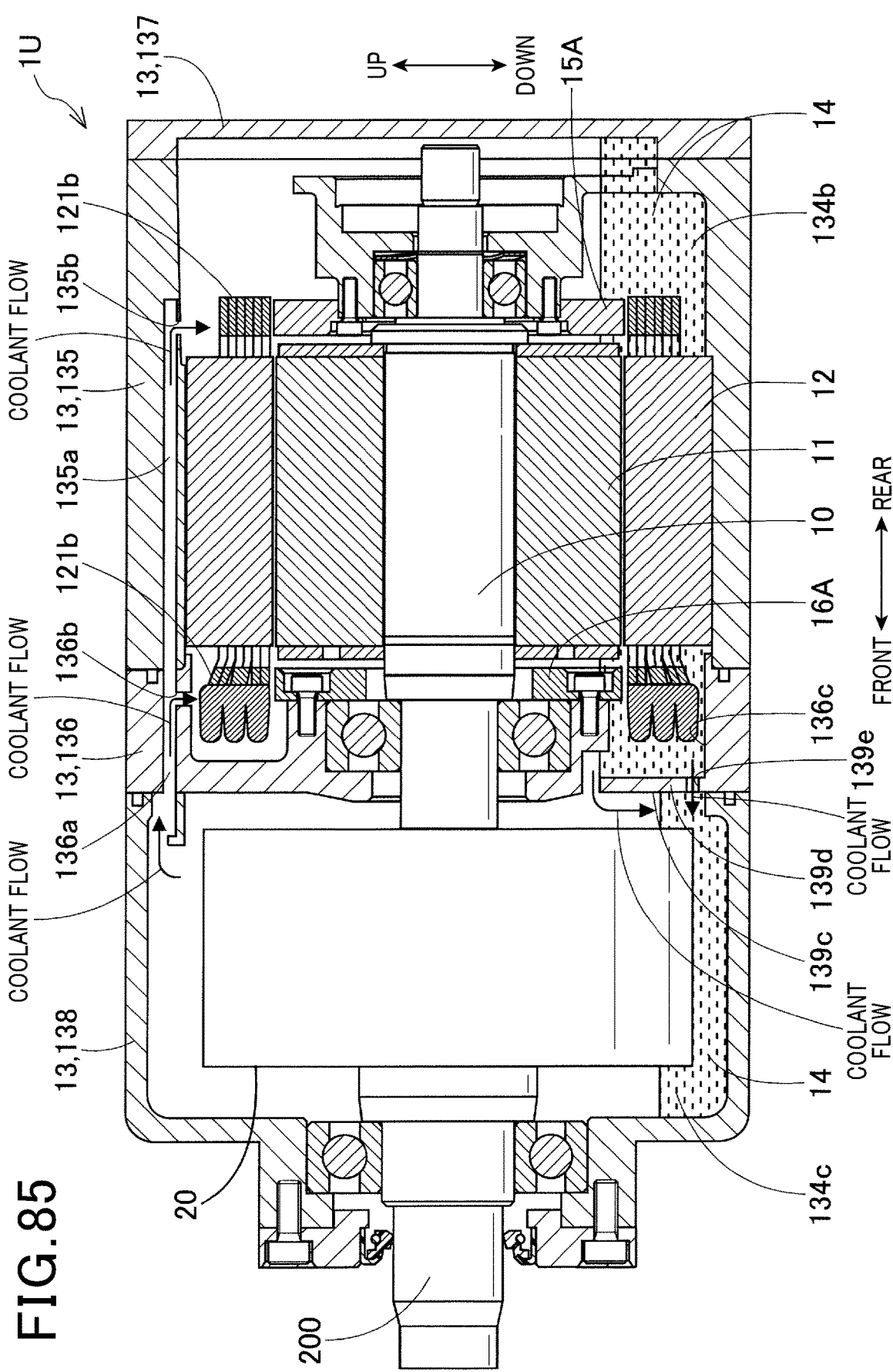
FIG. 85 is a cross-sectional view, taken along an axial direction, of a rotating electric machine according to a twentieth embodiment.

In comparison, in the present embodiment, as shown in FIG. 85, the rotating electric machine 1U includes, instead of the surface level adjusting portion 139a, a surface level adjusting portion 139c that adjusts the surface levels of the coolant 14 in the first and second coolant accumulating portions 134b and 134c to change according to the rotational speed of the output shaft 200.

Specifically, as shown in FIG. 85, the rotating electric machine 1U according to the present embodiment includes the surface level adjusting portion 139c that separates the first and second coolant accumulating portions 134b and 134c from each other and adjusts the surface level of the coolant 14 accumulated in the first coolant accumulating portion 134b and the surface level of the coolant 14 accumulated in the second coolant accumulating portion 134c.

Moreover, in the present embodiment, the surface level adjusting portion 139c adjusts the surface levels of the coolant 14 in the first and second coolant accumulating portions 134b and 134c to change according to the rotational speed of the output shaft 200. Specifically, the surface level adjusting portion 139c adjusts the surface levels of the coolant 14 in the first and second coolant accumulating portions 134b and 134c so that the surface level of the coolant 14 in the first coolant accumulating portion 134b is higher than the surface level of the coolant 14 in the second coolant accumulating portion 134c. Moreover, the surface level adjusting portion 139c adjusts the surface levels of the coolant 14 in the first and second coolant accumulating portions 134b and 134c so that with increase in the rotational speed of the output shaft 200 (or the power transmission device 20), the surface level of the coolant 14 in the first coolant accumulating portion 134b is raised whereas the surface level of the coolant 14 in the second coolant accumulating portion 134c is lowered.

In the present embodiment, the surface level adjusting portion 139c is provided in the lower part of the first front housing 136 to obstruct the through-hole 136c. The surface level adjusting portion 139c includes a wall portion 139d that blocks the coolant 14 from flowing from the first coolant accumulating portion 134b to the second coolant accumulating portion 134c. Moreover, in the wall portion 139d, there is formed a through-hole 139e that axially penetrates the wall portion 139d.

In operation of the rotating electric machine 1U, with increase in the rotational speed of the output shaft 200, the amount of the coolant 14 agitated up by the power transmission device 20 increases, thereby increasing the amount of the coolant 14 flowing from the internal space of the second front housing 138 to the internal space of the center housing 135 via the coolant passages 136a and 135a. Consequently, with the increase in the amount of the coolant 14 flowing from the internal space of the second front housing 138 to the internal space of the center housing 135, the amount of the coolant 14 in the internal space of the second front housing 138 decreases.

When the rotational speed of the output shaft 200 is low, the amount of the coolant 14 flowing from the internal space of the second front housing 138 to the internal space of the center housing 135 via the coolant passages 136a and 135a is small. At the same time, the coolant 14 also flows from the first coolant accumulating portion 134b to the second coolant accumulating portion 134c via the through-hole 139e formed in the wall portion 139d. Consequently, the surface level of the coolant 14 in the second coolant accumulating portion 134c is lowered by only a small amount.

On the other hand, when the rotational speed of the output shaft 200 is high, the amount of the coolant 14 flowing from the internal space of the second front housing 138 to the internal space of the center housing 135 via the coolant passages 136a and 135a is large. At the same time, since the size of the through-hole 139e formed in the wall portion 139*d* is fixed (or constant), the increase in the amount of the coolant 14 flowing from the first coolant accumulating portion 134*b* to the second coolant accumulating portion 134*c* via the through-hole 139*e* is small. In addition, the size of the through-hole 139*e* is set so as not to allow a large amount of the coolant 14 to immediately return from the internal space of the center housing 135 to the internal space of the second front housing 138. Consequently, the surface level of the coolant 14 in the second coolant accumulating portion 134*c* is considerably lowered.

That is, in the present embodiment, by the wall portion 139*d*, the surface levels of the coolant 14 in the first and second coolant accumulating portions 134*b* and 134*c* are adjusted so that the surface level of the coolant 14 in the first coolant accumulating portion 134*b* is higher than the surface level of the coolant 14 in the second coolant accumulating portion 134*c*. Moreover, by the through-hole 139*e*, the surface levels of the coolant 14 in the first and second coolant accumulating portions 134*b* and 134*c* are adjusted so that with increase in the rotational speed of the output shaft 200, the surface level of the coolant 14 in the first coolant accumulating portion 134*b* is raised whereas the surface level of the coolant 14 in the second coolant accumulating portion 134*c* is lowered.

The rotating electric machine 1U according to the present embodiment has the same advantages as the rotating electric machine 1T according to the nineteenth embodiment.

Moreover, with change in the rotational speed of the output shaft 200, both the suitable surface level of the coolant 14 in the first coolant accumulating portion 134*b* for effectively cooling the stator 12 and the suitable surface level of the coolant 14 in the second coolant accumulating portion 134*c* for facilitating the lubrication of the power transmission device 20 by the coolant 14 also change. However, in the rotating electric machine 1U according to the present embodiment, the surface level adjusting portion 139*c* adjusts the surface levels of the coolant 14 in the first and second coolant accumulating portions 134*b* and 134*c* to change according to the rotational speed of the output shaft 200.

Consequently, with the above adjustment, it is possible to effectively cool the stator 12 while facilitating the lubrication of the power transmission device 20 by the coolant 14 even when the rotational speed of the output shaft 200 changes.

In addition, it should be noted that for the sake of convenience of explanation, "front", "rear", "up" and "down" are used in FIG. 85 to distinguish directions. It also should be noted that for the sake of ease of understanding, those parts of the rotating electric machine 1U which are actually immersed in the liquid coolant 14 are also shown with continuous lines in FIG. 85.

Twenty-First Embodiment

A rotating electric machine 1V according to a twenty-first embodiment has almost the same structure as the rotating electric machine 1S according to the eighteenth embodiment. Accordingly, the differences therebetween will be mainly described hereinafter.

In the eighteenth embodiment, the rotating electric machine 1S includes both the flow direction regulating members 15A and 16A that are respectively arranged on the front and rear sides of the rotor 11 (see FIG. 83).

Figure 86:
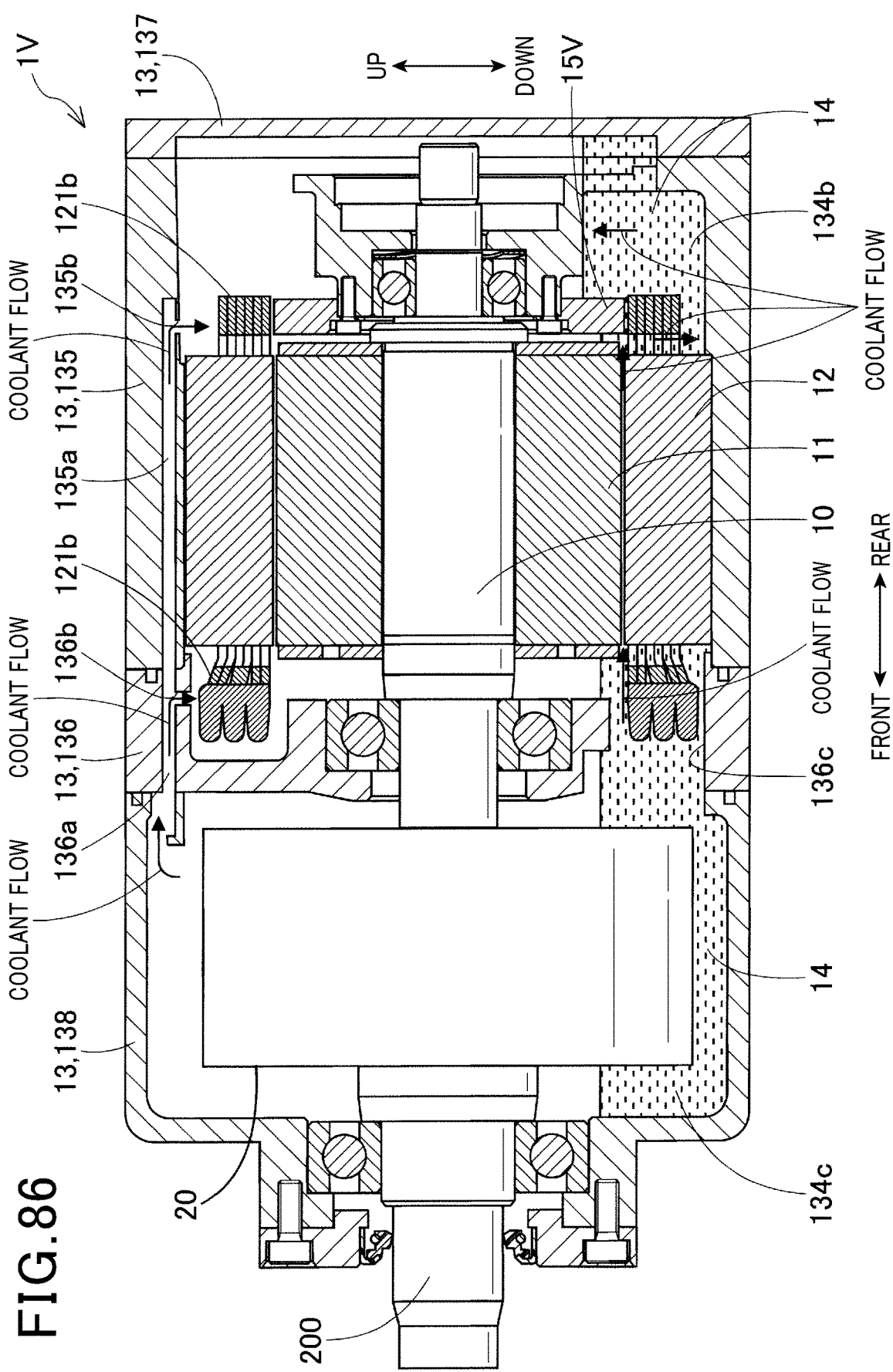
FIG. 86 is a cross-sectional view, taken along an axial direction, of a rotating electric machine according to a twenty-first embodiment.

In comparison, in the present embodiment, as shown in FIG. 86, the rotating electric machine 1V includes only one flow direction regulating member 15V. The flow direction regulating member 15V is arranged on the rear side of the rotor 11 to axially face the rear end face of the rotor 11. That is, the rotating electric machine 1V has no flow direction regulating member arranged on the front side of the rotor 11. In addition, the flow direction regulating member 15V is identical to the flow direction regulating member 15A of the rotating electric machine 1S according to the eighteenth embodiment.

The rotating electric machine 1V according to the present embodiment has the same advantages as the rotating electric machine 1S according to the eighteenth embodiment.

Moreover, in the rotating electric machine 1V according to the present embodiment, the flow direction regulating member 15V is provided only on the rear side (or a first axial side) of the rotor 11 while the power transmission device 20 is provided on the front side (or a second axial side) of the rotor 11. That is, there is no flow direction regulating member provided on the front side of the rotor 11.

With the above configuration, the coolant 14, which has flowed into the annular gap between the radially inner peripheral surface of the stator 12 and the radially outer peripheral surface of the rotor 11, is discharged only on the rear side of the rotor 11 (or on the opposite axial side of the rotor 11 to the power transmission device 20). Therefore, the coolant 14 flows from the front side to the rear side of the rotor 11 through the annular gap between the radially inner peripheral surface of the stator 12 and the radially outer peripheral surface of the rotor 11. Consequently, the amount of the coolant 14 accumulated in the first coolant accumulating portion 134*b* is increased. As a result, it is possible to reliably cool the rear coil end portions 121*b* with the coolant 14 accumulated in the first coolant accumulating portion 134*b*; the rear coil end portions 121*b* are located distant from the power transmission device 20 and it is thus relatively difficult to cool the rear coil end portions 121*b* with the coolant 14 splashed with rotation of the power transmission device 20. Moreover, the surface level of the coolant 14 in the first coolant accumulating portion 134*b* is raised, thus lowering the surface level of the coolant 14 in the second coolant accumulating portion 134*c* and thereby reducing the loss due to the shearing force of the coolant 14 accumulated in the second coolant accumulating portion 134*c*.

In addition, it should be noted that for the sake of convenience of explanation, "front", "rear", "up" and "down" are used in FIG. 86 to distinguish directions. It also should be noted that for the sake of ease of understanding, those parts of the rotating electric machine 1V which are actually immersed in the liquid coolant 14 are also shown with continuous lines in FIG. 86.

While the above particular embodiments have been shown and described, it will be understood by those skilled in the art that various modifications, changes and improvements may be made without departing from the spirit of the present invention.

For example, the rotating electric machines according to the eighteenth to the twenty-first embodiments are obtained by modifying the rotating electric machine according to the first embodiment. However, it should be appreciated that the same modifications can also be made to the rotating electric machines according to the second to the seventeenth embodiments.

In the first to the twenty-first embodiments, the present invention is directed to rotating electric machines each being configured as a motor-generator for use in a motor vehicle. However, the present invention can also be applied to other rotating electric machines, such as an electric motor or an electric generator.

What is claimed is:

1. A rotating electric machine comprising:
a rotating shaft;
a rotor fixed on the rotating shaft;
a stator arranged so that a radially inner peripheral surface of the stator radially faces a radially outer peripheral surface of the rotor through an annular gap formed therebetween;
a housing that covers both axial ends of the stator and rotatably supports the rotating shaft;
a liquid coolant provided in an internal space formed in the housing to flow into at least part of the annular gap, a portion of the rotor being immersed in the liquid coolant; and
a flow direction regulating member that axially faces an axial end face of the rotor through an axial gap formed therebetween and regulates flow direction of the coolant by way of the axial gap, a portion of the flow direction regulating member adjacent to the immersed portion of the rotor being immersed in the liquid coolant provided in the internal space so that the liquid coolant flows into and accumulates in the axial gap.

2. The rotating electric machine as set forth in claim 1, wherein the stator includes a stator core and a stator coil, the stator core having a radially inner peripheral surface that constitutes the radially inner peripheral surface of the stator, the stator coil being mounted on the stator core and having coil end portions axially protruding from an axial end face of the stator core, and
an opening of the axial gap radially faces the coil end portions of the stator coil.

3. The rotating electric machine as set forth in claim 2, wherein the stator includes space portions each of which is defined by one of the coil end portions of the stator coil and the axial end face of the stator core, and
the opening of the axial gap radially faces the space portions as well as the coil end portions.

4. The rotating electric machine as set forth in claim 1, wherein the flow direction regulating member has at least one protrusion and at least one recess formed in a rotor-side surface thereof.

5. The rotating electric machine as set forth in claim 4, wherein the at least one protrusion axially protrudes and extends in a circumferential direction.

6. The rotating electric machine as set forth in claim 5, wherein the at least one protrusion has a circular arc shape.

7. The rotating electric machine as set forth in claim 5, wherein the at least one protrusion has an annular shape.

8. The rotating electric machine as set forth in claim 1, wherein in the flow direction regulating member, there is formed at least one through-hole that axially penetrates the flow direction regulating member.

9. The rotating electric machine as set forth in claim 1, wherein the stator includes a stator core and a stator coil, the stator core having a radially inner peripheral surface that constitutes the radially inner peripheral surface of the stator, the stator coil being mounted on the stator core and having coil end portions axially protruding from an axial end face of the stator core, and
the flow direction regulating member has a coil end facing portion that axially faces the coil end portions through an axial gap formed therebetween.

10. The rotating electric machine as set forth in claim 1, wherein the flow direction regulating member is provided in an axially movable manner.

11. The rotating electric machine as set forth in claim 10, further comprising a pressing member provided to press the flow direction regulating member in an axial direction away from the rotor.

12. The rotating electric machine as set forth in claim 11, wherein the pressing member is one of a spring and a rubber member.

13. The rotating electric machine as set forth in claim 10, further comprising an actuator that actuates the flow direction regulating member to axially move.

14. The rotating electric machine as set forth in claim 1, wherein at least a radially outer peripheral portion of the flow direction regulating member is constituted of a plate-shaped member having elasticity.

15. The rotating electric machine as set forth in claim 1, wherein the flow direction regulating member is fixed to one of the stator and the housing.

16. The rotating electric machine as set forth in claim 1, wherein the flow direction regulating member is fixed to one of the rotating shaft and the rotor.

17. The rotating electric machine as set forth in claim 1, wherein the flow direction regulating member is provided to radially face a predetermined member, which is always in a stationary state, through a radial gap formed therebetween, and
a width of the radial gap formed between the flow direction regulating member and the predetermined member is less than a width of the axial gap formed between the flow direction regulating member and the axial end face of the rotor.

18. The rotating electric machine as set forth in claim 1, wherein the flow direction regulating member has a wall portion that blocks the coolant on an opposite side of the flow direction regulating member to the rotor from entering the axial gap formed between the flow direction regulating member and the axial end face of the rotor.

19. The rotating electric machine as set forth in claim 1, further comprising a coolant returning portion provided to return the coolant, which is splashed radially outward with rotation of the rotor, to a coolant accumulating portion in the housing.

20. The rotating electric machine as set forth in claim 19, wherein the housing has a supporting portion located on an opposite side of the flow direction regulating member to the rotor to rotatably support the rotating shaft,
the supporting portion has a radially outer peripheral surface tapered toward the rotor, and
the coolant returning portion is formed by the supporting portion of the housing and the flow direction regulating member.

21. The rotating electric machine as set forth in claim 1, wherein the flow direction regulating member is constituted of a plurality of members that are assembled together.

22. The rotating electric machine as set forth in claim 1, further comprising a blocking member provided radially outside an axial end portion of the stator to block splashing of the coolant radially outward which occurs with rotation of the rotor.

23. The rotating electric machine as set forth in claim 1, further comprising an output shaft rotatably supported by the housing and a power transmission device that transmits mechanical power between the rotating shaft and the output shaft, wherein the power transmission device is received in the housing and partially immersed in the coolant.

24. The rotating electric machine as set forth in claim 23, further comprising:

a first coolant accumulating portion which is formed in the housing and in which the coolant is accumulated to have the rotor and the stator partially immersed therein;

a second coolant accumulating portion which is formed in the housing and in which the coolant is accumulated to have the power transmission device partially immersed therein; and a surface level adjusting portion that separates the first and second coolant accumulating portions from each other and adjusts a surface level of the coolant accumulated in the first coolant accumulating portion and a surface level of the coolant accumulated in the second coolant accumulating portion.

25. The rotating electric machine as set forth in claim 24, wherein the surface level adjusting portion adjusts the surface levels of the coolant in the first and second coolant accumulating portions to be different from each other.

26. The rotating electric machine as set forth in claim 25, wherein the surface level adjusting portion adjusts the surface level of the coolant in the first coolant accumulating portion to be constant regardless of rotational speed of the output shaft.

27. The rotating electric machine as set forth in claim 25, wherein the surface level adjusting portion adjusts the surface levels of the coolant in the first and second coolant accumulating portions to change according to rotational speed of the output shaft.

28. The rotating electric machine as set forth in claim 23, wherein the coolant also functions as a lubricant for the power transmission device.

29. The rotating electric machine as set forth in claim 23, wherein the flow direction regulating member is provided only on a first axial side of the rotor, and the power transmission device is provided on a second axial side of the rotor, the second axial side being opposite to the first axial side.

30. The rotating electric machine as set forth in claim 23, wherein the stator includes a stator core and a stator coil, the stator core having a radially inner peripheral surface that constitutes the radially inner peripheral surface of the stator, the stator coil being mounted on the stator core and having coil end portions axially protruding from an axial end face of the stator core, and in the housing, there is formed a coolant passage to introduce the coolant, which is splashed radially outward with rotation of the power transmission device, to the coil end portions.

* * * * *